(12) United States Patent
Mack

(10) Patent No.: US 9,237,817 B2
(45) Date of Patent: Jan. 19, 2016

(54) RESTAURANT SYSTEM

(75) Inventor: Michael Mack, Fuerth (DE)

(73) Assignee: HeineMack GmbH, Nuremberg (DE)

( * ) Notice: Subject to any disclaimer, the term of this patent is extended or adjusted under 35 U.S.C. 154(b) by 423 days.

(21) Appl. No.: 11/914,698

(22) PCT Filed: Dec. 11, 2006

(86) PCT No.: PCT/EP2006/011908
§ 371 (c)(1),
(2), (4) Date: Nov. 16, 2007

(87) PCT Pub. No.: WO2007/068426
PCT Pub. Date: Jun. 21, 2007

(65) Prior Publication Data
US 2009/0101445 A1 Apr. 23, 2009

(30) Foreign Application Priority Data

Dec. 12, 2005 (DE) .......................... 10 2005 059 188

(51) Int. Cl.
*E04H 3/04* (2006.01)
*A47F 10/06* (2006.01)
(Continued)

(52) U.S. Cl.
CPC ................ *A47F 10/06* (2013.01); *A47G 23/08* (2013.01); *B65G 1/08* (2013.01)

(58) Field of Classification Search
CPC ........... A47F 10/06; A47F 9/00; B61B 13/00; B61B 13/04; B61B 10/04; B61B 1/00; B61B 13/10; B61B 13/122; B61B 13/08; B61B 7/02; B61B 12/02; B61B 10/043; B62D 1/265; B62D 1/26; B61C 11/00; B61C 13/04; B61G 5/08; B61F 9/00; A47B 53/02; A47D 1/10; A63H 18/021; A63H 19/00; A63H 19/32; A63G 7/00; A61J 7/0084; B06B 1/166; B61L 23/005; B60L 2200/26; B08B 9/049; B66B 9/00; B65D 81/00; B65B 25/001; B65G 31/00; B65G 27/32; B65G 27/20; B65G 27/08; B65G 27/30; B65G 21/22; B65G 17/20; B65G 2201/02; B65G 35/063; B65G 37/00; B65G 2812/00; B65G 51/01; B65G 47/50; B65G 47/487; B65G 47/52; B07C 3/087; B07C 7/02; B60N 3/10; C08L 91/06; C08L 2666/02; C08L 67/02; C08L 67/025; B66C 21/00; F16L 55/34; F16L 55/28; F16L 2101/30; F16L 37/002; F16L 37/091; F16L 37/0985; E01B 25/24; E04H 3/04; E21B 33/038; E21B 17/042; G01M 3/005; G06F 19/3462; G06F 15/167; G06F 17/30766; G06F 17/30772; G06F 17/30867; G06F 21/10; G06Q 50/12; G11B 20/1403; G07F 7/00; Y02T 30/30; A47G 23/08
USPC ........ 104/245–247, 88.01, 108, 138.1, 138.2; 198/770; 285/24; 186/2–6, 8, 12, 186/31–34, 46–50
See application file for complete search history.

(56) References Cited

U.S. PATENT DOCUMENTS 2,216,357 A * 10/1940 Smith .............................. 186/46
2,640,581 A    6/1953 Abitz
(Continued)

FOREIGN PATENT DOCUMENTS

DE    25 27 188 A1    9/1976
DE    36 02 342 C1    6/1987
(Continued)

OTHER PUBLICATIONS

ISR of WO 2007/068426 A published Jun. 21, 2007.
(Continued)

*Primary Examiner* — Jeffrey Shapiro
(74) *Attorney, Agent, or Firm* — The Law Office of James E. Ruland, PLC

(57) ABSTRACT

The invention relates to a restaurant system (2), comprising
a) at least one working area (3) for cooking and/or preparing meals and/or beverages,
b) at least one customer area (4), in particular with one or more tables (5) for restaurant customers,
c) working area (3) and customer area (4) being connected via a transport system (6) for meals and/or beverages,
d) the transport system (6) being designed to transport meals and/or beverages from the working area (3) to the customer area (4), and
e) the transport of meals and/or beverages from the working area (3) to the customer area (4) via the transport system (6) taking place, at least in some sections, by means of gravity.

16 Claims, 22 Drawing Sheets

Figure 1:
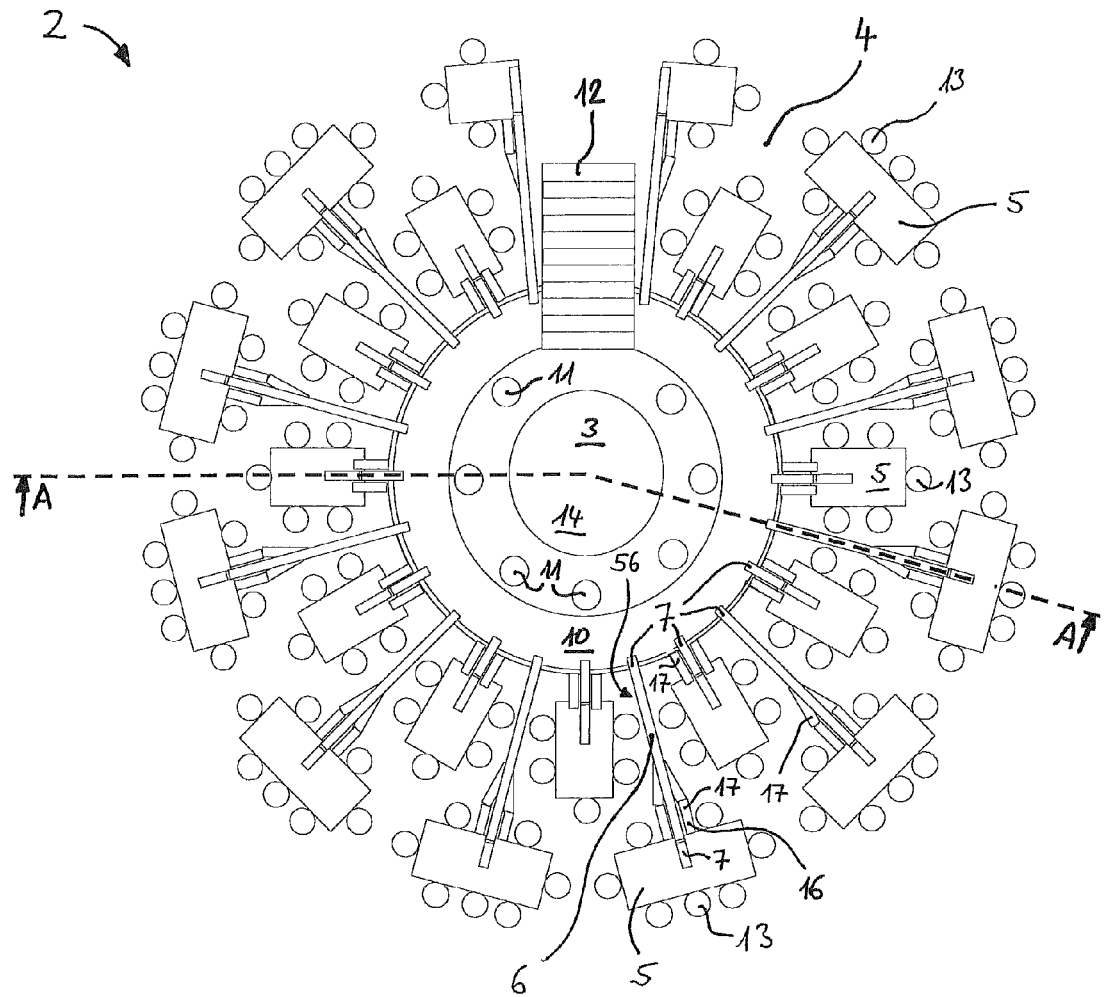

(51) Int. Cl.
 *A47G 23/08* (2006.01)
 *B65G 1/08* (2006.01)

(56) References Cited

U.S. PATENT DOCUMENTS

| | | | | |
|---|---|---|---|---|
| 3,464,363 A | * | 9/1969 | Wishart | 104/88.06 |
| 3,577,930 A | * | 5/1971 | Rooklyn | 104/173.1 |
| 3,734,028 A | * | 5/1973 | Robertson | 104/245 |
| 3,857,463 A | | 12/1974 | Wagenfuehrer et al. | |
| 3,985,206 A | | 10/1976 | Rodriguez-Cantos | |
| 3,998,497 A | * | 12/1976 | Koizumi | 384/53 |
| 4,005,745 A | * | 2/1977 | Colato et al. | 165/61 |
| 4,015,537 A | * | 4/1977 | Graef et al. | 104/91 |
| 4,346,945 A | * | 8/1982 | Tsuboi | 384/55 |
| 4,347,923 A | * | 9/1982 | Wong | B65G 13/12 193/25 FT |
| 4,375,195 A | * | 3/1983 | Tsuboi | 104/246 |
| 4,387,481 A | * | 6/1983 | Zalewski | 15/316.1 |
| 4,627,529 A | * | 12/1986 | Tarlton et al. | 198/778 |
| 4,831,937 A | * | 5/1989 | Yamada | 104/56 |
| 5,119,734 A | * | 6/1992 | Schwarzkopf | 104/246 |
| 5,146,854 A | * | 9/1992 | Poulos | 105/150 |
| 5,168,801 A | * | 12/1992 | Switek, Jr. | 99/546 |
| 5,186,433 A | | 2/1993 | Pausch | |
| 5,272,984 A | * | 12/1993 | Bolliger et al. | 104/63 |
| 5,299,507 A | * | 4/1994 | Maynard, Sr. | 104/138.1 |
| 5,303,810 A | * | 4/1994 | Tani | 198/345.3 |
| 5,320,210 A | * | 6/1994 | Van Den Bergh et al. | 198/465.1 |
| 5,397,211 A | * | 3/1995 | Lloyd et al. | 414/663 |
| 5,413,414 A | | 5/1995 | Bauer | |
| 5,496,115 A | | 3/1996 | Bauer | |
| 5,537,929 A | * | 7/1996 | Miura et al. | 104/156 |
| 5,572,930 A | * | 11/1996 | Hein | 104/128 |
| 5,711,227 A | * | 1/1998 | Johnson | 104/126 |
| 5,738,016 A | * | 4/1998 | Scott | 104/107 |
| 5,816,443 A | * | 10/1998 | Bustos | 221/211 |
| 5,857,560 A | * | 1/1999 | Bjorkholm | 198/837 |
| 5,910,192 A | * | 6/1999 | Pulford et al. | 74/479.01 |
| 6,047,645 A | * | 4/2000 | Cornwell et al. | 104/124 |
| 6,102,194 A | * | 8/2000 | Charny | 198/795 |
| 6,158,568 A | * | 12/2000 | Erceg | B65G 47/962 198/370.04 |
| 6,386,356 B1 | * | 5/2002 | Eberle | 198/867.01 |
| 6,427,806 B1 | * | 8/2002 | Tanaka | 186/49 |
| 6,520,641 B1 | * | 2/2003 | Walton et al. | 352/243 |
| 6,561,103 B2 | * | 5/2003 | Peck | 105/29.1 |
| 6,626,117 B1 | * | 9/2003 | Chapman | 105/218.1 |
| 6,675,950 B1 | * | 1/2004 | Collon | 198/465.2 |
| 6,758,650 B2 | * | 7/2004 | Drei et al. | 414/745.1 |
| 6,907,985 B1 | * | 6/2005 | Axmann | 198/833 |
| 7,243,758 B2 | * | 7/2007 | Ishino et al. | 186/49 |
| 7,381,022 B1 | * | 6/2008 | King | 414/267 |
| 7,650,843 B2 | * | 1/2010 | Minges | 104/178 |
| 2003/0075070 A1 | * | 4/2003 | Spielberg et al. | 104/130.01 |
| 2004/0249497 A1 | | 12/2004 | Saigh et al. | |
| 2005/0121293 A1 | * | 6/2005 | Rice | H01L 21/6773 198/475.1 |
| 2007/0000207 A1 | | 1/2007 | Bernhard | |
| 2007/0187183 A1 | * | 8/2007 | Saigh et al. | 186/53 |
| 2009/0101445 A1 | | 4/2009 | Mack | |
| 2009/0107803 A1 | | 4/2009 | Ellerth et al. | |
| 2010/0143079 A1 | * | 6/2010 | Iijima | C23C 14/568 414/160 |

FOREIGN PATENT DOCUMENTS

| | | |
|---|---|---|
| GB | 695999 | 8/1953 |
| GB | 895714 | 5/1962 |
| GB | 2 207 406 A | 2/1989 |
| JP | 11244119 A | 9/1999 |
| WO | WO 2011065141 A1 | 6/2011 |

OTHER PUBLICATIONS

Patent Abstracts of Japan of JP Publication No. 11-244,119, Inventor Yoshio, Entitled, "Device for Carrying Table Ware Containing Box in Rotary Sushi Restaurant", Published Sep. 14, 1999.

Search Report from International Application No. PCT/DE2014/000128 filed Mar. 12, 2014, now U.S. Appl. No. 14/777,429, filed Sep. 15, 2015.

Search Report from International Application No. PCT/DE2014/000130 filed Mar. 12, 2014, now U.S. Appl. No. 14/777,478, filed Sep. 15, 2015.

* cited by examiner

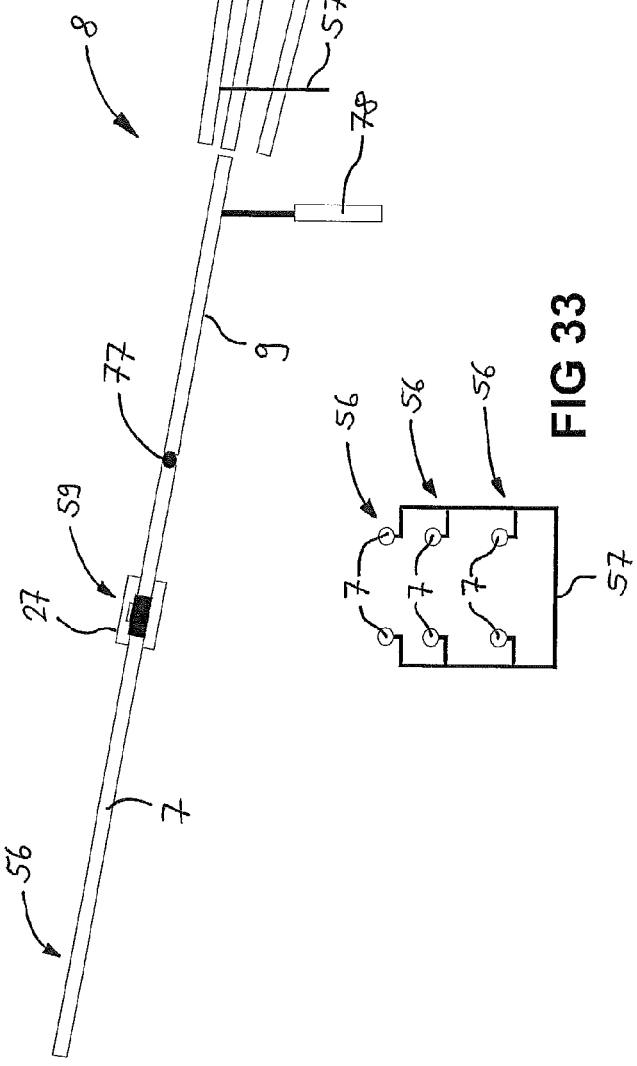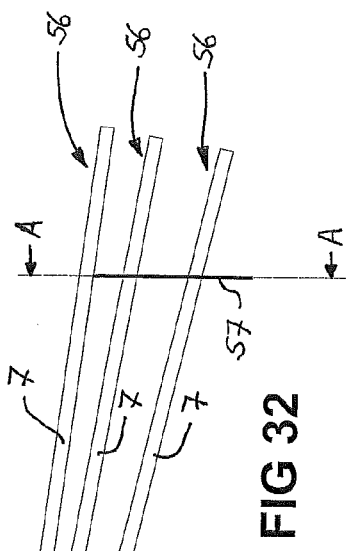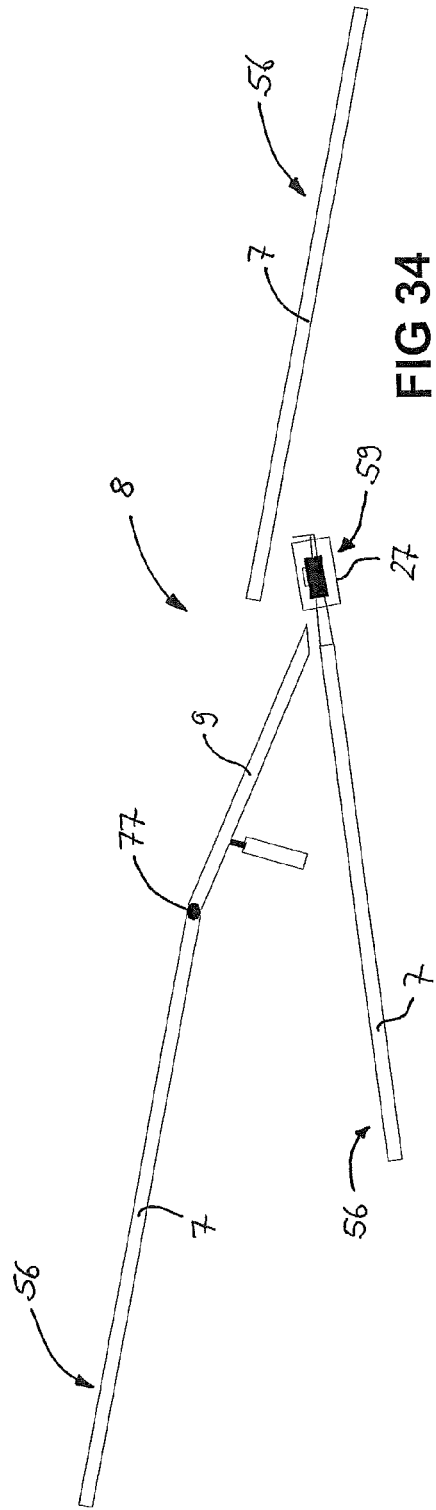

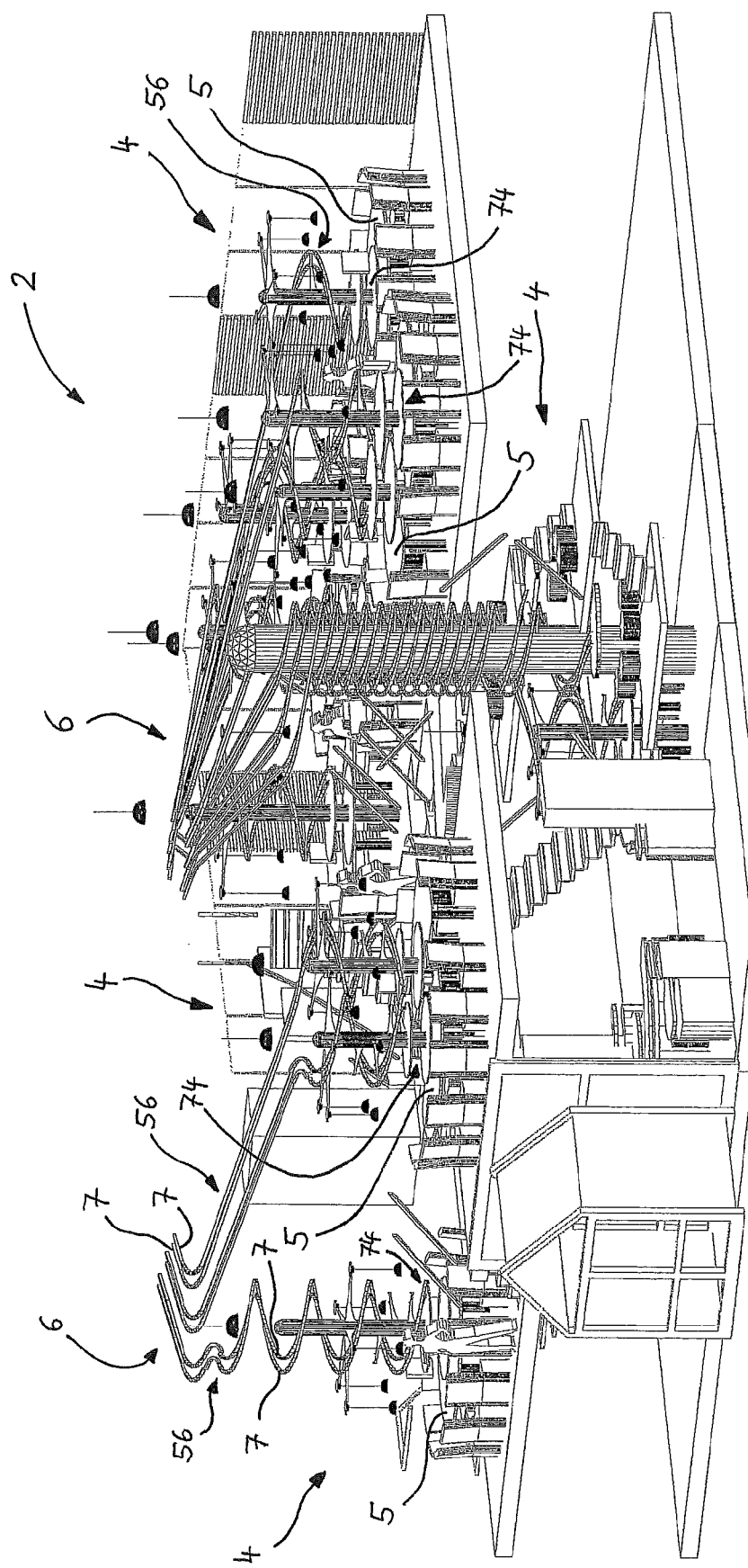

RESTAURANT SYSTEM

The invention relates to a restaurant system (also: catering system).

In principle, two different restaurant systems are known, a restaurant with service and a self-service restaurant.

In restaurants with service, the customers are served at the table by waiters. The waiter takes the order and passes it on to the kitchen, he serves the meals and beverages, carries away the dirty tableware, brings the bill and takes the payment. Although this provides a high level of service for the customers, it is intensive in terms of time and staff and, accordingly, is associated with high costs.

In self-service restaurants, the customer takes on a large part of the service work discussed himself. He orders at an ordering counter and takes the assembled meals and beverages with him from there, or he assembles the meals and beverages himself and pays as he goes past a till. He then carries the meals and beverages to a table. He usually clears away the dirty tableware again himself. Although this is highly efficient from a cost aspect, it is overall rather uninviting for the customers. Added to this is the fact that, in quick-service restaurants, cheap tableware, frequently also disposable tableware, is used. Accordingly, the eating culture in quick-service restaurants holds little if any attraction to large sections of the population.

The present invention is therefore based on the object of overcoming the abovementioned disadvantages of the known restaurant systems, i.e. in particular of providing a restaurant system, in which an attractive eating culture with good service is implemented cost-effectively.

This object is achieved according to the invention by a restaurant system with the features according to Patent Claim 1. Advantageous refinements and developments are provided in the claims which are dependent on Claim 1.

According to C1, a restaurant system is provided, comprising a) at least one working area for cooking and/or preparing meals and/or beverages,
b) at least one customer area, in particular with one or more tables for restaurant customers,
c) working area and customer area being connected via a transport system for meals and/or beverages,
d) the transport system being designed to transport meals and/or beverages from the working area to the customer area,
e) the transport of meals and/or beverages from the working area to the customer area via the transport system taking place, at least in some sections, by means of gravity.

The working area is therefore an area which comprises kitchen and/or bar. Accordingly, this area is equipped with all of the appliances belonging thereto, for example kitchen appliances, stove plates, ovens, refrigerators, and the required working surfaces.

The customer area is the area in which the restaurant customers are. There are usually tables and chairs here. However, it may also be a standing counter or a drive-in area at which customers receive meals and/or beverages delivered to their car. In the last case, the table is a synonym for the area in which the meals and beverages are dispensed to the customers.

A crucial core of the invention resides in the design of the transport system. A waiter does not bring meals and beverages to the customers nor do the customers have to fetch the meals and beverages themselves. Meal and beverage transport systems driven entirely by electricity, for example conveyor belts, as known from some restaurants, in particular Japanese restaurants, are not provided either. According to the invention, the transport of the (customarily previously ordered) meals and/or beverages takes place, on the contrary, by gravity. Gravity moves the meals and beverages completely, or at least in some sections, from the working area to the customer area, in particular next to or onto the tables of the customers and/or to dispensing points, preferably in the vicinity of the table, from which the customer fetches his meals and beverages as per self-service or from which an assistant (waiter) serves the meals and beverages to the particular table.

Manual activity (activity by individuals) is not considered to be part of the transport system. According to one variant of the proposed restaurant system, working staff in or at the working area merely place the meals and beverages into the transport system, and the customer receives the meals and beverages from the transport system in the customer area. Further manual activities in direct connection with the transport operation per se, in particular transport of the meals by individuals, are not provided here. On the contrary, the transport provided according to this variant of the invention takes place by gravity without additional human or manual action. At most, control steps required for directing the transported meals and beverages to the designated target, for example the adjustment of switching points at branch lines in the transport system, may be undertaken by the working staff. According to a further variant, a supplementation of the above-described variant by means of an assistant is provided, i.e. a service staff member (waiter) removes the meals and beverages delivered by the transport system and serves them to the customers at the table. In this case, the transport system is supplemented by manual activities of a service staff member, and therefore the customers are provided with the level of comfort usually provided by waiter service.

The advantages of the invention reside, in particular, in the fact that the transport system renders the staff-intensive serving work in a normal restaurant with service superfluous. The cook in the working area can place the meals and/or beverages directly onto the transport system, gravity essentially takes over the transport to the tables where the customers can take the meals and beverages automatically delivered to their particular seat. Also rendered superfluous, however, is the inconvenient fetching, known from self-service restaurants, of the meals and/or beverages by the customers. The eating culture with good service known from restaurants with service can therefore be implemented cost-efficiently, since it is not staff-intensive. As a result, the proposed restaurant system associates a high level of efficiency with significantly low costs and nevertheless excellent service.

This restaurant system is particularly suitable for restaurants which provide a number of different dishes visible at a glance, in particular for restaurants which provide different variants of a certain dish as a speciality. For example, the typically Franconian meal of "baggers", also known as potato fritters or potato pancakes, is suitable in this connection. "Baggers" are classically served with apple sauce but also with a great variety of other sauces. "Baggers" may also be used as a casing or coating or enclosure of meat and/or vegetables and/or salad and/or soup and/or fruit. A further example which may be mentioned is Spanish tapas which can be provided and served in different variants via a restaurant system according to the invention.

A speciality restaurant of this type can use standard tableware and can therefore make excellent use of the proposed restaurant system with the gravity transport system. A suitable attractive selection of tableware ensures an appropriate eating culture. The kitchen is visible at a glance and can readily be accommodated centrally and expediently raised within a, for example, annular service area. Of course, virtually any other "shapings" of the service area and variants of arranging the kitchen are also conceivable, depending on the local conditions.

In principle, of course, the restaurant system according to the invention is not only suitable for certain specialities, such as "baggers" or tapas, but also for all "normal" meals.

A preferred and expedient development provides that, in the restaurant system proposed, the working area is located at a higher level than the customer area. The arrangement of the working area at a higher level than the customer area is to be understood here in a general sense, i.e. the working area does not have to be arranged directly above the guest area, as a rule it is provided even offset laterally with respect to the customer area, but such that it is located at a higher level than the latter. The height difference between working area and customer area automatically provides the required gravity for the effectiveness of the transport system. The height difference can be utilized for the transport of the meals and/or beverages by gravity.

Of course, it is also possible to implement the height difference required for the gravitational effect by corresponding raising of the containers with the meals and beverages in or in the vicinity of the working area.

Of course, it is advantageous if the transport system operates exclusively on the basis of gravity and a further supply of power for the transport can be omitted. However, it is also conceivable for only some sections of the transport to be implemented solely by gravity. For example, electric systems can supplement some sections of the transport system. It may be necessary, for example at the starting point of the transport system, first of all to move the containers with the meals and beverages to a certain height, inter alia by means of a roller belt and/or a belt conveyor and/or a lift. The containers can then be transported further from there by means of gravity. It is also conceivable to supplement any desired subsection of the transport system electrically and/or electronically and/or hydraulically.

According to a preferred and advantageous development, it is provided that the transport system comprises or is a rail system with one or more rail lines and/or with at least one rail.

A rail system is a transport system comprising one or more rails. Rail is understood here as meaning a generally elongated piece of material, usually made of plastic and/or metal and/or wood, which is intended to guide other objects. Since these other objects are moved here along the rail by gravity, a chute and therefore a chute system may also be mentioned. A rail line is a concrete connection of the working area to the customer area by means of rails, i.e. a rail line begins in the working area and ends in the customer area, preferably directly at or in the vicinity of a table for restaurant customers. The meals and/or beverages intended for a certain table glide or slide here along the rail line in a targeted manner from the working area to this table in the restaurant area.

The rail system preferably comprises sliding rails. In one variant, the latter have sliding surfaces, in particular a flat and smooth sliding surface, along which the meals and beverages slide, preferably in suitable containers and/or by means of suitable transport aids, driven by gravity. According to one variant embodiment, in this case the containers can rest at least substantially all-over on the rails. In a further variant, the rails have elevations and/or recesses, for example ribs and/or grooves. In this case, elevations can be formed directly on the rail or can be additionally fitted, for example by being adhesively bonded on. Recesses and/or elevations, in particular ribs and/or grooves, make the contact surface between rail and container smaller. This may bring about improved sliding properties. Very good sliding properties of the rails are brought about, for example, by the application to the rails of smooth white plastic veneers which are frequently used, for example, in refrigerators, and/or of ribbed imitation wood comprising a mixture of plastic and wood chips used, for example, instead of wood for the construction of patios. It is interesting that even ribbed and relatively coarse wooden boards which are used, for example, for the construction of patios have very good sliding properties and may therefore constitute a suitable material for the rails.

Overall, it is to be emphasized that the selection of material for the gliding or sliding surfaces is virtually unlimited. A suitable material can only be classified as being readily suitable or not very suitable if it is clear which type of container surface is to correspond thereto. For example, a smooth plastic veneer surface at a certain angle of inclination of the rails is best suited for containers composed of nonpolished stainless steel. By contrast, given the same angle of inclination, this material is not very suitable, for example, for enamelled sheet-metal pots, since the containers would slide much too rapidly.

According to a development of the invention, a first type of rail line is formed by a rail, in particular a rail which is circular or oval or rectangular in cross section, or a U-shaped rail, with a sliding surface and guide edges. The individual rail which is circular or oval or rectangular in cross section can be used, for example, for the transport of meals and beverages by means of transport aids which at least substantially engage around the rail. The U-shaped rail can be used, for example, for the transport of meals and beverages in the manner of a conventional chute, in which containers and transport aids glide along a wide sliding surface, guided by lateral boundaries.

A second type of rail line has two rails running at least substantially parallel, in particular two rails which are at least substantially circular or oval or rectangular in cross section. In this case, the meals and beverages are transported to their goal in a manner such that they slide on both rails and are guided by the latter, for example in a manner comparable to a locomotive sliding without propulsion along a railway track with a gradient, with it being possible for the wheels to be replaced by sliding runners.

A third type of rail line has four rails running at least substantially parallel, in particular four rails which are at least substantially circular or oval or rectangular in cross section, two inner rails being at a smaller distance from each other than two outer rails, the two inner rails defining a sliding plane and the two outer rails defining a guide plane, and the sliding plane being arranged below the guide plane. In particular, the sliding plane runs below the guide plane. In this case, the meals and beverages slide on the two inner rails (sliding plane) in suitable containers and/or transport aids, and the two outer rails (guide plane) prevent lateral swerving of the containers or transport aids by, if appropriate, engaging on them laterally. The containers or transport aids are therefore guided along the rail line by the outer rails in a manner comparable to a railing.

The rails may also be designed and arranged in the manner of railway rails or tram lines, with it being possible for the rails themselves also to have a round or oval or circular cross section. At least two rails then preferably run next to each other (in particular parallel to each other). In addition, further stretches of rails are expediently provided laterally as a type of railing. These lateral stretches of rails serve to guide the containers in the transport rail and prevent lateral swerving and tipping of the containers. The containers may be designed in such a manner that they sit on the sliding rails in a laterally fixed manner. However, it is also possible for the containers to rest with their sliding surface on the sliding rails in a freely moveable manner. In order to be able to transport containers of differing size, in one variant a plurality of the sliding rails, which are designed in the manner of railway rails, for example four rails, are arranged in the transport routes instead of two next to each other. The inner rails are then intended, for example, for the transport of smaller containers, and the outer for the transport of larger containers. However, it is also possible for smaller containers to be able to glide to and fro within the width of the rails. In order to prevent tipping or swerving of the containers, additional lateral boundary rails are also to be provided here. The four or more sliding rails may be arranged lying on one level and only the lateral guide rails then lie at a raised level. However, it may also be provided to lay the (two) inner sliding rails lower down than the outer sliding rail in each case. In this case, smaller containers slide on the inner sliding rails and are guided laterally by the outer sliding rails situated higher up and are secured against swerving and tipping over. By contrast, larger containers slide on the outer sliding rails situated at a higher level, with lateral guidance and securing against swerving and tipping over undertaken by the guide rails which are once again situated higher up (railing). This principle can be expanded in virtually any desired manner, i.e. further sliding rails located even lower down could be arranged between the abovementioned inner sliding rails for even smaller containers, etc. In this manner, very different containers (in particular containers of a very different cross-sectional size) can be securely transported in the rail system. It is also conceivable to transport containers of differing size simultaneously in a system of multi-storey construction.

The above-described, multipart transport system with sliding rails on different levels can be realized not only with sliding rails in the manner of railway rails. It can also be designed analogously with sliding surfaces and/or with roller conveyors or ball-bearing conveyors. These are then offset in height with respect to one another, as seen over the width of the transport route, with the surfaces which are situated lower down preferably being provided in the interior of the transport route. Combined systems are also conceivable, for example sliding surfaces in the interior and, laterally thereto in a raised position, sliding rails in the manner of railway rails, or vice versa. Different rail systems in different "storeys" of a multi-storey rail system are also conceivable.

According to a variant embodiment, the rail system has, in the transport direction, branch lines at which the transport route can be adjusted or is adjusted by controllable switching points, in particular via at least one operating device which can be actuated from the working area. The switching points which are integrated in the rail system makes the rail system very flexible. In this way, it is possible to serve a plurality of tables by means of one rail, which divides into a plurality of branch lines, and via the corresponding control of a switching point arranged on the branch lines. The branching can take place here both laterally and horizontally and also vertically, i.e. the rail lines which branch off from one another can first of all be arranged both substantially horizontally next to one another and substantially vertically one above another. Branching into two, but also into a plurality of, rail lines can be implemented via a switching point.

Of course, in this case, the control of the switching points has to ensure that the meals and beverages also arrive at the respectively designated goal (as a rule a table). For this purpose, it can be provided, for example, that the staff member in the working area first of all actuates a button for the designated table number. By means of this pressing of the button, the corresponding switching point is automatically brought (or the corresponding switching points are automatically brought) into the required position. The working area staff member now places the container with the meals and/or drinks onto the rail, this possibility of placing them on the rail expediently only being released after actuation of a table selection button. The container then glides off. However, the control can also take place in an automated manner via a restaurant information technology (IT) system, for example with the use of RFID chips on transport aids and corresponding scanners in the transport system.

As an alternative, it may also be provided that the staff member initially places the containers into the rail, but the gliding away of the containers continues to be prevented, for example by means of a barrier, until the staff member has pressed the button for the goal to be directed to (as a rule a table) and the switching points have therefore been correspondingly set.

It is expedient if, directly after the switching point, the container passes a sensor, for example a light barrier. This signals to the system controller and/or to the working area staff member that the switching point has been successfully passed. At the same time, the sensor triggers the resetting of the switching point into the normal position. It is expediently only then possible for the working area staff member, by renewed pressing of the button, to select a different table, which can likewise be traveled to via the respective rail, and therefore to freshly position said switching point or a different switching point in order to bring a further container to the other table. Of course, the further container should only be able to glide away again when the desired switching-point position is realized. As an alternative or in addition, it can be provided that a greater number of containers can be specified, and therefore the switching point or the switching points are reset or a readjustment by the staff member is possible only after this specified number of containers has passed them by. This is expedient if a plurality of containers with meals and beverages are to be brought virtually simultaneously or directly consecutively to a table, which is regularly the case at least with two or more customers at a table.

As an alternative, it can also be provided that the switching points are not automatically reset into a normal position after the containers have passed them by, but rather remain in their position until they receive a new adjustment signal. The switching points are then not controlled automatically, for example via a sensor, but rather are operated manually by the staff member.

According to a development, the switching points can be adjusted electrically and/or electronically and/or hydraulically and/or pneumatically. The activation of the switching points may take place via the abovementioned ways, but wireless activation is also conceivable.

An expedient development provides transport aids, in particular sliding apparatuses or sliding bases, which correspond in respect of their dimensions and/or their sliding properties to the sliding rails and are designed for the transport of containers for meals and/or beverages, in particular pots and/or tableware and/or glasses and/or tumblers and/or bottles and/or carafes. In particular, the containers are to be able to be placed in a stable manner into or onto the transport aids in order to prevent them from falling out or tipping during transportation.

According to a development, the transport aids can have guide components which, in particular, are at least partially composed of plastic. These guide components are designed in such a manner that they at least partially engage around the rails, in particular engage around at least half of the rail circumference, preferably engage around at least two thirds of the rail circumference.

It can also be provided that the transport aid has two guide components which are connected to each other. This connection can take place, for example, via a ring component in which the container to be transported can be hung or is hung. In this case, the ring components are preferably connected moveably, in particular rotatably, to the guide components, to be precise, in particular, via lateral ring elements which are placed or hung onto bolts which are provided on the guide components. As an alternative, the connection between the two guide components can also be produced via the container itself by the container having been or being fitted or placed next to and/or onto the guide components, or by the container having been or being fitted or placed, in particular via handles on the container, next to and/or onto moulded bodies which are provided on the guide components.

As a result, the guide components are flexible within certain limits in relation to the rails, which results in a desired tilting during sliding and therefore in a likewise desired limitation of the transport speed.

As an alternative or in addition, it is also possible to provide containers, in particular pots or tableware, preferably sliding dishes and/or sliding plates and/or sliding pots and/or sliding pans, and/or glasses and/or tumblers and/or bottles, for the meals and/or beverages to be transported, which containers themselves correspond in respect of their dimensions and/or sliding properties to the sliding rails. Containers of this type can be used on the rail system directly, i.e. without further transport aids. They slide along the rails directly, without transport aids.

"Correspond" in respect of the dimensions is not to be understood here in a narrow sense such that the outer dimensions of the container exactly correspond to the inner dimensions of the sliding rails. On the contrary, it also covers the fact that the rail dimensions may be larger than the container dimensions. All that is important is for the respective dimensions to permit problem-free transport of the containers in the rails. The rails may therefore also be significantly wider than the containers.

A sliding dish of multipart construction has proven particularly advantageous, a first dish corresponding in respect of its dimensions and/or sliding properties to the sliding rails, in particular having a sliding bottom designed for the sliding rail, and at least one further dish being able to be hung or being hung in the first dish.

An expedient variant provides a beverage insert for the transport aid and/or the container, in particular for the sliding dish, with which beverage insert beverage containers (bottles, glasses, cups, etc.) or carafes or soup containers can be transported by means of the transport aid and/or container, in particular the sliding dish, the sliding pot or the sliding pan, in a manner secure against tipping over. The beverage insert can be connected fixedly to the transport aid and/or to the container, it may also be formed integrally with the transport aid and/or the container, but it may also be merely inserted into the transport aid and/or the container as an independent object and removed again as required.

According to a further advantageous development, a handle, in particular a removable handle, is provided, with which the containers, in particular the sliding dishes, can be removed from the rail system and/or the transport aids. Handles of this type are preferably arranged at the table ends of the rails and can be used by the customers for removal of the containers from the transport system. As an alternative or in addition, it is, of course, also possible to provide the containers permanently with one or two handles, for example as in the case of conventional pans or pots.

According to an expedient development of the restaurant system, it is provided that the working area is connected or can be connected to at least one, in particular each, table of the customer area via at least one rail and/or at least one rail line.

It is also advantageous if the rail arranged between working area and customer area is moveable, at least in some sections, in particular via at least one operating device which can be actuated from the working area, and/or via a cable system and/or via a rocker mechanism. In this case, it can be provided that the rail is moveable, preferably via a cable system or via a rocker mechanism, in such a manner that an end of the rail that faces the customer area is moveable in the vertical direction, in particular lies, in a lower position, next to or on the table and, in an upper position, is arranged such that it is freely suspended above the customer area, with transport of meals and/or beverages via the rail preferably being possible only in the lower position. As an alternative or in addition, it is furthermore expedient if the rail is also rotatable in the horizontal direction, in particular by a rotary mounting. However, in this case, it is expedient if the rotational movement of the rail is possible only in a raised position, in particular going beyond a predetermined height, of that end of the rail which faces the customer area, and is blocked in lower positions, in particular by a guide grid for the rail.

For the customary situation in which, in the case of the rocker mechanism, the rail part to the customers is longer than the rail part facing the dispatch point (i.e. in particular the kitchen), an advantageous development provides attaching counter weights to the rail part which faces the dispatch point in order to facilitate handling of the rocker mechanism.

The transport of containers with meals and beverages by gravity requires a certain control of the speed of the containers. Firstly, the containers must not come to a standstill in the centre of the transport system and, secondly, they must not arrive too rapidly in the customer area.

To this end, it is provided, according to a development, that the rail between working area and customer area has essentially a constant slope (or: gradient), at least in a central section, in a transport position. As an addition or alternative, it can be provided that, towards the customer area, the rail has a slowing-down section in which the amount of slope (or: gradient) of the rail is less than in the central section, in particular decreases continuously, at least in some sections, and/or a sliding surface of the rail has a greater coefficient of friction than in the central section.

In curves, it may be expedient to design the rail slope to be greater than in straight rail sections, since the friction between rail and container can be increased in curves because of the presence of the containers at the rail edge and the directional control by the rail edge.

It is important for controlling the speed that different surfaces both of the rails and of the containers result in a different gliding behaviour and therefore in different gliding speeds. A further crucial influencing factor is the angle of inclination of the rail, i.e. the slope or the gradient of the rail.

In principle, the speed of the containers can be adjusted by a corresponding change in the sliding surface of the containers (usually the lower side of the containers) during transportation. However, this can be realized only with a considerable technical outlay.

Furthermore, the angle of inclination of the rail or the slope (the gradient) of the rail can be controlled during the transport mode and, as a result, the speed of the gliding containers can be influenced.

However, it is preferred and expedient to control the gliding behaviour, in particular the speed of the containers, by the surface structure of the rails, in particular of the sliding surfaces of the rails. For this, the sliding surfaces, in particular the lower sides, of the different containers used are each to have the same structure. For example, standard dishes (in general: containers) of, in particular, polished stainless steel can be used. They have a number of advantages. They do not break, even when they strike against one another. They have a polished surface or surface machined uniformly in some other way, also on the sliding surface, and therefore have a very good sliding property. They can easily be cleaned in a dishwasher. They satisfy high demands made of the design. As an alternative, however, containers, in particular dishes and/or plates and/or pots and/or pans and/or tumblers and/or bottles, made of other materials, for example plastic and/or porcelain and/or glass and/or ceramic and/or other metals, may also be used. Coated materials, for example powder-coated and/or stove-enamelled and/or enamelled metal or plastic may also be suitable. Furthermore, it is also possible to use containers made of cardboard and/or paper, as are known, for example, from snack chains and self-service restaurants. Containers of this type (for example, packagings) can likewise slide down the rail system. It is also possible, for example, for small enamelled pots, pans and/or bowls, that are known, inter alia, as a children's toy, to be used.

Finally, for the material of the containers, the same applies as for the material of the gliding or sliding surfaces of the rails. The material selection is virtually unlimited. A suitable material can only be classified as being readily or poorly suitable if it is clear to which type of gliding or sliding surface of the rails it is to correspond.

With regard to the rail design, it is to be taken into consideration that some materials have very good and/or uniform sliding properties, for example smooth plastic veneers, as are used in the interior of kitchen furniture. If, for example, a uniform gradient of the rail of 25% is taken as the starting point, then many containers glide very readily and uniformly on these plastic veneers and their use is correspondingly preferred. By contrast, on other underlying surfaces, such as, for example, sanded wood, at a gradient of 25% the same containers only glide very nonuniformly and often remain stuck. On aluminium rails or coarse underlying wooden surfaces, many containers remain stuck from the start at a gradient of 25% without gliding at all. The angle of inclination would therefore have to be increased for these materials, since, after a certain inclination, the containers do, of course, begin to glide on every underlying surface. However, under some circumstances then they reach speeds which may result in accidents at the end of the transport section. As a rule, with large angles of inclination, only relatively short distances can be covered by the rail system, also for spatial reasons. This may well be expedient in some cases, but is generally undesirable due to spatial conditions (in particular the available room height has a restricting effect here), since, at a low room height, the customer area which can be served by the transport system is correspondingly small. If great distances have to be overcome and/or only a small room height is available, it is expedient to design the rails as roller belts or roller conveyors and/or ball-bearing belts or ball-bearing conveyors. As a result, an adequate sliding behaviour can be achieved even with a low amount of slope (low gradient). It is also conceivable, in particular in the case of longer distances to be covered, to gain height again at certain intermediate points by suitable means, for example by conveyor belts or by a lift, in order then to cover the rest of the distance propelled again by gravity.

The above-explained, different sliding behaviour (or: gliding behaviour) of different materials can advantageously be used for controlling the speed by the sliding surface of the rails being correspondingly varied and, as a result, the sliding behaviour and the speed of the containers being controlled. It is thus expedient to provide necessary sharp gradients of the rail with an underlying surface with a poor gliding characteristic and therefore to reduce the risk of accidents. By contrast, in order to overcome great distances, it is expedient to equip the rail with a surface having very good sliding properties (gliding properties).

In every case, a surface design which, in conjunction with the angle of inclination of the rail, permits a certain predetermined minimum speed of the containers is advantageous in order to ensure that the containers do not stop when underway.

However, from this point of view, it is expedient to brake the containers shortly before they reach their transport goal. This can be achieved by a corresponding surface change of the sliding surface of the rail in the vicinity of the end point thereof. According to a development, two surface changes are provided in the end region of the rail. The first change reduces the speed of the containers, the second change brakes the containers to a standstill.

It can also be expedient to travel through certain subsections of the route, for example curves, more rapidly and to reduce the speed again in subsequent subsections. This can take place by a (if appropriate locally delimited) change of the sliding surface and/or by a (if appropriate locally delimited) change of the angle of inclination of the rail.

According to a development, speed sensors are provided for determining the transport speed, and/or braking devices are provided for reducing the transport speed.

As an alternative or in addition, it may also be provided to design the gradient of the rail such that it is reduced towards the transport end of the rail, and/or to allow the rail to merge into a horizontal course and/or even into a slope in order, as a result, to correspondingly brake the speed of the containers. For this purpose, the rail can permanently have the shape required for this. However, it is also conceivable to adjust the rail gradient during transportation, for example via motors. The control in this case can take place, inter alia, via sensors which, for example, determine the container speed.

The sliding properties may change on account of continuous stressing and the associated wear of the sliding surfaces of containers and rails. In the case of polished or mechanically processed or coated metal containers (for example stainless steel dishes), this can be eliminated relatively simply by repolishing. However, in the case of the rails, because of the size and immovability of the system, a comparable measure can be carried out only with a considerable outlay. It is therefore expedient if, in the case of the rails, the sliding surfaces are provided with films and/or veneers, in particular adhesive films and/or adhesive veneers. If required, said films or veneers can be removed again and replaced by new ones. Films or veneers also make the formation of a simple surface change possible. The surfaces desired in each case can be produced by films or veneers. In this manner, virtually any desired surfaces made of wood, metal, plastic, paper, cloth, fabric or Teflon can be adhesively bonded on and therefore realized. Repair to the rail system or even a fundamental change, if appropriate, to the gliding properties of the rail system is thereby easily possible. As an alternative or in addition, the sliding surfaces of the containers can also be provided with a comparable film or a comparable veneer, in particular by adhesively bonding it on and/or by fastening it by clamping and/or by fastening by suction, for example by means of suction cups.

According to a development of the invention, it is provided that the rail line ends or peters out in the customer area, in particular at the tables, on a round tower, in particular a two-storey round tower with two levels, a lower and an upper level, which are preferably rotatable independently of each other about a round-tower spindle and are arranged one above the other. Furthermore, the lower level of the round tower can have one or more removable trays in the shape of a segment of a circle. One or more monitors, in particular touch screen monitors, can also be attached to the round tower, in particular to the round-tower spindle, via one or more pivotable and/or rotatable holders.

An expedient development of the proposed restaurant system provides that the rail between working area and customer area is covered, at least in some sections, in particular all-over or by lattice bars. This firstly has the advantage that unauthorized individuals cannot come into contact at all with the meals and/or beverages, in particular cannot simply remove containers with meals and/or beverages from the transport system. Secondly, this very substantially prevents the meals and/or beverages and/or the containers being contaminated during transportation.

In a special embodiment, the rails are therefore covered, at least substantially completely, by a covering and/or are closed, at least in some sections, by a corresponding apparatus, for example a wire lattice. It is advantageous in this case to provide a covering which can easily be removed or opened in order to permit access to the rail in the event of problems or for cleaning purposes. For example, the rails may be covered by covers which can be swung open. The selection of the dimensions of said covers, in particular their length, is such that easy opening and closing is possible.

A visually particularly attractive embodiment provides accommodating the rail system or the rails at least partially in a divided Plexiglass tube. For this purpose, the Plexiglass tube is divided into two halves, a lower and an upper half. The rails are arranged in the lower half, with it being possible for this to involve any type of rail, i.e., for example, rails in the manner of a chute with a wide sliding surface or rails in the manner of railway rails. In addition, guide rails can be provided to the side of said transport rails as a type of railing for the containers to be transported, said guide rails also being accommodated in the lower half of the Plexiglass tube. The upper half can then be placed as a covering either directly onto the lower half or can be arranged over the lower half via spacers, for example pillars. These variant embodiments protect the meals and beverages against soiling and/or unauthorized access and, at the same time, it is possible for the customers to see into the transport system. Of course, in addition to Plexiglass, further materials are also suitable for the tubes, for example plastics or glass, with transparent materials being preferred.

According to one variant, it is envisaged providing the containers for the meals and/or beverages themselves with a cover, for example a plastic cover, as protection. This prevents the meals and beverages being contaminated. In this case, only a partial covering of the rails, for example the provision of a wire lattice, suffices in order to prevent the containers being removed by unauthorized individuals. As a result, it is possible for the containers to arrive in a manner visible to the customers.

An expedient development is also to form the covering of the rails from see-through material, for example from glass or transparent plastic. This also has the advantage that, despite full protection against unauthorized removal and against soiling, the arrival of the containers is visible to the customers.

A further expedient variant is to make the rails visually perceptible to the customers by provision of lattice bars or fences, but at the same time to prevent access by unauthorized individuals.

A particularly preferred embodiment of the restaurant system according to the invention provides that
a) at least one cleaning and/or waste-disposal area is provided,
b) the cleaning and/or waste-disposal area being arranged at a lower level than the customer area,
c) customer area and cleaning and/or waste-disposal area being connected via a removal system for containers, in particular tableware, preferably sliding dishes and/or sliding plates and/or sliding pots and/or sliding pans, and/or glasses and/or tumblers and/or bottles, and/or for transport aids and/or table waste,
d) the removal system being designed in order to transport containers and/or transport aids and/or table waste from the customer area to the cleaning and/or waste-disposal area,
e) the removal of containers and/or transport aids and/or table waste from the customer area to the cleaning and/or waste-disposal area via the removal system taking place, at least in some sections, by means of gravity.

In this embodiment, not only is the transport of the meals and beverages to the customers controlled extremely efficiently, also the removal of the used containers (in particular tableware and/or glasses and/or tumblers and/or transport aids) and of the table waste is controlled efficiently and therefore cost-effectively without restricting the comfort of the customers. The customers do not themselves have to bring the used tableware and the waste to special collecting points nor does a waiter have to carry tableware and waste away. On the contrary, the customers simply have to place the used containers and the waste into the removal system. The latter ensures (at least in some sections) by means of gravity that the containers and waste are removed to the preferably centrally arranged cleaning and waste-disposal area. Waste is disposed of there correctly, and the contaminated containers are washed, for example by means of a dishwasher. The cleaned containers are made available again to the working area, if appropriate via an intermediate store.

It is also possible to set up special dispatch points of the removal system, separately from the customers' tables. Service staff (waiters) or the customers themselves would then have to bring the used containers and waste to said dispatch points. In this case, the usual comfort could be provided for the customers in particular by service staff. In addition, the use of service staff has the advantage that, owing to the training and experience of said professional staff, contaminations of the removal system, for example due to containers inserted wrongly, can be largely avoided.

The removal system preferably comprises or is a removal rail system. The latter is preferably matched in respect of its dimensions and sliding properties to the rail system of the transport system. This is expedient, since the same containers have to be transported.

With regard to the ordering of the meals and beverages, input systems, in particular electronic input systems, for example touch screen monitors (e.g. 12 inch monitors), may be provided in the customer area, for example at the tables. The orders are then passed on by cable and/or radio to a computer system and from there to the kitchen or the working area. It is likewise possible for service staff to take the order and to input it into a mobile electronic ordering device, in order to ensure good and personal service. This ordering device then passes on the order by radio to the working area (the kitchen). The meals and/or beverages are then delivered from there to the tables via the rail system. It is also conceivable only to transport the meals via the rail system and to allow the beverages to be brought to the tables by waiters.

An attractive variant in this respect provides an ordering system between customer area and working area, in particular a cable-pull ordering system, in which order slips are conveyed via a cable-pull system, in particular a mini cableway, from the customer area to the working area, with it preferably being possible for the cable-pull system to be operated from the customer area and/or from the working area. In addition, it is expedient also to make this ordering system, in particular the cable-pull system, useable for issuing the bill to the customers and/or for the payment.

According to a development, the transport system of the proposed restaurant system may also comprise or be a cable system, for example in the manner of a cableway. Loops could also be hung in a guide cable and glide along the cable to the destination. In this case, holders for the containers in which the meals and/or beverages have been or are placed hang on the loops.

The rail system may also be designed as a smooth rail with lateral guide edges. However, it may also be a classical profiled rail on which the containers, which are preferably designed to correspond to the rail profile and/or, if appropriate, are also equipped with suitable edges, travel because of the gradient.

It is also possible for the transport system, in particular the rail system, to comprise ball-bearing conveyors and/or ball-bearing belts and/or roller belts and/or belt conveyors. As a result, an improved sliding behaviour can be achieved at a lower gradient (small amount of slope).

An expedient development of the restaurant system according to the invention provides that pipelines, preferably tubes or pipes, are arranged and/or formed on the transport system, in particular below the rails and/or laterally on the rails and/or in the rails and/or above and/or below and/or next to coverings of the rails, via which pipelines beverages can be transported from the working area to the customer area, in particular to the tables of the customer area. In particular, tubular rails may also themselves be used as pipelines of this type. A respective tap or valve via which the desired beverage can be drawn off is expediently provided at the end of the pipelines in the customer area. In addition, it is expedient to install a measuring device (for example, in the manner of a water meter) for detecting the quantity of beverage drawn off upstream of each tap or valve in or on the respective pipeline.

As a result, it is possible to transport various beverages, for example beer, wine or water, to the tables and therefore to the customers via a plurality of pipelines without an outlay on service. The actual consumption of the particular customers can then be established via the measuring devices (for example, water meters) and correspondingly billed. Of course, for this purpose, when new customers arrive, the measuring device would have to be either set to zero or the counter state recorded. Of course, the consumption may also be determined, recorded and billed electronically or via a data processing system. As an alternative, of course, billing and therefore water meters may also be omitted. Water (for example) is then made available in an unlimited quantity and without cost to the customer via pipelines of this type as a special service.

An expedient development of the pipeline system for beverages provides that a central distributing point is provided, preferably in the working area, said distributing point supplying the type and quantity of beverage ordered by a customer to the customer area, in particular to the particular table, in one of the pipelines, this supplied type and quantity of beverage being removable preferably via a valve in the customer area, in particular at the particular table. In this case, the customer does not take on the metering of the beverage at the tap. On the contrary, as in a conventional restaurant, the customer orders a certain quantity of a beverage. The metering of this beverage then takes place by the central distributing point from which the ordered quantity is supplied to the table in one of the pipelines. The advantage of this system resides, in particular, in the fact that the particular pipeline is empty again after removal of the beverage. For example, different types of wine can be conducted through one pipeline, different types of beer through another line, and different, non-alcoholic beverages through a third line. The customer simply removes the quantity, which has been previously metered by the central distributing point, from a valve or tap at the table, for example by operating a button (or a corresponding switch) provided for this purpose. After the beverage has been removed, it is expedient to provide for the tap or the valve to automatically close again in order to prevent the liquid from simply running out of the tube or tap or valve during the next metering operation. In order to signal to the customer that the ordered beverage is ready in the pipeline for removal, it can be provided that the button or the switch which is to be operated for the removal illuminates, to be precise, until the beverage has been completely removed. In addition, a further valve is expediently provided which prevents the central distributing point from placing a further beverage in the pipeline if the beverage has not yet been completely removed.

In a particularly advantageous embodiment, it is provided to flush the used pipeline with water, preferably directly after the liquid or the beverage has been removed. This can take place, for example, in that in addition to the removal valve, from which the customer can decant the beverage, at the end of the pipeline, a further valve is provided which is opened for the flushing operation and through which the "flushing water" is conducted out of the supply pipeline for the beverages and is finally conducted via a return pipeline into the sewerage system.

According to a development of the restaurant system according to the invention, it is provided that the customer area or part of the customer area is divided into a plurality of subareas which are offset in a stepped manner with respect to one another in the manner of a spiral staircase, the individual subareas being able to be supplied with meals and/or beverages via branch lines from a main transport route and/or via a plurality of transport routes of the transport system that are arranged one above another and/or next to one another.

According to a variant, the customer area or part of the customer area may be a drive-in area, in particular a drive-in area with parking spaces, at which rail lines and/or rails of the transport system end.

The transport system is advantageously designed for a targeted and automatic transport of meals and/or beverages into the customer area, in particular to the table of a customer for whom the meals and/or beverages are intended.

According to a development of the restaurant system according to the invention, said transport system is at least partially controlled by information technology (IT, including hardware and software) in which, preferably, in addition to the transport of the meals and beverages, other restaurant tasks, in particular an ordering system and/or a payment system, are also integrated. In a variant, it can also be provided that the IT system of the restaurant specifies to the staff member working in the working area on which transport route or rail line the meals and/or beverages to be transported are to be placed, for example by means of a corresponding inquiry made by the staff member and/or by means of illumination of a signal lamp at a correct transport route or rail line. The associated inquiry may take place manually or by reading of a bar code attached to the container for meals and/or beverages and/or by reading an RFID chip attached to the container for meals and/or beverages, in each case via suitable scanners. The IT system of the restaurant can furthermore also take on the control of the branch lines and/or switching points of the transport system, inter alia including data supplied with the aid of information items attached to the container for meals and/or beverages, for example in the form of a bar code or deposited on an RFID chip. It may also be provided that the correct delivery in the customer area can be checked with the aid of the IT system of the restaurant.

Figure 2:
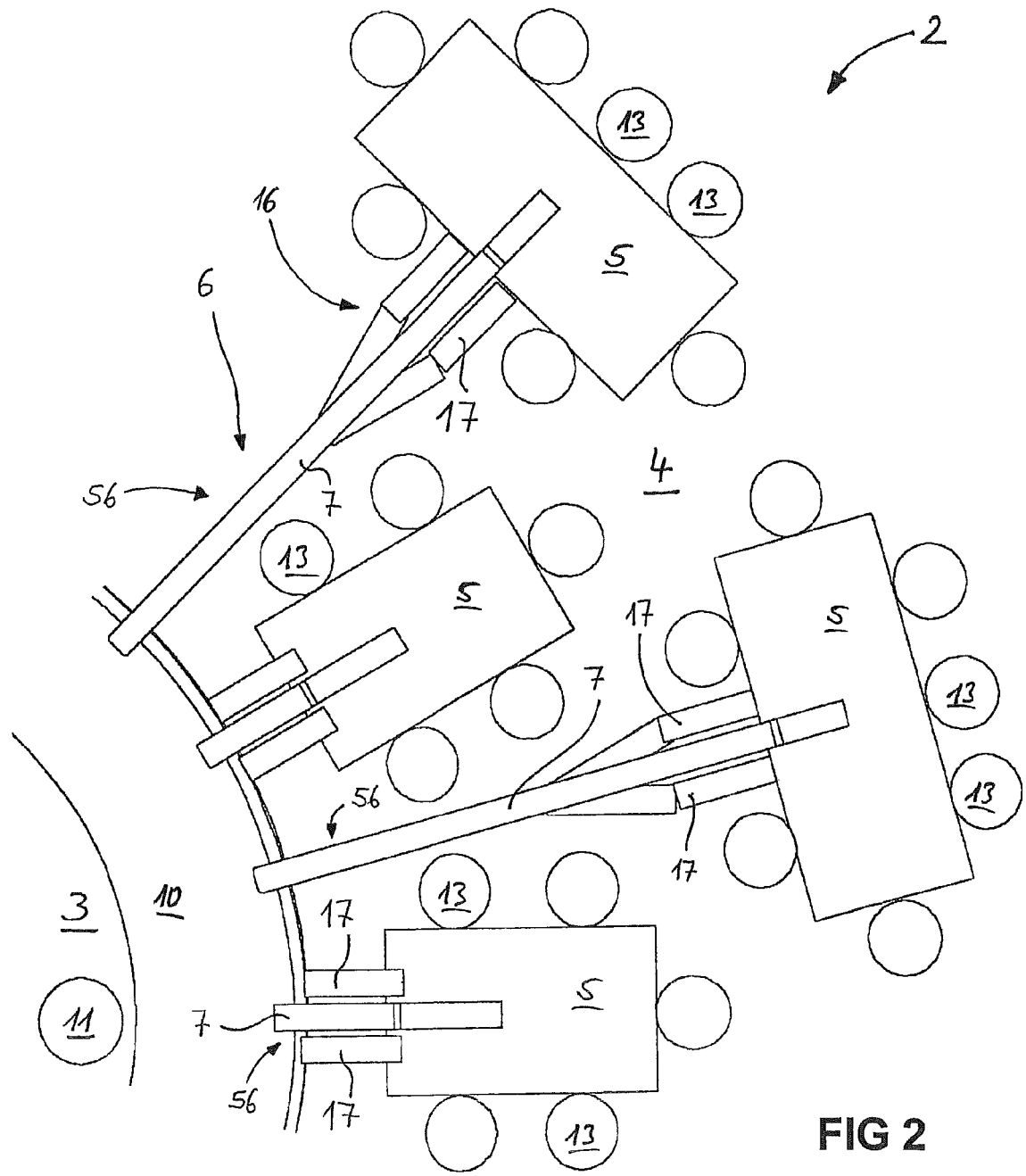
Figure 3:
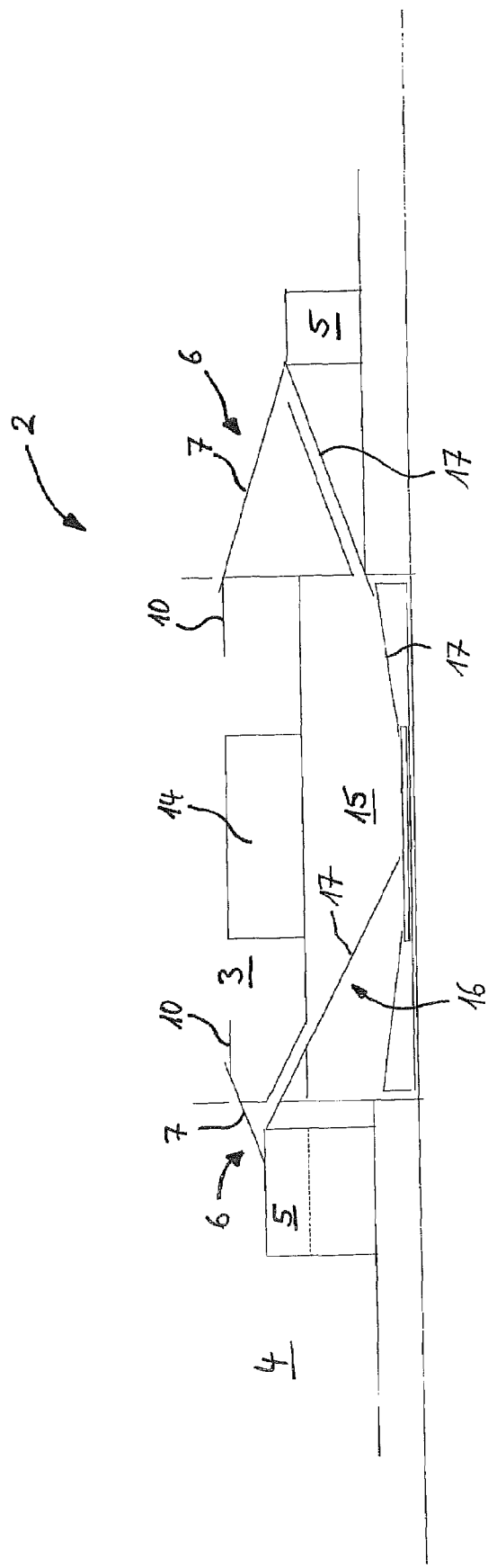
Figure 4:
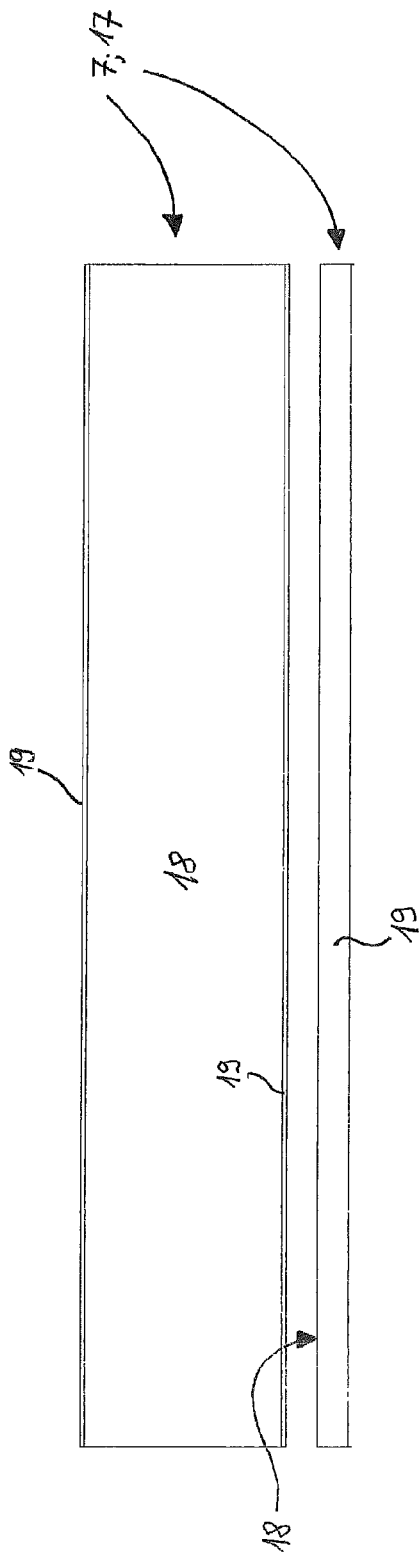
Figure 5:
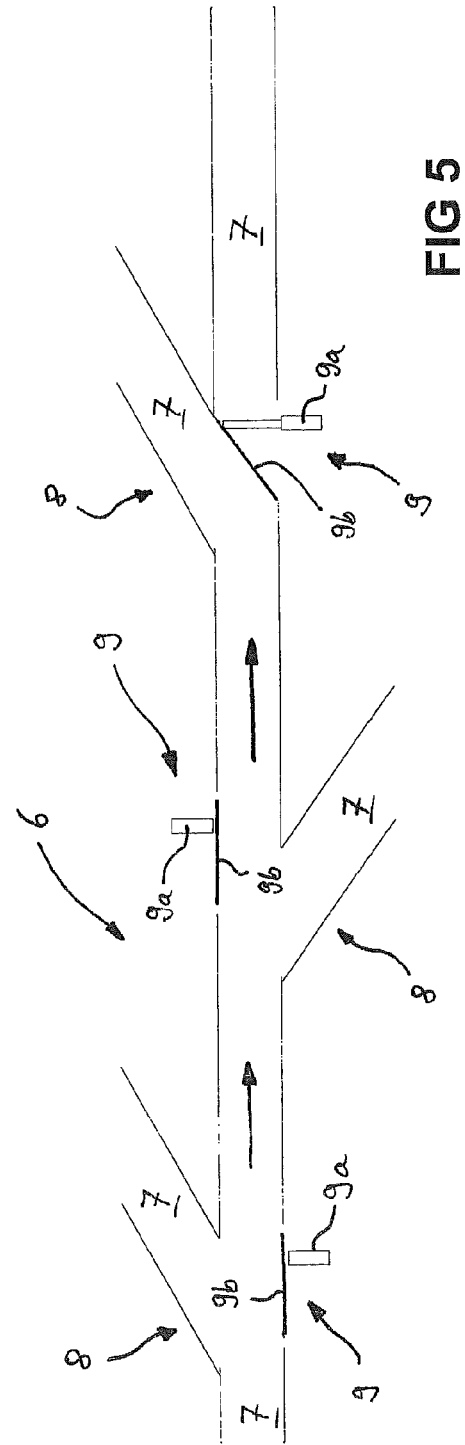
Figure 6:
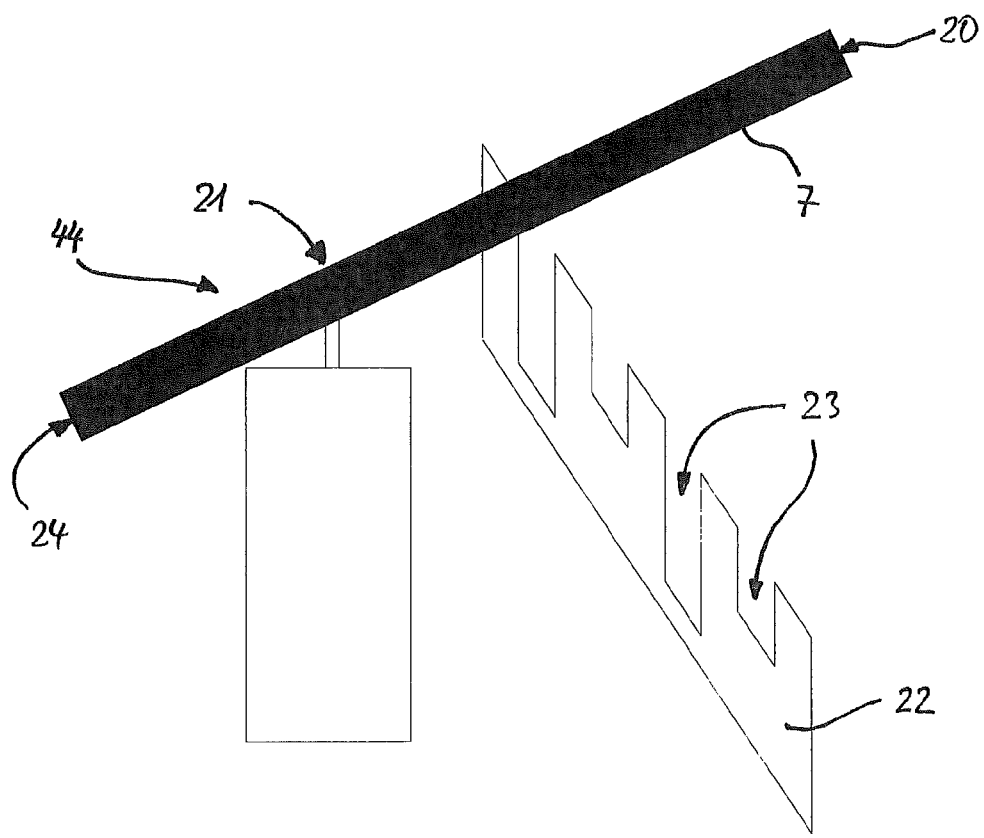
Figure 7:
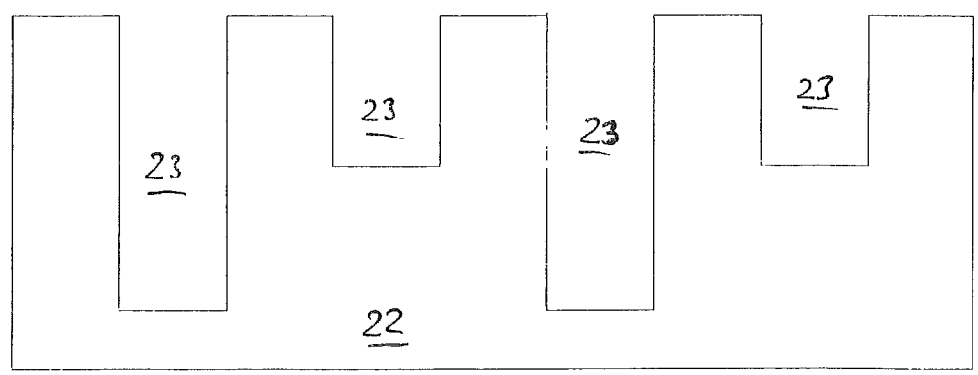
Figure 8:
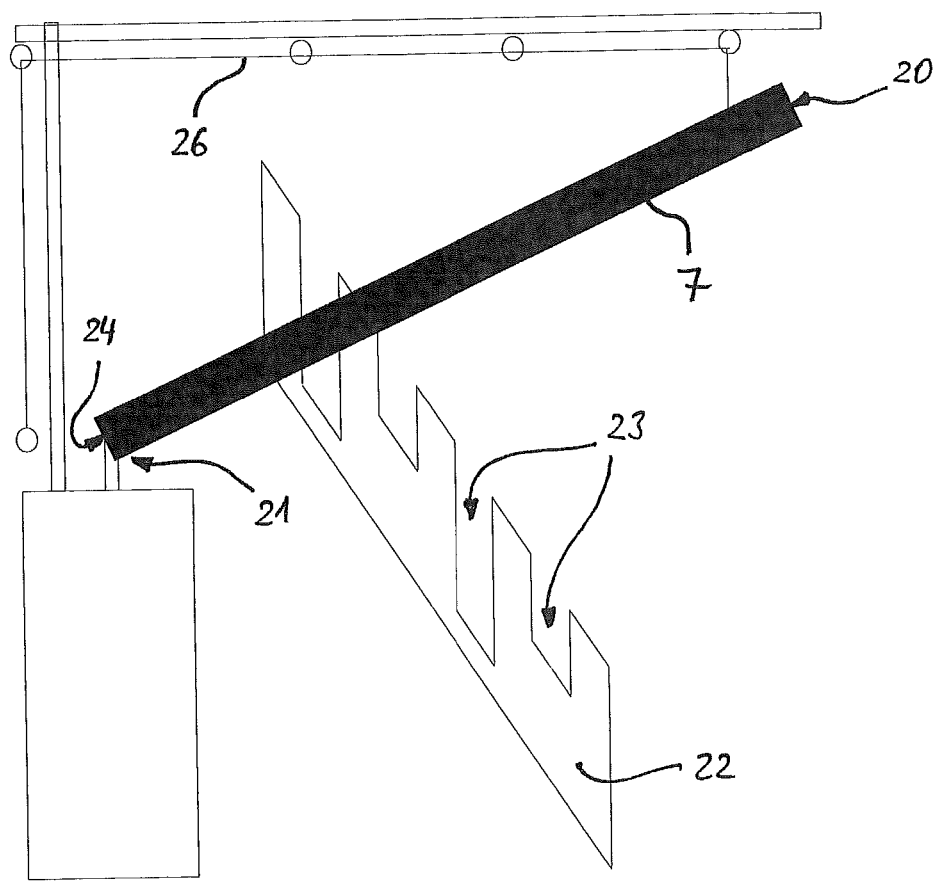
Figure 17:
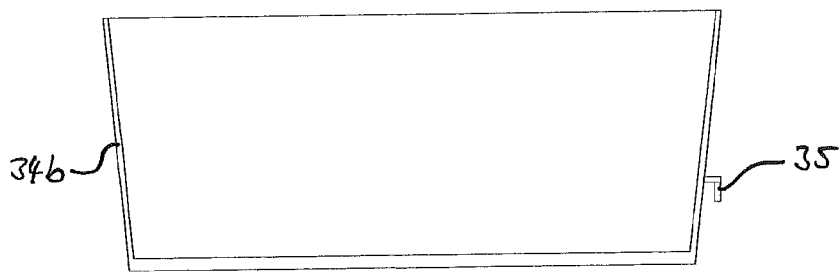
Figure 18:
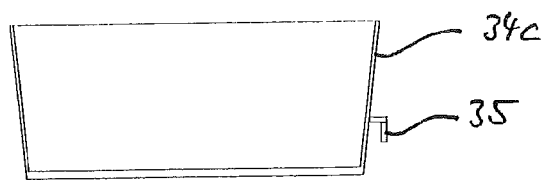
Figure 19:
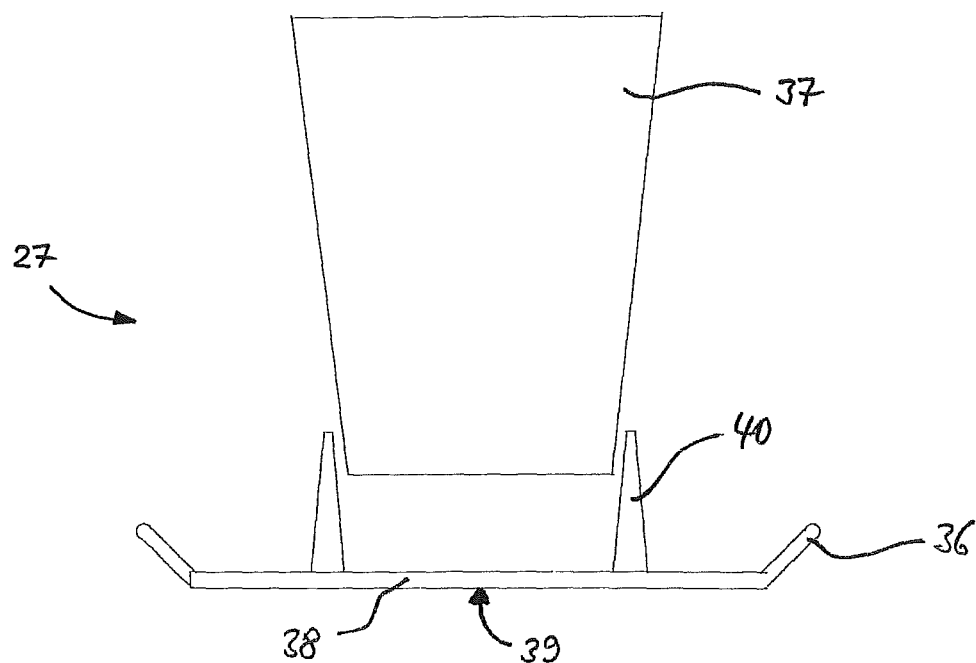
Figure 20:
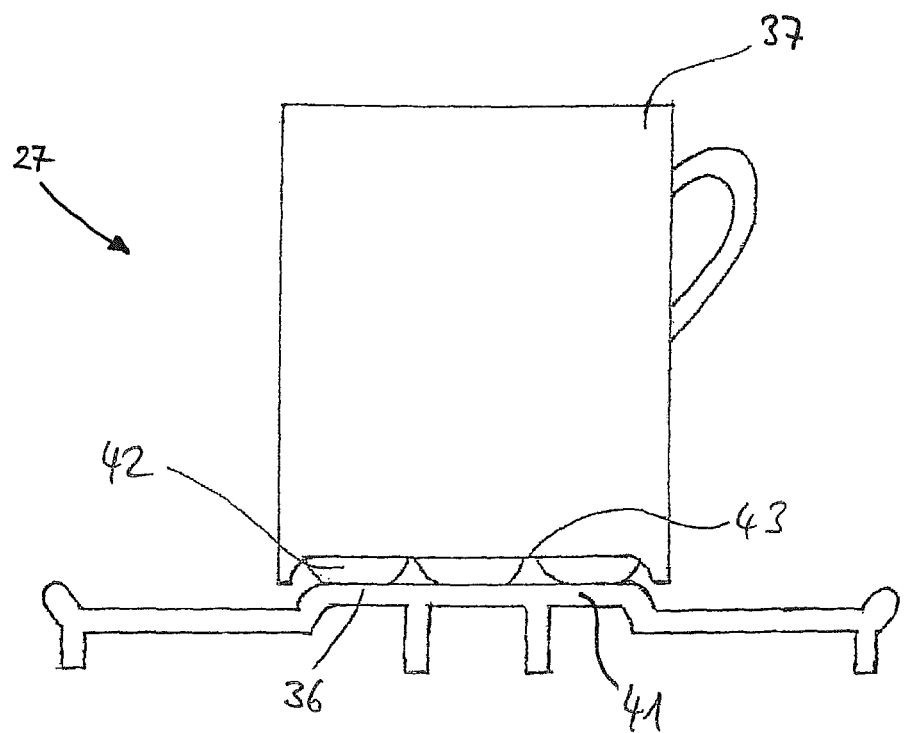
Figure 21:
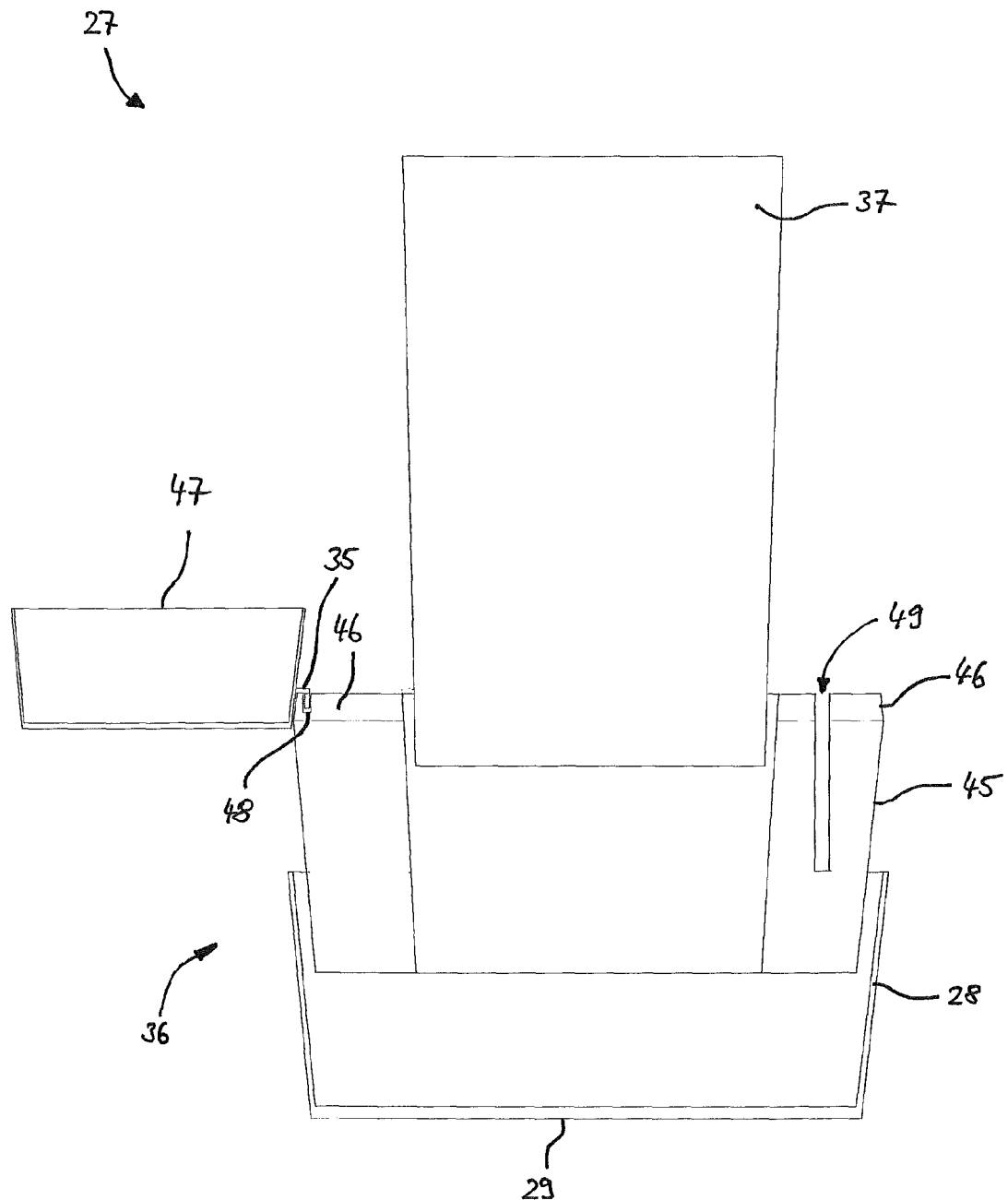
Figure 22:
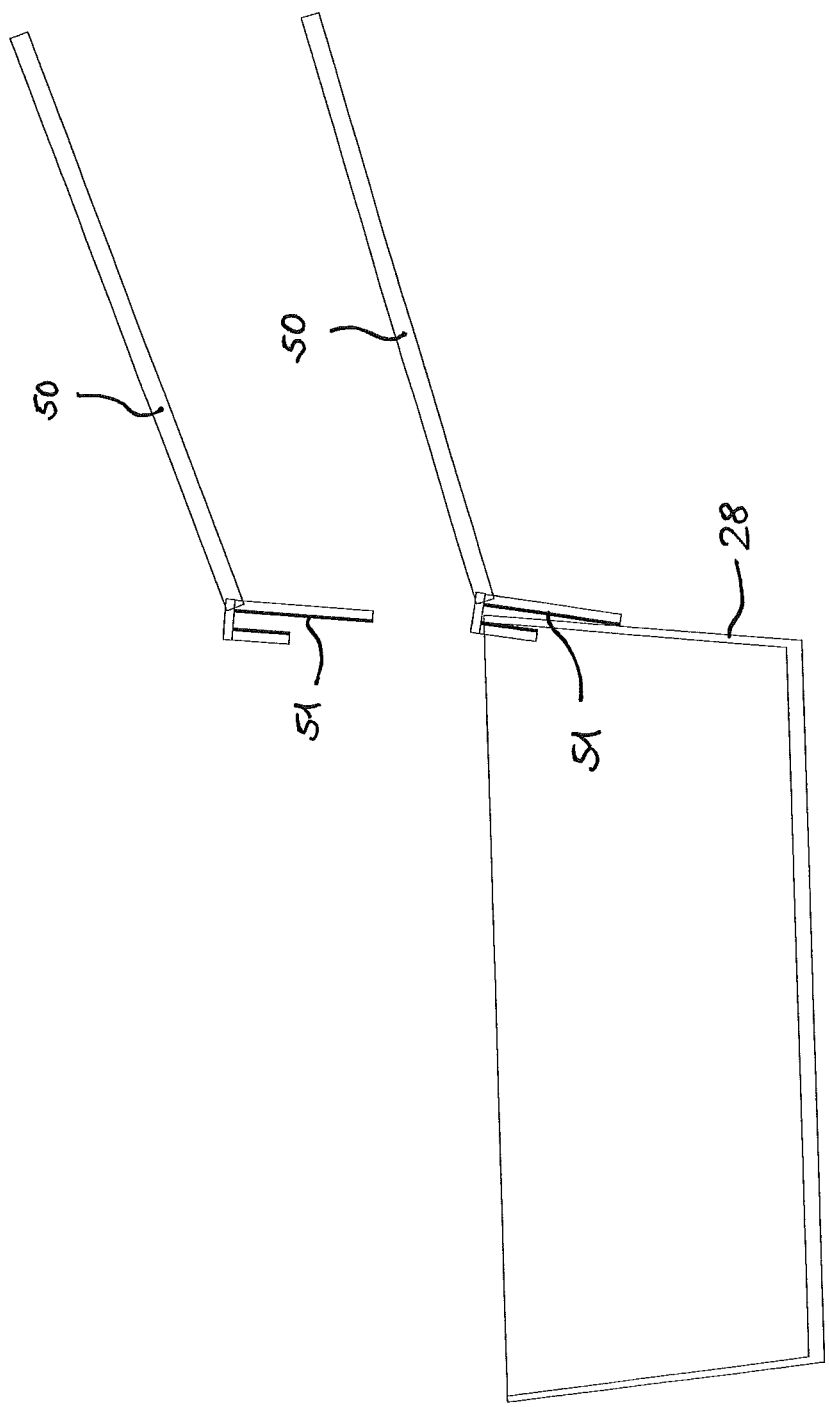
Figure 23:
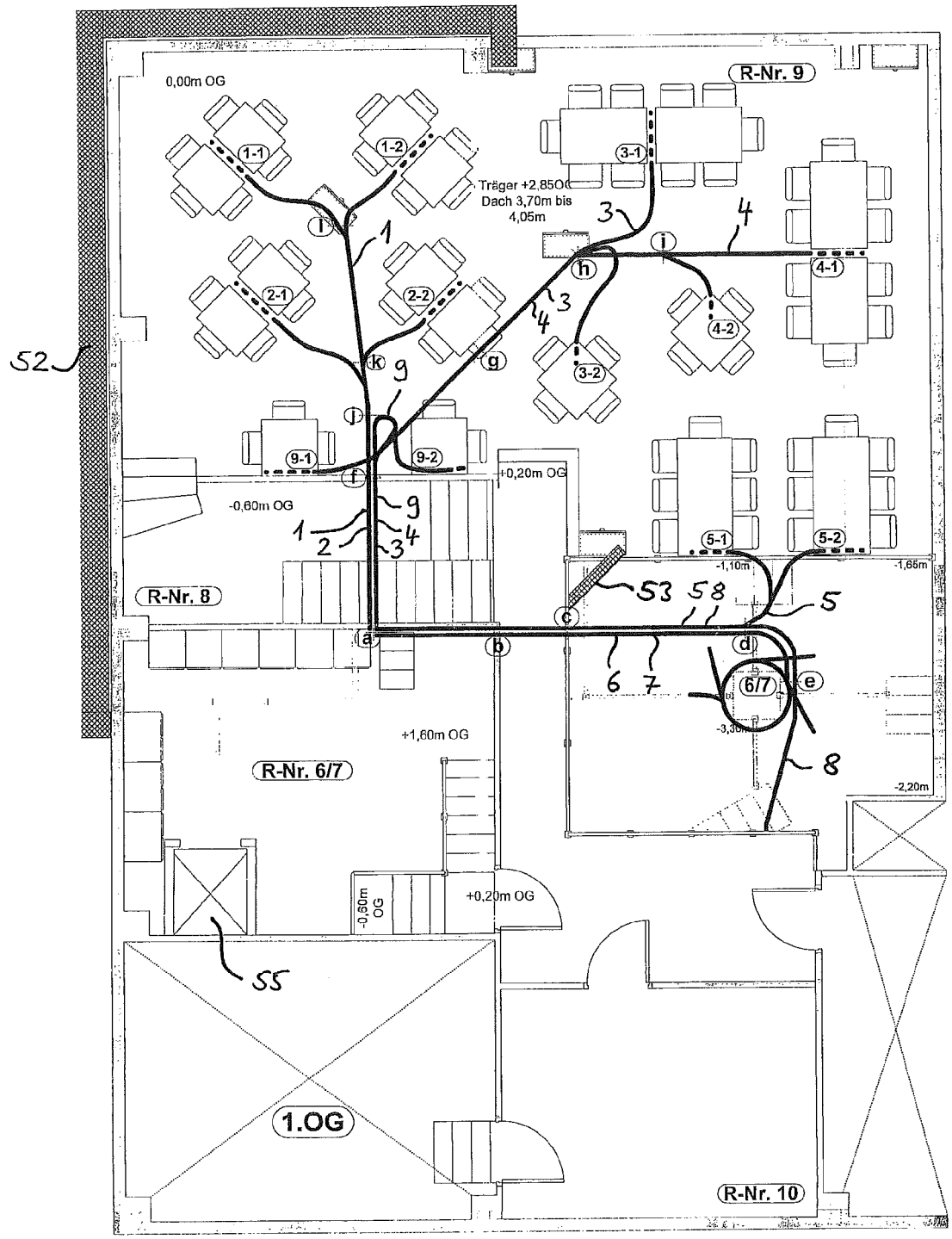
Figure 24:
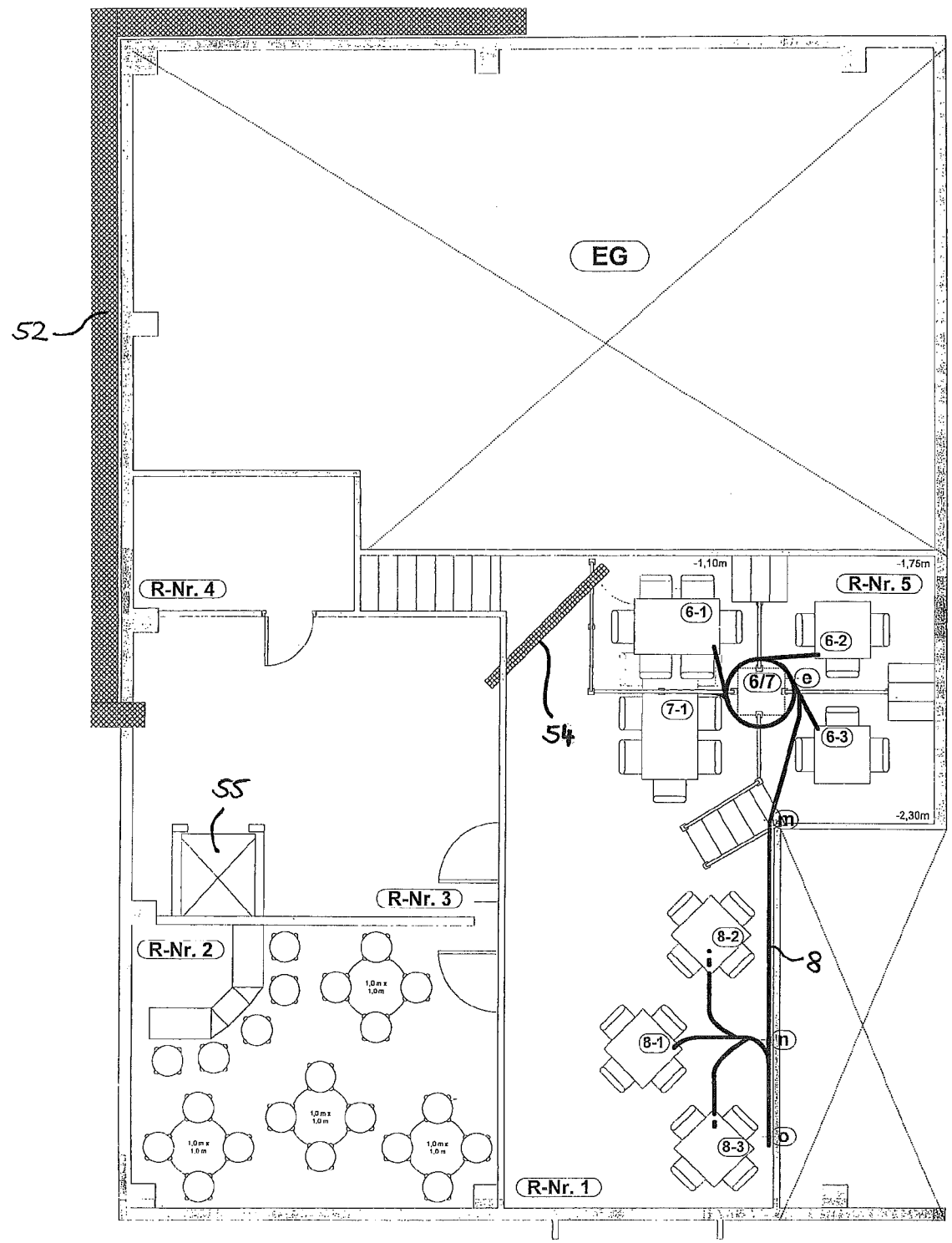
Figure 25:
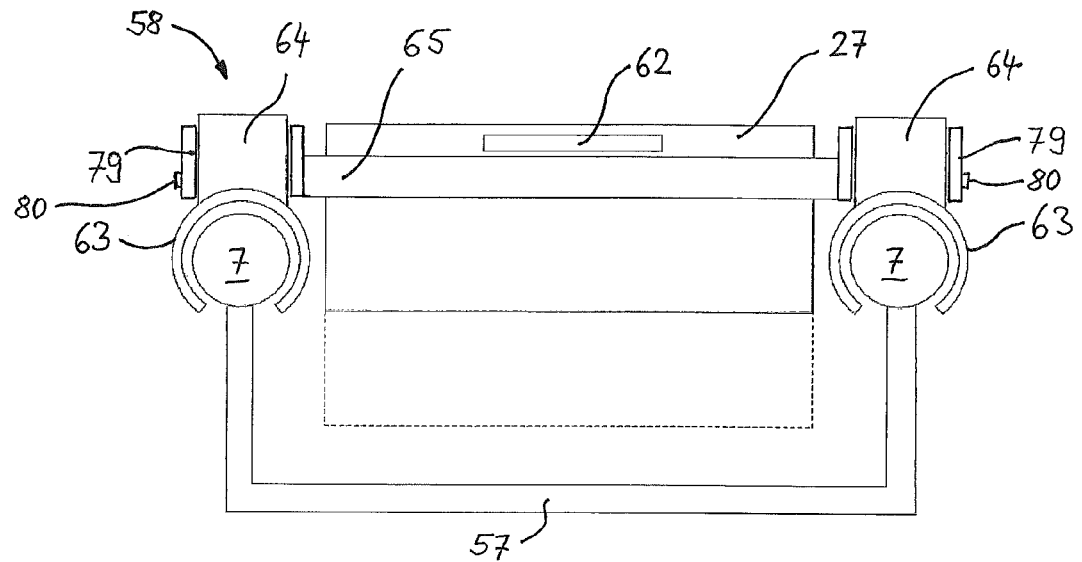
Figure 26:
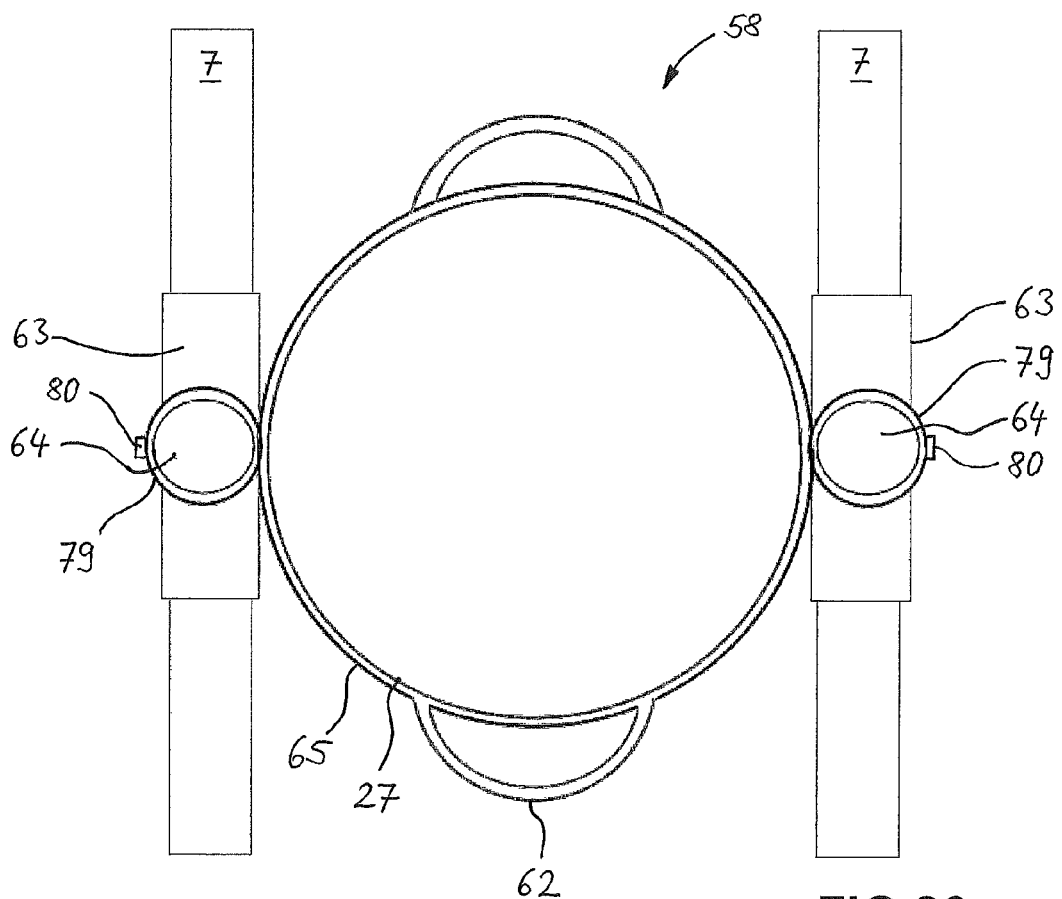
Figure 27:
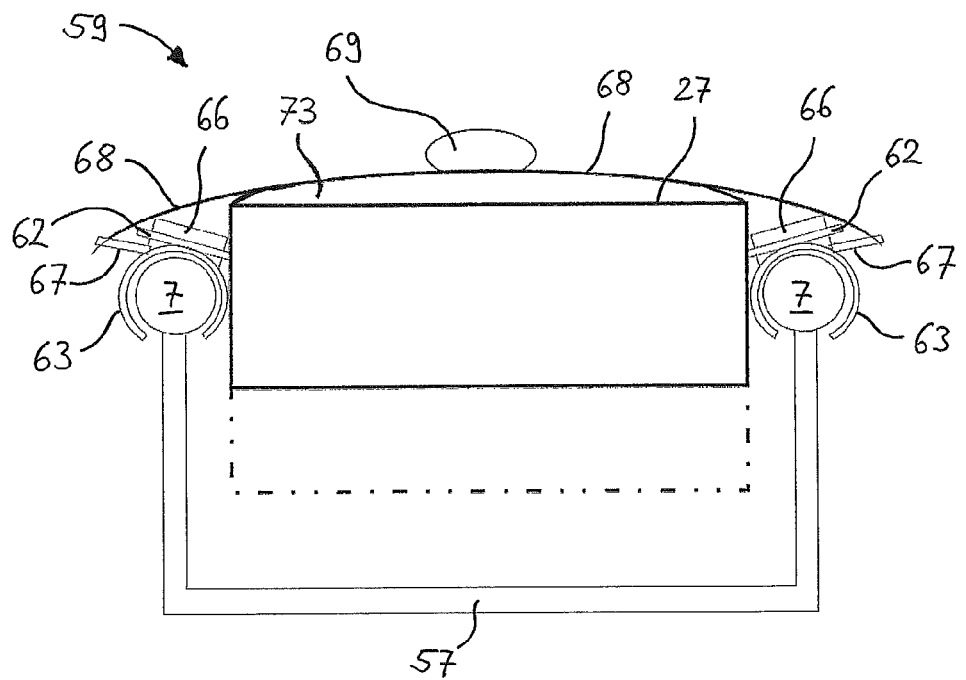
Figure 28:
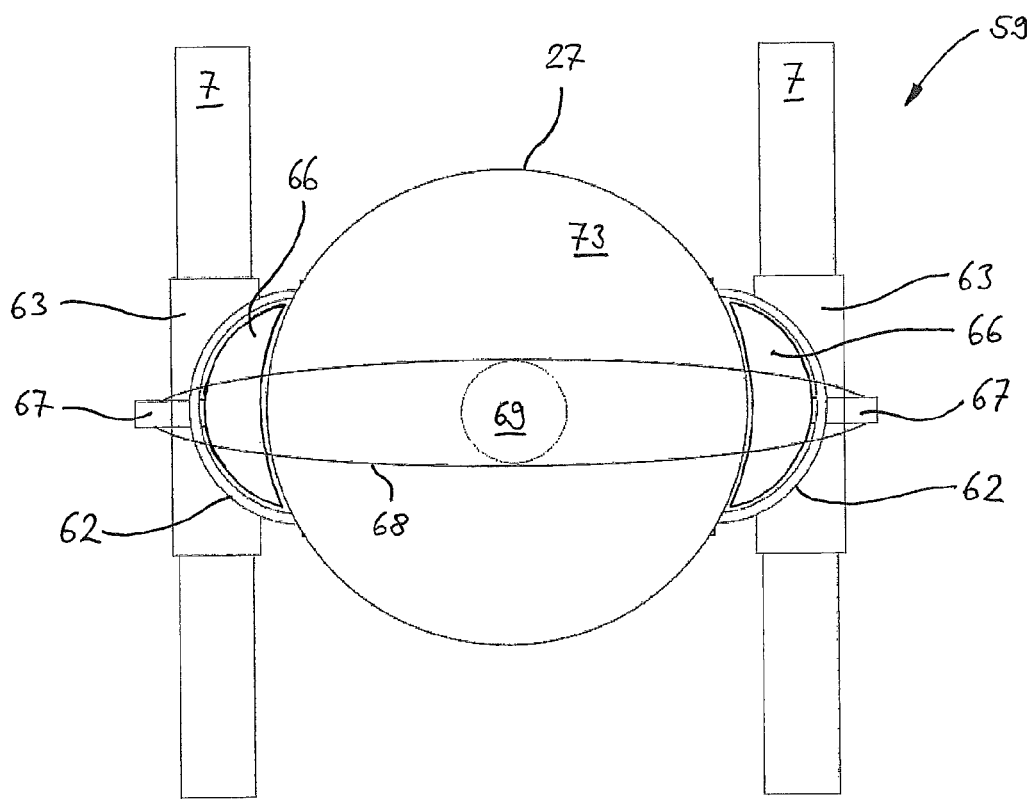
Figure 29:
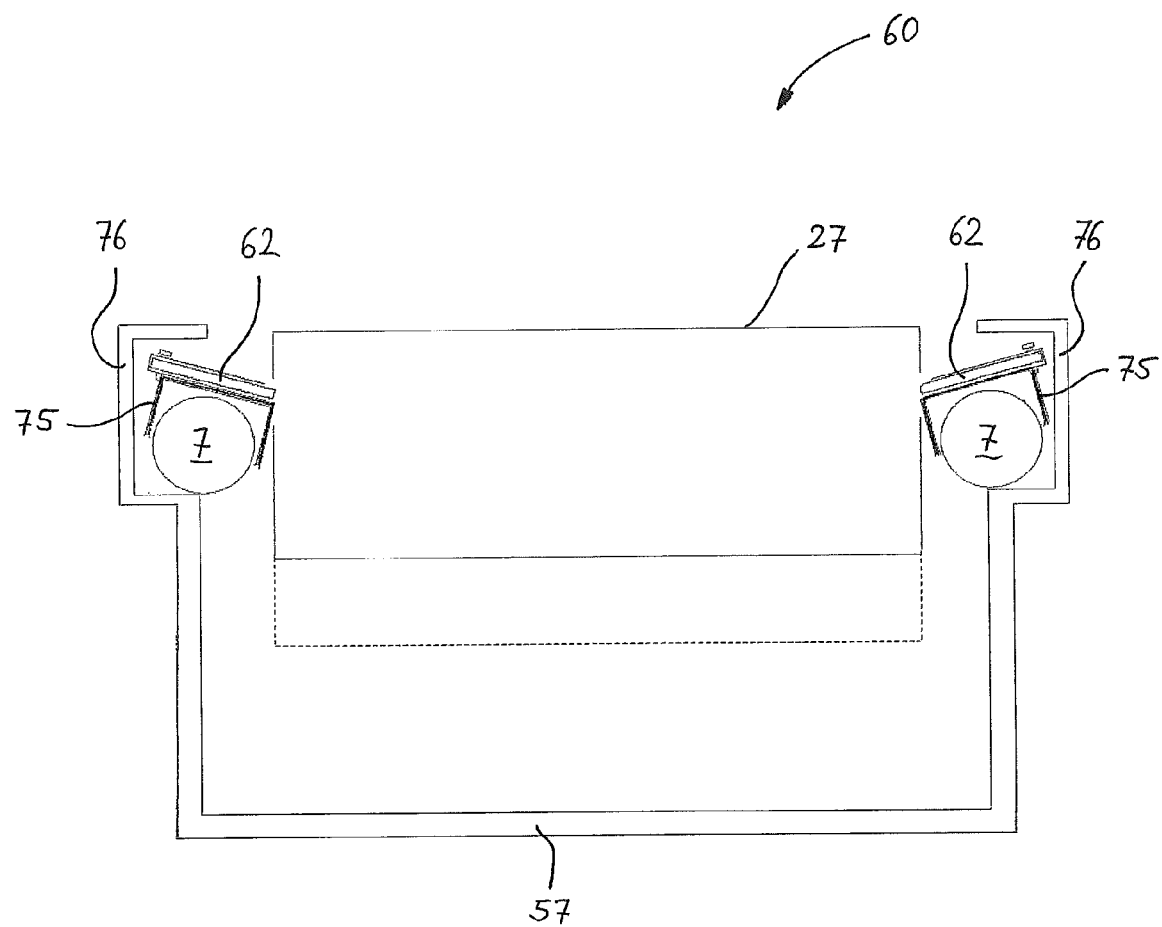
Figure 30:
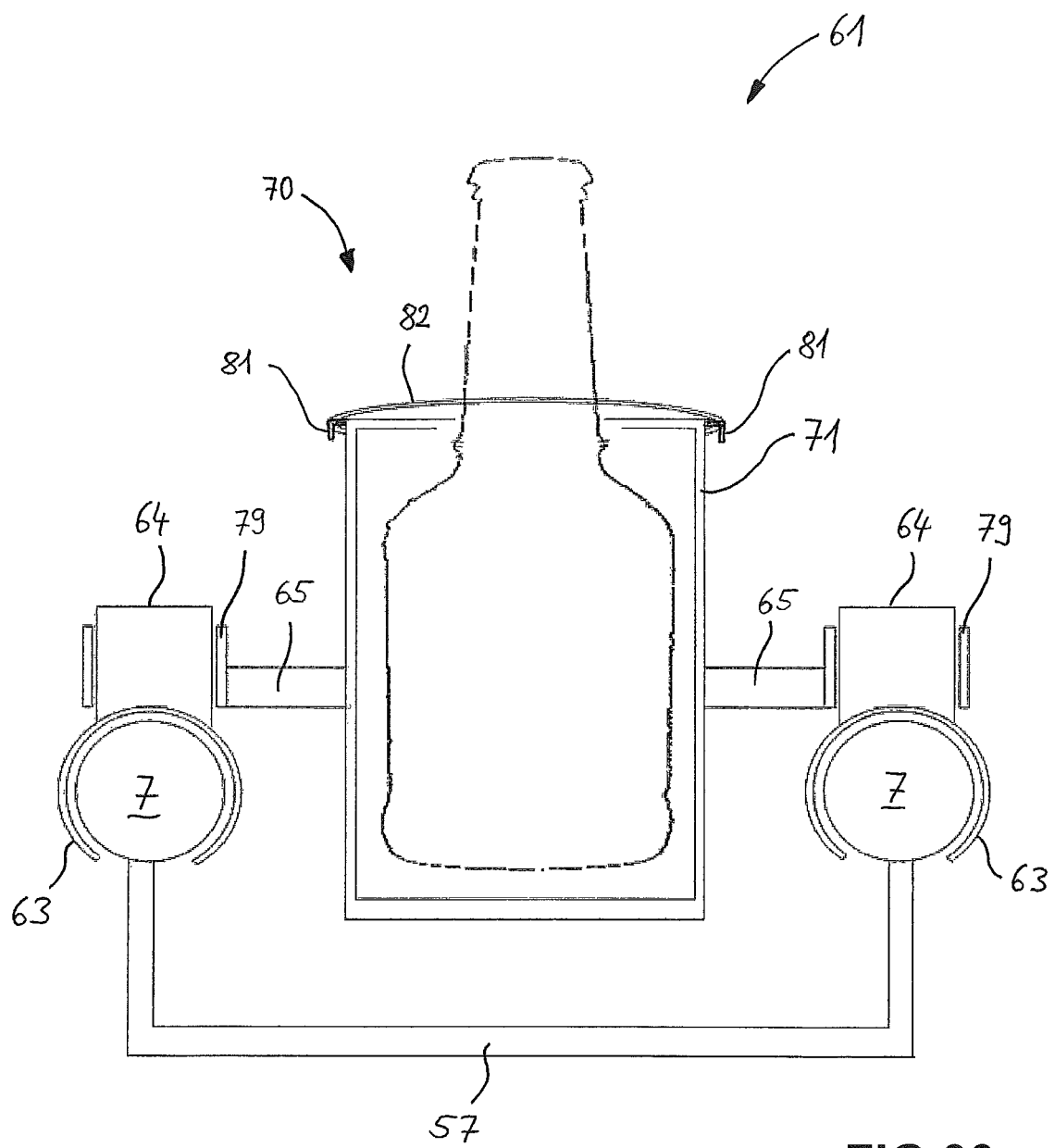
Figure 31:
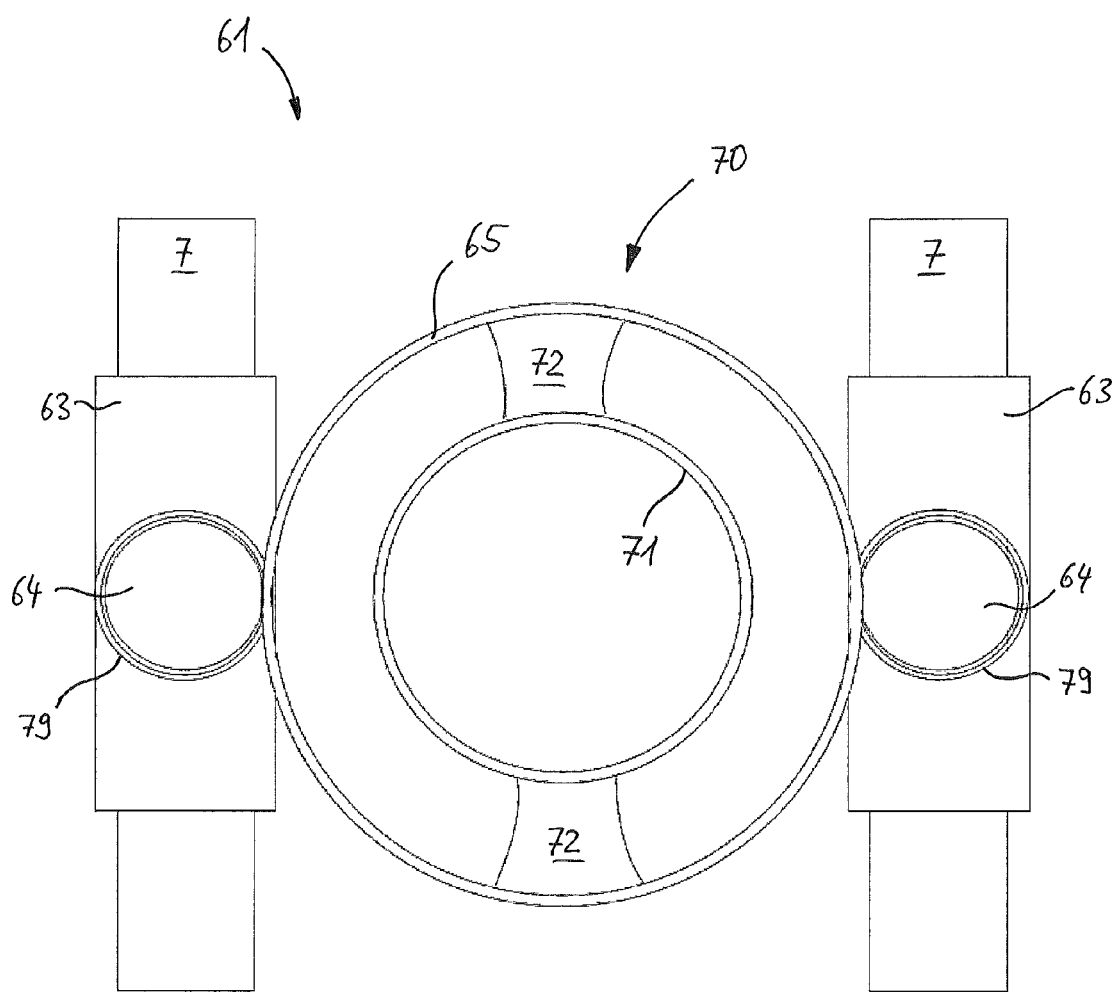

The invention is explained in more detail below also in respect of further features and advantages using the description of exemplary embodiments and with reference to the attached drawings, in which FIG. 1 shows a schematic plan view of an exemplary embodiment of the restaurant system according to the invention, FIG. 2 shows an enlarged detail view of an excerpt from FIG. 1, FIG. 3 shows a sectional illustration along the line A-A in FIG. 1, FIG. 4 shows in a schematic illustration, in plan view in the upper region of the figure and in side view in the lower region of the figure, an exemplary embodiment of a rail for a restaurant system according to the invention, FIG. 5 shows, in a schematic illustration, an exemplary embodiment of a rail system with switching points, FIG. 6 shows, in a schematic illustration, an exemplary embodiment of a moveable rail, FIG. 7 shows, in a schematic illustration, the guide grid from FIG. 6 in an enlarged side view, FIG. 8 shows an alternative exemplary embodiment of FIG. 6 for a moveable rail, FIG. 9 and FIG. 10, and also FIG. 11 and FIG. 12 each show, in a schematic illustration in plan view and in side view, two different rail systems for overcoming large height differences, FIG. 13 to FIG. 18 show, in a schematic illustration, various exemplary embodiments of containers which are suitable for transportation on the rail system and are intended for receiving meals, in particular, FIG. 19, FIG. 20 and FIG. 21 show, in a schematic illustration, three exemplary embodiments of containers which are suitable for the transportation in particular of beverages on the rail system, FIG. 22 shows a handle for dishes, FIG. 23 and FIG. 24 show a concrete use of an exemplary embodiment of a restaurant system according to the invention, to be precise in an industrial or business building, FIG. 25 and FIG. 26 show, in side view and plan view, respectively, an exemplary embodiment for a transport aid for a restaurant system according to the invention, FIG. 27 and FIG. 28 show, in side view and plan view, respectively, a further exemplary embodiment for a transport aid for a restaurant system according to the invention, FIG. 29 shows, in side view, a further exemplary embodiment for a transport aid for a restaurant system according to the invention, FIG. 30 and FIG. 31 show, in side view and plan view, respectively, a further exemplary embodiment for a transport aid for a restaurant system according to the invention, FIG. 32 shows, in side view, an exemplary embodiment of a branch-line and switching-point system for a restaurant system according to the invention, FIG. 33 shows the branch-line and switching-point system according to FIG. 32 in a sectional illustration along the line A-A, FIG. 34 shows a further exemplary embodiment of a branch-line and switching-point system for a restaurant system according to the invention, and FIG. 35 shows a further use of an exemplary embodiment of a restaurant system according to the invention.

Mutually corresponding devices and components are provided with the same reference numbers in FIG. 1 to FIG. 35.

FIG. 1 shows a schematic plan view of an exemplary embodiment of the restaurant system 2 according to the invention, FIG. 2 shows an enlarged detailed view thereof, and FIG. 3 shows a sectional illustration along the line A-A in FIG. 1.

A working area 3 for cooking and/or preparing meals and/or beverages is located in the centre of the restaurant system 2. Said working area comprises a virtually annular working counter 10 and a central counter 14. All of the appliances required for cooking and preparing meals and beverages can be accommodated in the working area 3, for example cookers in the working counter 10 and refrigerators in the central counter 14. The staff working in the working area 3 are illustrated symbolically by reference numbers 11.

The working area 3 is surrounded annularly by a customer area 4, the working area 3 being delimited from the customer area 4 by the working counter 10. In this case, the working area 3 is arranged at a higher level than the customer area 4 (cf. FIG. 3). Access to the working area 3 arranged centrally in the restaurant system 2 is made possible via the staircase 12 leading up from the level of the customer area 4 to the working area 3. The customer area 4 has numerous tables 5 which are likewise arranged around the working area 3 in a circular manner, to be precise on two circles, arranged concentrically with respect to each other, with a different radius. The positions around the tables 5 which can be taken up by the restaurant customers are designated symbolically by the reference number 13.

Working area 3 and customer area 4 are connected via a transport system, designed as a rail system 6, for meals and/or beverages. Said rail systems 6 is designed in order to transport meals and/or beverages from the working area 3 to the customer area 4. It is composed of individual rail lines 56 to the respective tables 5, which rail lines in turn are formed from individual sliding rails 7 which are produced, for example, from metal and/or wood and/or plastic. The rail lines connecting the working area 3 to the customer area 4 each begin on or next to the working counter 10 and end next to or on the tables 5, which may also be located on different levels.

The transportation of the meals and beverages, which are customarily provided in suitable containers for this, does not take place by means of an electric drive but rather on account of gravity which, owing to the height difference between working area 3 and customer area 4, acts on the containers and moves them along the sliding rails 7. The rail system 6 can therefore also be referred to as a sliding or gliding system, and the rails 7 are chutes for the containers with the meals and/or beverages. The containers with the meals and/or beverages slide or glide from their dispatch point at the working counter 10 in the working area 3 to the tables 5 in the customer area 4.

It can be seen in the sectional illustration in FIG. 3 that the restaurant system 2 additionally has a cleaning and/or waste-disposal area 15. The latter is arranged below the working area 3 and is located at a lower level than the customer area 4.

Customer area 4 and cleaning and/or waste-disposal area 15 are connected to each other via a removal system 16 for contaminated and/or used containers, for example tableware (also pots and/or pans) and/or glasses and/or tumblers and/or transport aids, and/or table waste. The removal system 16 is designed and intended to transport contaminated and/or used containers, in particular tableware and/or glasses and/or tumblers and/or transport aids, and/or table waste from the customer area 4 to the cleaning and/or waste-disposal area 15. The removal of the contaminated and/or used containers and/or table waste from the customer area 4 to the cleaning and/or waste-disposal area 15 via the removal system 16 does not take place electrically but rather, as in the case of the rail system 6, by means of gravity. The height difference between customer area 4 and cleaning and/or waste-disposal area 15 is used to move the items downwards in the removal system 16.

The removal system 16 is a removal rail system 16, comprising a plurality of sliding rails 17. It corresponds in respect of its dimensions, in particular cross-sectional dimensions, and/or its sliding properties to the rail system 6 of the transport system. In the case of the tables 5 illustrated, the central rail is in each case a rail 7 of the arrival rail system, and the two outer rails are each sliding rails 17 of the removal system 16. In the case of some tables 5, these two removal sliding rails 17 are brought together below the arrival rail 7 to form a common removal sliding rail 17.

Of course, the restaurant system illustrated in FIG. 1 to FIG. 3 can also be formed without a cleaning and/or waste-disposal area 15 and/or without a removal system 16. In this case, the used containers and the table waste is carried away in a conventional manner by waiters. Mixed forms are also conceivable, in which waiters carry away the used containers and table waste and bring them to dispatch points of the removal system.

FIG. 4 shows, in a schematic illustration, in plan view in the upper figure region and in side view in the lower figure region, an exemplary embodiment of a sliding rail 7 or 17 for a restaurant system 2 according to the invention. The sliding rail 7 or 17 is an elongated object. On its upper side which faces the observer, it has a planar sliding surface 18 which is provided with lateral guide edges 19 parallel to the longitudinal extent of the sliding rail 7 or 17. The guide edges 19 ensure that the containers moving over the sliding surface 18 do not fall off the sliding rail 7 or 17. A typical sliding-rail width is 120 mm or 150 mm, with any other desired dimensions also being possible.

FIG. 5 shows, in a schematic illustration, an exemplary embodiment of a rail system 6 with branch lines 8 and switching points 9. In the transport direction (illustrated by an arrow), the rail 7 has a plurality of branch lines 8 which lead away from the main transport direction to individual tables or to individual seats at the tables. The individual branch lines 8 can each be activated in a targeted manner via an associated switching point 9, in particular an electrically and/or pneumatically and/or hydraulically operated switching point 9. Each switching point 9 comprises an adjustment member 9a (a piston) and a guide element 9b. If deflection from the main transport direction is desired, the adjustment member 9a moves the guide element 9b into the rail 7 in such a manner that containers gliding along it are guided automatically into the branch line 8.

FIG. 6 and FIG. 8 show, in a schematic illustration, two different exemplary embodiments of a moveable rail 7. The rail 7 is in each case moveable in the vertical direction about a pivot point 21 (rotary mounting of the rail 7 at this pivot point), i.e. that end 20 of the rail 7 which faces the customer area 4 can be raised and can be set down again on or at a table.

Furthermore, the rail 7 can be rotated (or: can be pivoted) in the horizontal direction, in particular likewise about the pivot point 21. This means that, by corresponding horizontal pivoting, the rail 7 can be brought in a targeted manner to face different tables and therefore, with appropriate adjustment of the rail, just one rail can be used to supply a plurality of tables with meals and beverages. Since it is not desirable that the rail 7 can be rotated horizontally in a lowered position, a guide grid 22 is furthermore provided. The guide grid 22 is illustrated in enlarged form in FIG. 7. It is a board or a framework or a template with recesses 23 at the points at which the rail 7 is to be vertically lowerable. The depth of the recesses 23 is designed in such a manner that, when fully lowered, the rail is arranged in the desired position at the particular table. The guide grid 22 not only prevents horizontal rotation of the rail 7 in a lowered position, it also ensures exact positioning of the rail 7 with respect to the particular table. The movement of the rail 7 can preferably be controlled from the working area 3.

In the variant embodiment according to FIG. 6, the movement of the rail 7 functions in the manner of a rocker, i.e. a rocker mechanism 44 is provided. Pressure on that end 24 of the rail 7 which faces the working area 3 causes the opposite rail end 20 to be raised. The rail 7 is subsequently brought horizontally into the desired position with respect to a table to be served and is lowered into the corresponding recess 23 of the guide grid 22. In order to facilitate the manoeuvrability of the rocker mechanism 44, weights (not illustrated) may be attached to that end 24 of the rail 7 which faces the working area 3.

In the variant embodiment according to FIG. 8, the vertical movement of the rail 7 is initiated via a cable pull 26, in the manner of a crane. In the raised state, the rail can again be positioned horizontally. The lowering into the desired recess 23 of the guide grid 22 takes place subsequently, in turn via the cable pull 26.

In both variant embodiments, it is important that the horizontal rotational movement of the rail 7 can take place only in a rail position above the guide grid 22, i.e. above the grid teeth between the recesses 23. As a result, accidents during the horizontal rotation, above all injury to customers, can in particular be prevented. The dimensions and the arrangement of the guide grid 22 are designed and provided in such a manner that, during a horizontal rotational movement, the rail 7 is moved a long way above the customers' heads.

Of course, it can also be provided that all of the described rail movements take place not only manually but also in an electrically or hydraulically driven manner.

FIG. 9 and FIG. 10, and FIG. 11 and FIG. 12 each show, in a schematic illustration, in plan view (FIG. 9 and FIG. 11) and in side view (FIG. 10 and FIG. 12), two different rail systems 6 for overcoming large height differences. Rail systems 6 of this type are required, for example, for restaurants which extend over a number of storeys or which are set up in buildings with high floors or on a number of levels.

Figure 9:
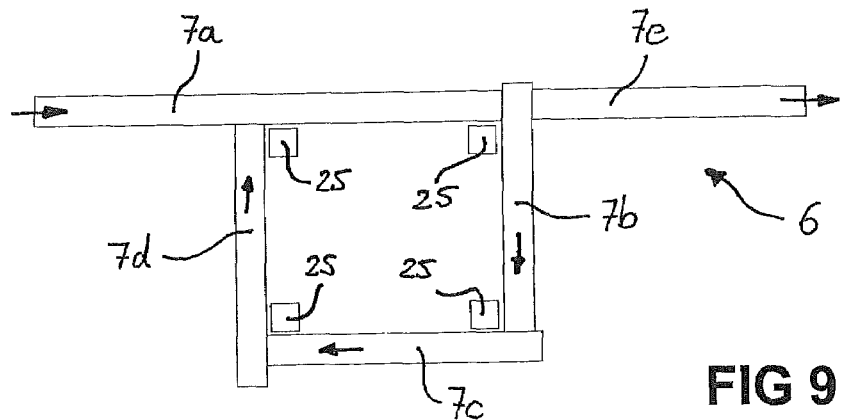
Figure 10:
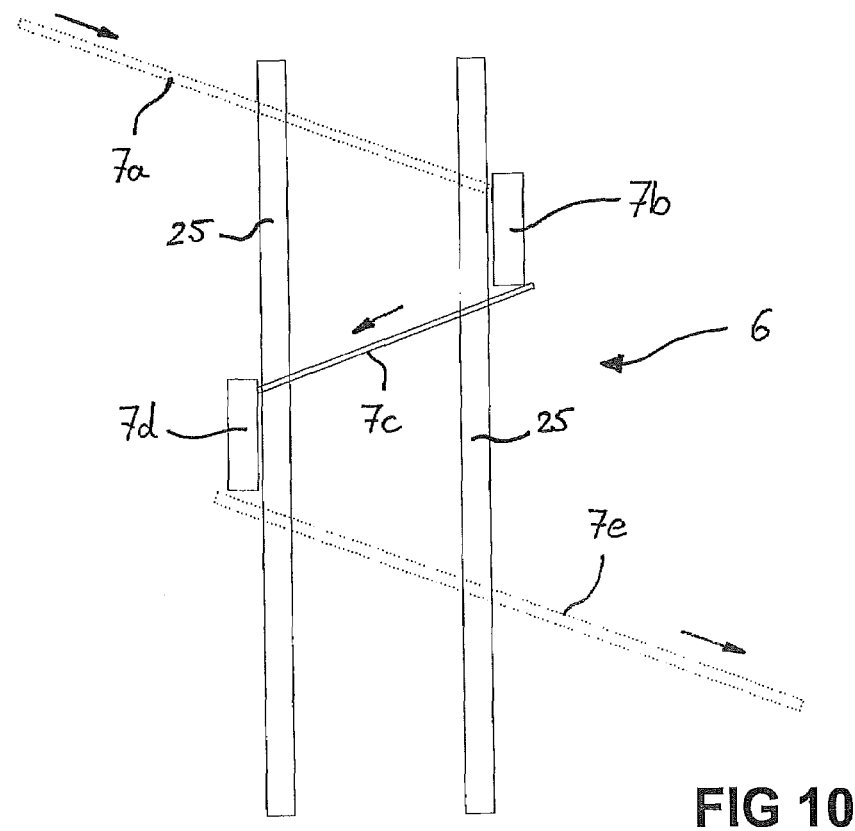

The rail system 6 illustrated in FIG. 9 and FIG. 10 overcomes the height difference by means of a plurality of straight rails 7 arranged in plan view in the form of a polygon, here a square. In this case, the container to be transported drops in each case from the end of a rail 7 to the start of the following rail 7 arranged below it. The individual rails are referred to in FIG. 9 and FIG. 10 by 7a, 7b, 7c, 7d, 7e in order to enable better coordination between FIG. 9 and FIG. 10. The direction of movement of the containers on the rails 7 is indicated in each case by arrows. The frame system 6 is carried by a support framework comprising a plurality of supports 25. If, instead of a square, a polygon with even more corners is formed, then the braking is reduced on account of the change in direction at the rail transitions. The length of the individual rails can therefore be reduced. Also reduced as a result is the production of noise as the containers drop from the upper onto the lower rail.

In a further variant embodiment, it is possible to construct a staircase-like curve, for example from (at least substantially) trapezoidal segments, preferably made of wood, in particular with a thickness of approximately 20 mm, by a segment, always overlapping at the end, being fastened, for example screwed, to the preceding segment. In this manner, a curved structure which is constructed in a manner similar to a spiral staircase is obtained. It can also have a uniform slope. If, for example, a veneer is fastened to the "staircase edges", then a chute is obtained with a gradient, the gradient being dependent on the number of steps (segments) used. If, furthermore, (for example) a veneer is likewise fastened to the insides and outsides of this curved structure as a type of "railing", then a spiral curve for overcoming even relatively large height differences is obtained with simple means.

Figure 11:
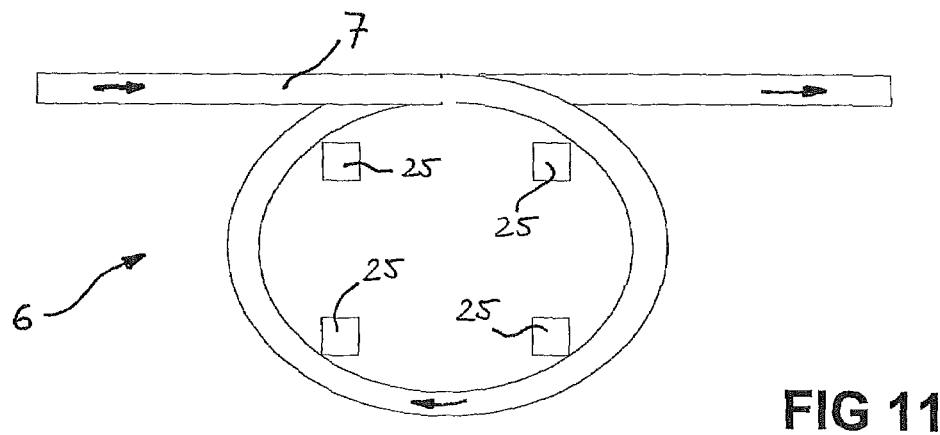
Figure 12:
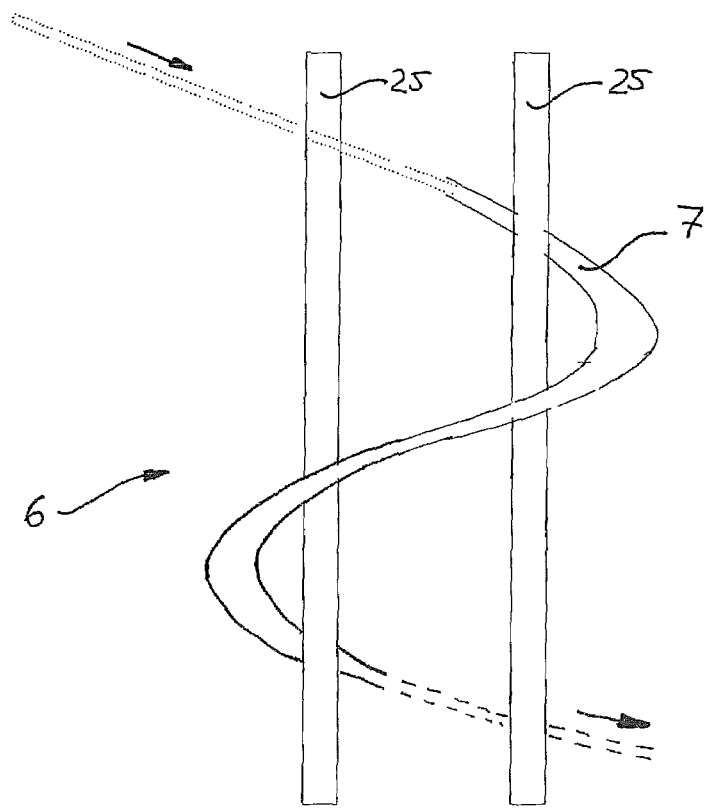

The rail system 6 illustrated in FIG. 11 and FIG. 12 overcomes the height difference by means of a rail 7 winding spirally, i.e. the rail 7 is guided downwards in curves, with the rail 7 having a corresponding angle of inclination or gradient. The direction of movement of the containers on the rail 7 is indicated by arrows. The rail system 6 is again supported by a support system comprising a plurality of supports 25. Depending on the design of the rails and designated slope, a lateral slanting position of the rails may be required here (in the manner of the steep curves of a Carrera track, i.e. a spiral twisted on itself is required) in order to prevent the containers from falling out of the rail. Such complicated structural measures are not required in the design according to FIG. 9 and FIG. 10, i.e. over rectilinear individual rail sections. The spiral rail may be constructed, for example, as described in the previous paragraph.

Of course, in the two variants illustrated in FIG. 9 to FIG. 12, switching points may additionally be provided, via which tables located on the transport route can be served, by targeted deflection of the containers out of the main transport route to the individual tables.

The rail systems 6 illustrated in FIG. 9 to FIG. 12 make it possible to construct a restaurant in the manner of a tower, in which the tables are located on a plurality of levels one above another. The tables may likewise be offset with respect to one another in the manner of the steps of a spiral staircase. For example, a following table could always be located half a meter higher than the preceding table. An extremely practical restaurant system is thus provided which efficiently uses the available space, can be operated in an extremely cost-saving manner via the transport system by means of gravity and is nevertheless extremely comfortable for the customers.

In order to be able to allow the containers for the meals and/or beverages to travel around curves, a curved rail design is basically required. In this case, the curves are to be twisted spirally on themselves in such a manner that the transition to the next straight rail section functions without a problem (this can be visualized as in the case of a spiral staircase and/or in the case of a steep curve of a Carrera track). By this means, a gradient, as in the preceding straight rail section, may also be realized during the curve. However, this may result in relatively high costs during the construction of the rails. An alternative is provided by the variant illustrated in FIG. 9 and FIG. 10, in which the containers drop from a rectilinear rail section onto a next rail section located below it, with the orientation of said rail sections with respect to one another running in an offset manner, in FIG. 9 and FIG. 10 offset in each case by 90 degrees. However, this entails, inter alia, the disadvantage of relatively high sound effects. Furthermore, the above-explained curved construction comprising at least substantially trapezoidal segments, preferably as described, provided, for example, with the veneers mentioned, is therefore an advantageous and at the same time cost-effective alternative.

The abovementioned problems can also be eliminated or at least reduced by the following developments. Firstly, the rail gradient can be designed to be relatively steep before it enters a curve, and then, in the curve itself, the gradient can be comparatively low. In this case, it is possible to dispense with the curve construction in which it is twisted on itself without having to accept the disadvantage of the noise of the above-described solution with the dropping transition between the rail sections. Secondly, in the described polygon comprising straight rail sections offset in terms of height with respect to one another, the offset of the orientation of the rail sections with respect to one another can be correspondingly reduced by a greater number of corners, for example by 8 or 12 corners. As a result, the drop height can be reduced, and therefore the noise during the dropping onto the rail section located in each case below is thereby considerably reduced. Furthermore, such a design can be realized more cost-effectively than a spiral twisted on itself. For example, the curved structure which is explained above and is constructed from at least substantially trapezoidal segments is also suitable here.

Figure 13:
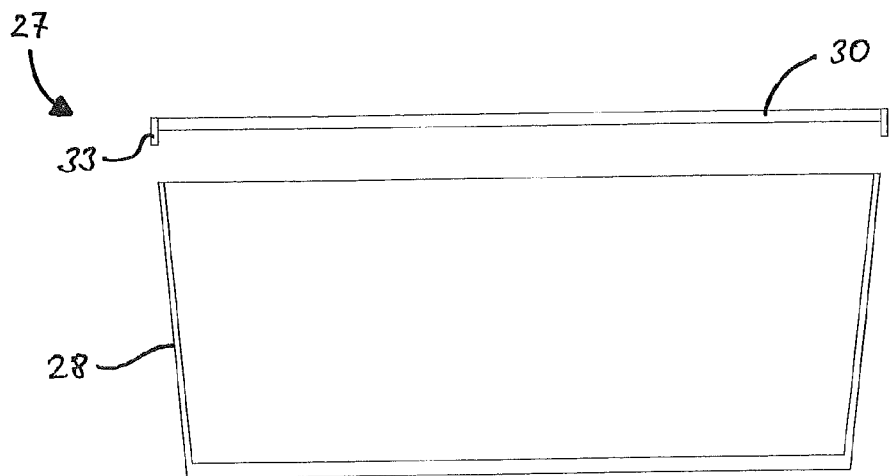

FIG. 13 to FIG. 18 show, in a schematic illustration, various exemplary embodiments of containers 27 which are suitable for transportation on the rail system and are intended for receiving meals, in particular. The basic scheme of a container 27 suitable for the rail system 6 is illustrated in FIG. 13. It shows a dish 28, the lower side of which has a planar sliding surface 29, with which the dish 28 slides (or: glides) on the sliding surfaces of the rails. Of course, the sliding surface may also be designed differently, for example may have elevations which improve the sliding properties. The edges of the underbody may also be of rounded design in order to improve the sliding properties. The dish 28 and the sliding surface 29 have a circular cross section, as is apparent from the illustration of the lower side of the dish 28 in FIG. 15. The ordered meals can be placed into the interior of the dish. In order to avoid soiling, the dish 28 may be covered with a cover 30, the cover 30 being secured on the dish 28 against slipping by means of an accurately fitting, annular cover edge 33. A seal, in particular a sealing ring (not illustrated), may be provided between cover 30 and dish 28, in particular on the cover 30, in order to seal the dish 28. The covers of the dishes may also have openings (or: holes) (not illustrated) so that water vapour can escape and therefore, for example, French fries remain "crisp".

Figure 14:
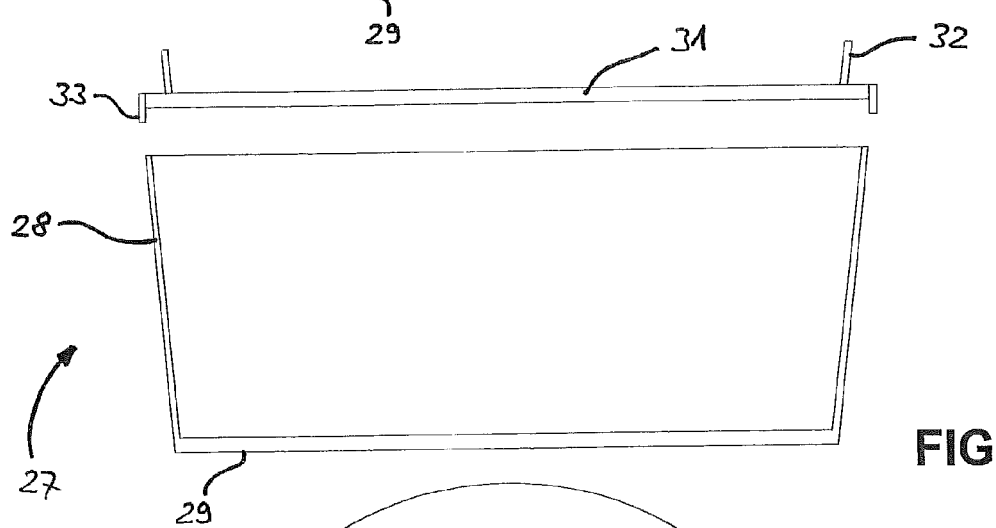

FIG. 14 shows an expedient alternative design of the cover. A cover 31, which has, on its side facing away from the covered dish 28, an annular edge web 32 which is formed, in particular, concentrically with respect to the circular cross section of the dish 28, can be placed onto the dish 28. A further dish 28 can now be placed into this edge web 32, to be precise in an interlocking manner, for example the dish 28 illustrated in FIG. 13 (see the combination (view) of FIG. 13 and FIG. 14; said view shows the placing of an upper dish 28 (FIG. 13) onto a lower dish (FIG. 14) via an intermediate cover 31). In this case, the dimensions of the edge web 32 are coordinated with the dimensions of the dishes 28 in such a manner that a uniform type of dish, in particular with the same dimensions, can be used both as the lower and as the upper dish. The use of the intermediate cover 31 is important in this case. This enables two or else more dishes 28 to be stacked in a stable manner one above another and also to be securely transported on account of the interlocking fitting into the edge web 32.

The edge web 32 prevents the dish 28 placed onto it from slipping or tipping. The intermediate cover 31 also has an accurately fitting, annular cover edge 33 which prevents the cover 31 on the covered dish 28 from slipping. A normal closure cover 30, i.e. without an additional edge web 32, can be placed on the uppermost dish 28 (cf. FIG. 13).

Figure 15:
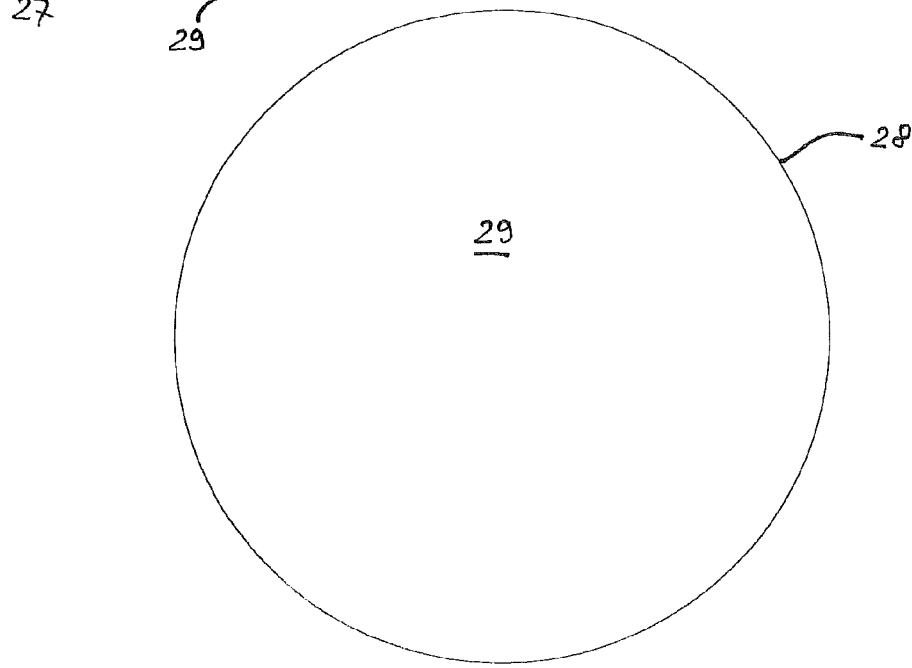

By means of this dish system illustrated in FIG. 13 to FIG. 15, either a plurality of meals and/or beverages can be transported, arranged one above another simultaneously, on the rail system, or a plurality of parts of a meal can be delivered separately from one another to the customer, for example bread separated from a soup.

It is expedient if the dishes 28 and/or the covers 30, 31 are produced from stainless steel. Furthermore, the restaurant name may be inserted, for example cast, for example approximately 1 mm deep, in all of the covers and bases. The signature depressions can then in turn be sealed with a coloured enamel. Of course, it is also possible to form the dishes 28 from plastic and/or from other metals or materials.

According to a development (not illustrated), one or more holes may be provided in the closure covers 30. Small flags, for example paper flags on a toothpick, may be placed, preferably in an interlocking manner, into said holes. The name of the meal in the dish, or the meal number from the menu, if appropriate supplemented by the table number of the ordering customer, can then be contained on the small flags. A hole of this type may also be provided on the upper dish edge. A small flag may then be inserted into said hole if a cover is not required.

Figure 16:
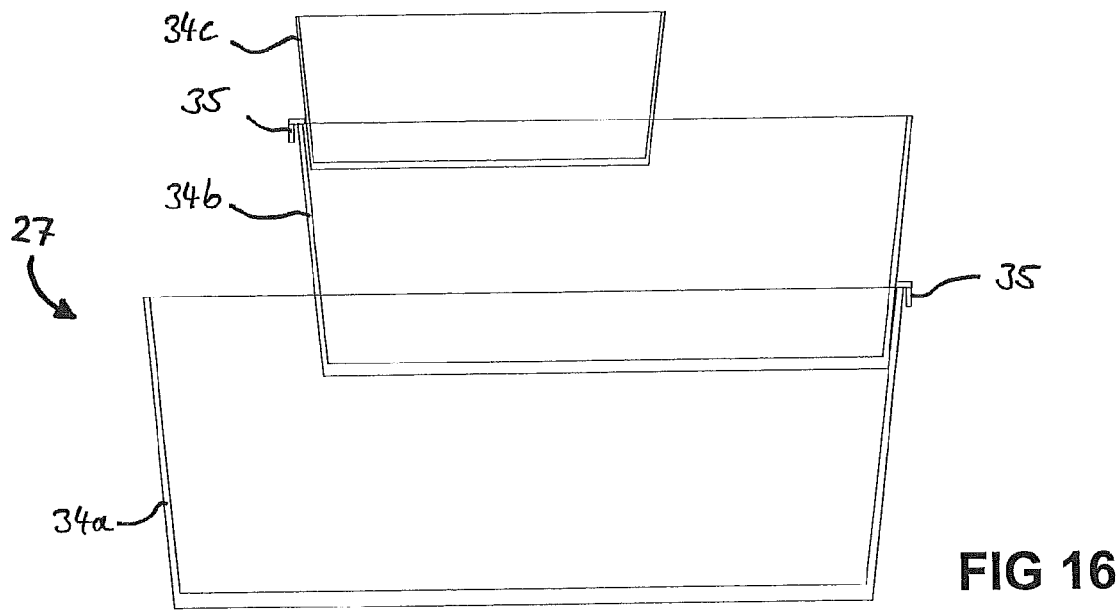

A further container 27 with special properties is illustrated in FIG. 16 to FIG. 18. This involves three dishes 34a, 34b, 34c of various sizes. The large dish 34a corresponds to the dish 28 already described above with reference to FIG. 13 and FIG. 14, i.e. this dish 34a is the base gliding dish. The closure covers 30 and intermediate covers 31 already explained can also be used for these dishes. The purpose of the smaller dishes 34b and 34c is to be able to deliver meal extras separately, for example special sauces or dips, for example apple sauce. For this purpose, the smaller dishes 34b and 34c can be placed into the large dish 34a. However, a development is expedient, in which the small dishes 34b and 34c are provided laterally with a hook 35. This hook 35 is designed in such a manner that the smaller dishes 34b and 34c can be hung in the large dish 34a via this hook 35. Of course, the smallest dish 34c may also be hung in the central dish 34b, and, in addition, the central dish 34b may be hung in the large dish 34a (cf. FIG. 16). It is apparent from FIG. 16 that the inclination of the dish edges with respect to one another is coordinated in such a manner that tilting of the smaller dishes is not possible, since the walls of the dishes bear against one another. Of course, covers which are likewise matched in size, for example corresponding to the closure covers 30 and intermediate covers 31 already explained, can be provided for these smaller dishes 34b and 34c.

Furthermore, it is advantageous if the hooks 35 are not attached to the upper edge of the smaller dishes 34b and 34c but rather in a central region of the side wall of the dishes. As a result, there is still sufficient space (or: storage space) for accommodating meals between the hung dishes and the respective base dish. For eating, the hung dishes 34b, 34c can easily be removed and therefore the meals located below them are accessible.

The hanging of the smaller dishes 34b, 34c takes place in such a manner that their centre of gravity is located in the interior of the large dish 34a (base dish). As a result, tilting problems during the gliding of the base dish 34a are avoided. Even in the case of the three-dish arrangement according to FIG. 16, the centre of gravity is formed towards the centre, and therefore no tilting problems can occur.

The hooks 35 may be attached fixedly to the dishes 34b, 34c. However, it is likewise also possible to attach the hooks 35 in a variable manner. If attached in a variable manner, the height of the smaller hung dish over the respectively larger one in which it is hung can be adjusted in a flexible manner.

Not illustrated, but provided in a development is to form covers which are comparable with the cover 31 (FIG. 14) and which have a holder for the smaller dishes 34b, 34c. This makes it possible to hang smaller dishes 34b, 34c over the hook 35 even when the cover on the base dish 34a is closed, or to place smaller dishes onto larger dishes via corresponding intermediate covers.

According to a further variant, cutlery and/or serviette holders are attached to the dishes and/or to the covers.

Of course, the containers (in particular dishes) described above in different variants may also have handles, comparable to pot or pan handles.

Furthermore, further containers of a suitable size, for example pots and/or pans, may also be stacked one above another and may glide together in this manner in the rail system.

FIG. 19, FIG. 20 and FIG. 21 show, in a schematic illustration, three different exemplary embodiments of containers 27 which are suitable for the transportation, in particular, of beverages on the rail system.

In order to be able to transport bottles, tumblers, glasses and cups 37 in the rail system 6, it is expedient to provide them with a sliding apparatus 36.

FIG. 19 shows a first exemplary embodiment for this. The sliding apparatus 36 here is a type of under plate 38 or stand with a smooth lower side 39 which forms a sliding surface for sliding on the rails. This lower side 39 corresponds to the previously described sliding surface 29 of the dishes 28. A holder 40, in which tumblers, glasses or cups 37 specially matched to the shape of the holder 40 can be placed in an interlocking manner is formed on the upper side of the under plate 38, which side lies opposite the lower side 39. Since holder 40 and tumbler, glass or cup 37 are pressed against each other on account of their weight, and since the under plate 38 also has a dead weight, the beverage containers (tumbler, glass, cup, bottle) cannot tip during the sliding transportation in the rails as long as a predetermined inclination of the rail is not exceeded. This special sliding apparatus 36 according to FIG. 19, the under plate 38, therefore permits beverages to be securely transported from the working area 3 to the tables 5 in the customer area 4 of the restaurant system 2. At the table 5, the beverage containers can easily be removed from the under plates 38 and, after drinking or after emptying of the container, can be deposited there again. Care must be taken to ensure that, for each beverage container shape used, a fitting under plate has to be supplied, or that corresponding variable inserts have to be used.

A second exemplary embodiment for a sliding apparatus 36 for beverage containers 37 (but also other containers, such as dishes, pots and pans) is the stand element 41, which is known from DE 202 16 724 U1, for a drinking vessel which is illustrated in FIG. 20. In the case of this stand element 41, suction cups 42 are provided, via which a beverage container 37, but, for example, also dishes and/or small pots and/or small pans, can be fastened to the stand element 41. The suction cups 42 act on a lower side 43 of the container 37. A disadvantage here over the previously described under plate 38 is that, even after transportation to the table, the stand elements 41 remain stuck to the containers or can be removed only with relative difficulty, in particular if the beverage containers are full. By contrast, it is advantageous for one type of stand element 41 to be able to be used for virtually all beverage containers, i.e. special designs for certain containers are not required. Of course, the stand elements 41 are designed in accordance with the required sliding properties. For example, the webs, illustrated in FIG. 20, on the lower side of the stand element 41 may be omitted and, instead, a planar lower side (sliding surface) provided, as in the case of the under plate 38 according to FIG. 19. Conversely, however, the under plate 38 according to FIG. 19 or the containers in their entirety, i.e. also the dishes, pots or pans, may also have webs on the sliding side, in accordance with FIG. 20.

FIG. 21 shows, in a sectional illustration, a third exemplary embodiment for a sliding apparatus 36 for beverage containers 37. The sliding apparatus 36 here comprises a dish 28 which corresponds to the previously described dishes 28 (cf. FIG. 13 to FIG. 15) and which has a corresponding sliding surface 29. It may also be a different container, for example a pot. Furthermore, the sliding apparatus 36 in FIG. 21 includes a beverage insert 45 for the dish 28. This beverage insert 45 makes it possible to transport beverages via the rail system 6 with the normal dishes 28 (gliding dishes and/or gliding pots and/or gliding pans) already described. The beverage insert 45 may be composed of wood, plastic, foam or other materials. The beverage insert 45 has, in the centre, an opening which is matched to the dimensions of the glass 37 (or: tumbler, cup, bottle) to be transported. The beverage insert 45 is designed in such a manner that it can simply be placed into the dish 28 and is then held securely there, in particular in a manner secure against slipping. Holders for various drinking vessels 37 (or: beverage containers) can thereby be realized without a large outlay on costs. The drinking vessel 37 (glass, cup, bottle, etc.) can in turn be placed in an accurately fitting manner into the beverage insert 45. As a result, it cannot tip over during transportation via the rail system 6.

In its lower region, the beverage insert 45 has a downwardly tapering shape, corresponding to the dish 28 for which it is intended. Of course, it may also be matched to different containers, for example it may have a shape matched to a pot. That part of the beverage insert 45 which protrudes over the dish 28 is initially at the same angle for a certain length and then merges into an upper section 46, in which the shape of the beverage insert 45 tapers again, i.e. the external angle is inclined inwards. This upper section 46 is intended for hanging a further smaller dish 47 on the beverage insert 45 by means of a hook 35 which has already been described with reference to FIG. 16 to FIG. 18. The inwardly inclined external angle in the upper section 46 of the beverage insert 45 ensures that the small dish 47 is kept in the designated position during transportation. In order to be able to hang the small dish 47, a small recess 48 is located at the top (on the left side in FIG. 21) of the beverage insert 45. A further recess 49 in the beverage insert 45 can be seen on the right side of the beverage insert 45 in FIG. 21. This recess 49 is used for the insertion and transportation of cutlery, for example a spoon. A development (not illustrated) envisages designing the beverage insert 45 in such a manner that it fills only up to three quarters of the dish 28. According to this development, one quarter of the dish 28 next to the drinking vessel 37 to be transported then remains free and could be used, for example, for carrying extras, such as sugar or milk.

The beverage insert 45 described is extremely practical and efficient, since it makes it possible to use the dishes 28 (or: pots, pans) intended for the meals for beverage transportation too. At the same time, this principle permits a high diversity of variants and is therefore suitable for the transportation of very different drinking vessels 37. As a result, overall a cost-effective container system can be provided. Mould costs for manufacturing different containers do not apply. In addition, the number of different transport systems can thus be reduced to a single one.

In order to be able to transport beverage containers, for example glasses, via the rail system 6, it is expedient to use glasses or vessels which can be covered or can be closed, for example with a plastic cover, so that the liquid content does not slop over during sliding in the rail (not illustrated in FIG. 19 to FIG. 21).

FIG. 22 shows a handle 50 for dishes 28, for example dishes corresponding to the dishes 28 illustrated in FIG. 13 to FIG. 15. The handle 50 is shown on its own at the top of FIG. 22 and in its use (attachment) on a dish 28 at the bottom of FIG. 22. These handles 50 may be hung, for example, at the table end of each rail 7. Even hot dishes 28 can then easily be removed from the rail system 6 using this handle 50 without causing burns to the hands. The handle 50 may be made, for example, from wood, metal or plastic. A surface having a poor gliding characteristic (for example a type of rubber or plastic) is fitted on an inside 51 of the handle 50, which side comes into contact with the dishes 28 to be removed, so that the dishes 28 do not slip out of the handle 50 as they are being removed. Before the dish 28 is removed from the rail system 6, the handle 50 is simply placed onto the edge of the dish 28. By means of a slight tilting movement of the handle 50, the dish 28 is lowered downwards by its weight and is thus clamped within the handle 50. This ensures secure lifting and transportation of the dish 28. When the dish 28 is deposited on the table, the handle 50 automatically loosens, since the weight of the dish 28 no longer presses downwards. The handle 50 can therefore easily be removed from the dish 28.

As an alternative or in addition, it is, of course, also possible to produce the dishes, such as small pans or small pots, with a fixed handle and to allow them to travel in the rails.

It is likewise also possible to construct the handles in the manner of a pair of pliers (not illustrated). In this variant too, the handle may be put over the edge of the dish. By means of a squeezing movement of the hand, the dish then may likewise be removed from the rail system.

In every case, it is expedient to match that part of the handle which is placed over the dish edge in terms of shape to the shape of the dish wall.

Of course, the restaurant system according to the invention does not have to end at the outer walls of a building. It is entirely possible, from a central working area, also to serve, for example, a garden area via a corresponding rail system, preferably with a roof covering. A further possibility is the use of a drive-in restaurant. In this case, the rail system can bring the meals and beverages to the car.

An ordering and/or payment system by means of mobile phone, SMS or email is expedient particularly for a garden area or for a drive-in restaurant. Ordering systems of this type make it possible for the customer to place his order even a few minutes before he arrives in the restaurant, for example by mobile phone from the car. In this case, the customer may already, if appropriate, announce the time of his arrival. The provision of an ordering option via the Internet is also expedient.

The advantage of this ordering and/or payment system resides, inter alia, in that the ordered meals and beverages can be freshly prepared, and the individual placing the order is informed by the same route, i.e. by mobile phone, SMS or email or the Internet, about its completion. The individual placing the order can then come to the drive-in window and pick up his meals and beverages. The message may be provided, for example, with a pick up number and, if appropriate, with a number of the pick up window. At the window, the individual placing the order merely inputs his pick up number and he immediately obtains the ordered meals and beverages, at the drive-in window, of course, in a suitable packaging.

The advantage of this system resides, inter alia, in that only those individuals who have already paid and whose order is already completed come to the drive-in window. As a result, long waiting times can be avoided. The proposed system thus also increases the efficiency of drive-in restaurants in comparison to conventional drive-in restaurants. The customer always receives freshly prepared meals and beverages. Furthermore, if he orders in good time, for example while underway, he does not have to wait either.

In the drive-in restaurant proposed above, the ordering advantageously does not take place in the conventional manner, in which cars queue up, at some point reach the ordering window and subsequently reach the dispensing window. This is not expedient here, the waiting times would be too long on account of the envisaged fresh preparation of the meals. On the contrary, it is expedient, at the customer car parks, to erect signs with the meals and beverages which can be ordered. The customer can then place his order by email, SMS or by mobile phone or telephone in the manner described above from these car parks, or, of course, also already while underway or from other locations. After the order is completed, the individual placing the order is informed, for example in turn by SMS, and can drive to the pick up window.

In principle, for each variant of the proposed restaurant system, payment can be made both at the table and at the drive-in window in cash, by bank or credit card, by mobile phone, etc. It is also expedient to make provision for it to be possible to reserve or order not only the tables but also the desired menus from the home or while underway, for example by Internet. A further ordering option is to provide a computer in the restaurant, at which, firstly, preparation and ordering for the individual table number can be carried out and, secondly, payment can be made at the same time. A considerable increase in efficiency is possible as a result. This option may also optionally be prespecified, with the advantage that the customer obtains a discount when ordering and paying by computer or via the Internet. This system also makes it possible, in the case of the previously described beverage drawing-off system via pipelines at the tables, to book certain beverages and quantities which can then be removed from the appropriate pipeline under control by a sensor. Of course, it is also possible to provide the normal ordering with service staff.

If customers wish to order from an assistant, a lamp can be provided for this purpose on the table and can be switched on by the customer, for example by pressing a button, as a sign of wishing to order. The assistant therefore only has to specifically control and serve the tables at which the customers require this and are prepared also to pay for this additional service. Of course, the option may also be provided that a customer orders beforehand on the Internet and places an additional order with an assistant, for extra payment.

In order to prevent misuse, in particular that individuals who have not ordered and paid simply sit down at a table reserved and paid for by another individual, it can be provided that each person placing the order, who has ordered and paid by Internet or computer or in a comparable way, receives a confirmation with table number and code number which he then simply passes on after arrival at his table to the working area, for example by SMS, in order to signal that service should start.

An alternative variant for ordering and payment is the purchase of chips as money and/or meal units at a vending machine. Instead of chips, magnetic memory cards or comparable means could also be used.

Ordering can then be carried out directly at the table or at the drive-in window and payment made at the same time.

According to a further variant, it may be provided, for the payment, that the customer obtains a card or a chip, in particular a memory card or a memory chip, when he enters the restaurant. All of the meals and beverages of the customer are recorded on or by this card or this chip. When he leaves the restaurant, the bill is then issued on the basis of the recorded data, for example at a central till.

According to a development, it may be provided to temporally limit seat and/or table reservations. For example, a table can be reserved for a maximum of two hours. If the customers are obligated, upon reservation, to leave the table again, for example even after an hour, they may in return be granted a discount on meal and beverage prices. Such a system makes it possible for tables and seats to be bindingly reserved not just once in the evening, thus again increasing the overall efficiency of the restaurant system.

According to a development, it is provided likewise to be able to undertake table and/or seat reservations by the Internet (for example from home). As a result, it is possible to calmly control and deal with everything, starting from the seat reservation to the time of eating during the reserved time and the ordering of the desired menu up to the payment in advance. It may also be provided, in particular when making the reservation by the Internet, that the customer reserves a certain table and/or certain seats (as is known for the reservation of cinema seats). These tables and seats are then reserved for a certain time and for a certain period of time for the customer.

All in all, it is, of course, possible to combine the restaurant system according to the invention with known restaurant systems as desired. A chute can thus bring meals and beverages from the working area to one or more defined dispatch points from which waiters take over the rest of the service or the customers pick up their meals and beverages. The same applies to the removal system. It would be entirely conceivable here only to provide a small number of chutes at suitable points in the restaurant. Waiters can then clear the tables and send used containers and table waste via these chutes to the scullery. It is thereby also ensured that the rail systems are not excessively soiled during removal due to unskilled handling.

Empty business or industrial buildings are particularly suitable for accommodating the proposed restaurant system. They usually have, in particular, a suitable height. Furthermore, they are frequently relatively favourable to acquire or to rent. Buildings of this type are generally also not bound to a brewery. A further advantage is that these buildings are usually located in areas in which noise due to live music and/or a garden area does not cause any problems.

FIG. 23 and FIG. 24 illustrate the concrete use of an exemplary embodiment of the restaurant system according to the invention, to be precise in an industrial or business building. The premises in which the restaurant system is to be installed are located on two levels in an approximately 7 meter high hall. FIG. 23 shows the upper floor (1st UF, 1st floor), FIG. 24 shows the ground floor (GF) located beneath it.

Room R-No. 1 is located on the ground floor and forms the entry area. The first three tables which are served via the rail system shown are located here.

Room R-No. 2 constitutes in principle just a bar at which a nice cup of coffee can be enjoyed after eating. This room has nothing to do with the restaurant system according to the invention.

The scullery is accommodated in rooms R-No. 3 and R-No. 4. These rooms are likewise located on the ground floor. In room R-No. 3 there is a lift to the working area R-No. 6/7 located above on the upper floor (this room has two levels: a store and a cooking and serving area) in which cooking takes place and the meals and beverages are served via the rail system. This lift can be used to bring beverages and extras for the meals which are to be prepared, and rinsed dishes (or the like) and tableware to the first floor (or second floor, which corresponds to the second level of this room).

Room R-No. 5 on the ground floor is actually part of the entry area on the ground floor. Only, in this area, a first floor has not been inserted. It is therefore, as it were, a type of gallery area (also called light well). In this gallery area, the first floor is downwardly bounded in each case just by a railing. A type of serving tower (rail system with which relatively large heights can be overcome, for example a spiral, as in FIGS. 11/12, or rail elements arranged over corners, as in FIGS. 9/10) is installed in this gallery area. In the example illustrated, a framework is provided in the centre of the ventilation area (light well) from the ceiling downwards, to which framework various rails are fastened in a spiral manner and thereby overcome the height difference. They then branch off to the tables in each case via switching points. The maximum height of this tower system is located 2.20 m above the ground floor, therefore a table is also introduced in this area below the framework. The other tables of this tower system are each located offset downwards somewhat. The first table of this system is located at the ground floor height. Staircases are located in each case on the wall in order to pass from one level to the next higher level.

On the first floor, room R-No. 9 is defined as zero room height. Rooms on the first floor, the height of which differs therefrom, are indicated, for example, by +0.20 m or −0.60 m. The main customer area is located in room R-No. 9. 77 seats are provided here. Tableware cupboards, at which glasses and cutlery for the tables located in the surroundings are stored, are planned here at a number of points.

Rinsed tableware can be picked up, if required, from the opening between rooms R-No. 6 (storage area, kitchen) and R-No. 8 (stairway to the first floor). The tableware is stored in individual baskets, the size of which is precisely such that they can be stored in pull-out drawers of the tableware cupboards. Rearranging or putting away of the tableware is therefore not required. Empty baskets are removed from the cupboards and full ones placed into them again. The abovementioned opening may also be used to bring soiled tableware from all of the tables located in its vicinity to the scullery via the lift in room R-No. 6. In addition, on the railing for the gallery and on the railing of the tower system positioned somewhat below it there are two removal rails with which tableware can be removed from tables in the vicinity to the scullery on the ground floor.

A further removal rail 52, on which even entire baskets with tableware can be removed, is located substantially outside the building. Baskets can be conveyed onto the rail through a gate-like opening and, running around a 90° curve, can be moved directly to the scullery on the ground floor.

Access to the customer area R-No. 9 is possible both from the staircase landing (where the opening in the form of a serving hatch to the working area is located) by means of a staircase in the corner, and via the bridge landing, from where the removal rail runs to the scullery. All of the tables in the customer room are thereby easily accessible—in spite of rails.

By means of the bridge, which is bounded towards the gallery by a railing, on the first floor, on comes first to a door to the working area R-No. 6/7 and then to an area which is approx. 12 m² in size and is delimited towards the inner courtyard likewise in the manner of a gallery thus by a railing. This area is configured as a small stage on which live music is played and which can be seen virtually from everywhere. Room R-No. 10 is located behind it. This is planned as a playroom or care room for children. Children are able to play, paint, etc. here. In this way, it should be possible for the parents to have a pleasant evening.

The working area R-No. 6/7 is in principle a room with a room height of approx. 4.40 m. It is appropriate here to insert a ceiling at half height or somewhat below it (because of the extractor hoods required above during cooking). There should merely be storage below—beverages, meat, vegetables, etc. These goods can be transported to there by means of the lift provided in the room. The refrigerators are correspondingly also located here. The actual cooking and serving area is located on the upper level of the room.

All of the serving rails can be fitted there from a point a. All rails end there—at different heights. Per rail, there is an option to set which table which can be reached by this rail is to be served. The rails (and, if appropriate, switching points) are then correspondingly adjusted automatically. One or more dishes are then put into the rail and then glide to the defined table. At the end of the rail there is then, for example, a light barrier. When the dishes reach the target, a new target for this rail can be defined and it can be provided with new dishes. One to a maximum of four tables are served by each rail.

Windows are located opposite the door to R-No. 6/7. A garden area can be seen from these windows. Said garden area can also be supplied without problem from the working area with food and beverages by means of the rail system, but this is not illustrated in the figures. In an analogous manner, a rail, of course, may also be guided to one or more car drive-in windows (likewise not illustrated).

According to a development, it is provided to install a chute in the form of a tube (not illustrated) from the upper customer area as an additional exit for customers.

The rail system illustrated in FIG. 23 and FIG. 24 is explained below.

All of the stretches of rails for transporting meals begin at point a on the upper floor of the kitchen (room No. 6/7). From this point a, all of the tables are supplied centrally by stretches of rails in two directions. The rail routing is plotted in FIG. 23 and FIG. 24 as a thick black line. The dashed ends of the rails indicate slowing-down or braking zones at the ends of the rails.

Five rails in two stretches guided in parallel lead in the direction of the upper customer room R-No. 9. The rails of the individual stretches are stacked in height in order to correspond to the height/distance to be bridged. In this case, the constellation with a left stretch, comprising rails 1 and 2, and a right stretch, comprising rails 3, 4 and 9, is expedient. Of course, for creative reasons, modifications are also possible within certain limits in order to achieve a better visual image. These rails lead from point a up and beyond the staircase to point f.

From point a, four further rails 5 to 8 lead in the direction of the light well R-No. 5 out of the kitchen at point b in the direction of point c. Use is made here of two parallel stretches of in each case two rails which are staggered in height in order to ensure the required passage height.

At point f, those rails 3 and 4 of the right stretch which are situated at the top lead in the direction of point h at which the uppermost rail 4 performs a further curve to the right. At point i, there is a branch line for supplying table 4-2 instead of the rail ending at table 4-1. Rail 3 branches off at point h and, by means of corresponding curves, supplies tables 3-1 and 3-2.

The lowermost rail of the right stretch leads from point f to point j, at which a 180° of curve is performed and, after branching off and corresponding curves, tables 9-1 and 9-2 are supplied.

Rails 1 and 2 of the left stretch lead from point f to point k. The lower rail branches off there and, at its two ends, supplies tables 2-1 and 2-2. Rail 1 leads on further and, after forking at point 1, supplies tables 1-1 and 1-2.

Rails 6 and 7 which run one above the other perform a curve at point d and lead at point e into the spiral rail construction in the centre of the levels. These two rails, running one above the other, overcome the height there to the tables to be supplied in each case. At a suitable height, there are corresponding switching points there in order to be able to leave the spiral rail. The upper of the two rails (No. 7) supplies the table, which is on the ground floor, for ten people (No. 7-1). Rail 6 supplies three tables on the other levels (6-1, 6-2, 6-3).

Rails 5 and 8 (parallel to rail 6 and 7) likewise run, running one above the other, to point d. Rail 5 performs a left curve there and, by means of a switching point, supplies two tables (5-1 and 5-2) on the upper floor at the edge of the light well. The lower rail 8 leads in the opposite direction to point a. In this case, the necessary overcoming of the height difference takes place by skilled rail routing around the spiral rail construction in the centre of the levels. From point e, rail 8 leads along the wall beyond point m and beyond point n to point o. The container drops there from the upper rail onto the lower rail which then leads back. This construction (alternatively a curve would also be conceivable) serves to overcome an additional height. Below point n, the rail performs a curve in the direction of the centre of the room and, by means of corresponding switching points, supplies three tables (8-1, 8-2, 8-3).

At three strategically positioned points, waste-disposal rails 52, 53, 54 lead from the customer rooms into the scullery in R-No. 3 and R-No. 4. This takes place from the edge of the light well on the upper floor (waste-disposal rail 53) and from the uppermost level of the lower customer room (waste-disposal rail 54). In this case, the two waste-disposal rails 53, 54, located one above the other, lead beyond the entry area through an opening in the wall into the scullery (R-No. 3 and R-No. 4). In addition, a further waste-disposal rail 52 (removal rail) is provided on the rear wall of the upper customer room. This waste-disposal rail 52 leaves the building and is guided along the outside of the latter and into the scullery (R-No. 3 and R-No. 4). In order to transport the rinsed tableware upwards into the kitchen rooms, a goods lift 55 is provided.

In the tables below, height details (in meters) of the individual rails 1 to 9 are indicated at the respective points a to o (plotted in FIGS. 23 and 24). The reference point is always the level of the first floor, i.e. all of the height details relate to the level of the first floor. Accordingly, the ground floor is located at a level of −3.30 m. Tables are assumed to have a height of 80 cm.

The rails are indicated to the right (uppermost line), and below them the tables supplied in each case by the rails (second line). The individual points a to o are indicated downwards. The height profile of each rail 1 to 9 can therefore be seen from the tables. Thus, rail 1 begins at point a at a height of 2.92 m, reaches a height of 2.30 m at point f, of 2.05 m at point j, of 1.83 m at point k, of 1.26 m at point l and finally ends at table 1-1 at a height of 0.80 m and a table 1-2 at a height of 0.95 m.

|  | 1 | | 2 | | 3 | | 4 | | 5 | |
| --- | --- | --- | --- | --- | --- | --- | --- | --- | --- | --- |
|  | 1-1 | 1-2 | 2-1 | 2-2 | 3-1 | 3-2 | 4-1 | 4-2 | 5-1 | 5-2 |
| a |  | 2.92 |  | 2.30 |  | 3.30 |  | 3.60 |  | 3.08 |
| b |  |  |  |  |  |  |  |  |  | 2.58 |
| c |  |  |  |  |  |  |  |  |  | 2.30 |
| d |  |  |  |  |  |  |  |  |  | 1.58 |
| e |  |  |  |  |  |  |  |  |  |  |
| f |  | 2.30 |  | 1.68 |  | 2.68 |  | 2.98 |  |  |
| g |  |  |  |  |  | 1.99 |  | 2.48 |  |  |
| h |  |  |  |  |  | 1.43 |  | 1.85 |  |  |
| i |  |  |  |  |  |  |  | 1.48 |  |  |
| j |  | 2.05 |  | 1.43 |  |  |  |  |  |  |
| k |  | 1.83 |  | 1.21 |  |  |  |  |  |  |
| l |  | 1.26 |  |  |  |  |  |  |  |  |
| m |  |  |  |  |  |  |  |  |  |  |
| n |  |  |  |  |  |  |  |  |  |  |
| o |  |  |  |  |  |  |  |  |  |  |
| Table | 0.80 | 0.95 | 0.83 | 0.89 | 0.86 | 0.80 | 0.91 | 1.23 | 1.08 | 1.08 |

|  | 6 | | | 7 | | 8 | | | 9 | |
| --- | --- | --- | --- | --- | --- | --- | --- | --- | --- | --- |
|  | 6-1 | 6-2 | 6-3 | 7-1 | 7-2 | 8-1 | 8-2 | 8-3 | 9-1 | 9-2 |
| a |  | 2.78 |  | 3.08 |  |  | 2.78 |  | 2.22 |  |
| b |  | 2.28 |  | 2.58 |  |  | 2.28 |  |  |  |
| c |  | 2.00 |  | 2.30 |  |  | 2.00 |  |  |  |
| d |  | 1.28 |  | 1.58 |  |  | 1.28 |  |  |  |
| e |  | 0.91 |  | 1.21 |  |  | 1.21 |  |  |  |
| f |  |  |  | Circulate in/around | | | | | 1.60 |  |
| g |  |  |  | spiral rail construction | | | | |  |  |
| h |  |  |  | in order to overcome | | | | |  |  |
| i |  |  |  | further height | | | | |  |  |
| j |  |  |  |  |  |  |  |  | 1.35 |  |
| k |  |  |  |  |  |  |  |  |  |  |
| l |  |  |  |  |  |  |  |  |  |  |
| m |  |  |  |  |  |  | −0.30 |  |  |  |

| | | | | | | | | | |
|---|---|---|---|---|---|---|---|---|---|
| n | | | | | | | −1.18 | | |
| o | | | | | | | −1.55 | | |
| Table | 0.80 | 0.80 | 0.80 | 0.80 | 0.80 | −2.30 | −2.43 | −2.43 | 0.85 | 0.85 |

These height details are based on the following secondary conditions:

Height at point c at least 2 m
Height at point f at least 1.60 m
Height at point g at least 2.55 m
Rail distance (height) at least 0.3 m
Gradient of the rails: 25.0%

The restaurant system described in FIG. 23 and FIG. 24 can be supplemented, by way of example, as follows:

A pipeline is installed below, above or next to the rails. Taps at which customers can remove tap water without any cost are provided at the respective tables at which the rails end. Drinking glasses are provided for this purpose at the table. The cutlery required is also situated, for example, in a container at the table. In addition, the table number can be read at each table at an easily visible location (possibly also underlaid in colour). Each dish or beverage which arrives via the rail network has a small flag stuck onto it. Both the respective table number and the name of the dish can be read on these small flags. It is possibly also appropriate to introduce different flag colours for different tables. In this case, it can be recognized simply by means of the colour to which table the meal delivered or the beverage belongs.

For example, it may furthermore be provided to supply beverages exclusively in small bottles (e.g. 0.2-0.3 liter) to the tables. A bottle opener is then provided at the table. Glasses are either provided on the table or are brought there by service staff. This may considerably reduce the problem of the beverages spilling on the transport route.

The ordering system may be designed, for example, in such a manner that menus are located on the tables, assistants take the orders via electronic ordering systems, and the orders are then passed on, for example by radio, to the working area in order to be carried out from there. In this manner, personal care of the customers continues to be ensured with a considerably lower outlay on work and staff than in conventional restaurants. The assistants will also fetch the tableware, bottles, cutlery, etc. which are no longer required from the tables and bring them to the designated removal rails in order to allow them to glide from there to the scullery. There is also a considerable gain in efficiency here. In the exemplary embodiment illustrated in FIG. 23 and FIG. 24, the return system on the ground floor has to take place manually in a conventional manner due to a lack of gradient. However, the distances to be covered by the staff are not very great here either.

FIG. 35 shows a further use of an exemplary embodiment of a restaurant system 1 according to the invention, to be precise again in an industrial or business building. The premises in which the restaurant system is to be installed are located in a hall, approximately 7 meters in height. Customer areas 4 are illustrated—distributed on a plurality of levels—with tables 5 for customers, which areas are connected via a transport system 6 for meals and beverages to a working area (not illustrated) arranged at a higher level than the customer areas 4. The transport system 6 is designed as a rail system with numerous rail lines 56. A rail line 56 begins in each case in the working area (not illustrated) and ends at one of the tables 5. The transport of meals and beverages from the working area to the customer areas 4 and to the individual tables 5 takes place by means of gravity. For this purpose, the rail system 6 comprises sliding rails 7, with each rail line 56 being formed from two sliding rails 7 running in parallel. Each of these rails 7 has an essentially round cross section. The distance between the two respectively mutually assigned rails 7 of a rail line 56 is at least essentially constant over the entire rail line 56. The mounting of the rails 7 and of the rail lines 56 takes place via suitable holders 57 (not illustrated in FIG. 35). These holders 57 are preferably fitted to the respective lower side of a rail 7 (cf., for example, FIG. 25 in this respect).

The rails are preferably made from metal, in particular stainless steel, and are shaped or bent in a desired manner. The individual rail lines 56 may be formed rectilinearly, but curves or spirals or else loopings (not illustrated) are also possible. As a rule, a rail line 56 has both rectilinear and curved or spiral sections.

Of course, other configurations of the rail system are also possible. For example, a rail line may also be constructed from four tubular rails which essentially have circular or rectangular cross sections and are arranged relative to one another on two levels. In each case, two rails of smaller diameter are located below the containers to be transported, and two further rails of larger diameter serve as lateral guides for bounding the rail line. A rail system of this type is suitable in particular in order to transport suitable containers, for example stainless steel pots, directly and without further aids. In order, firstly, to reduce the sound effects and, secondly, to achieve a favourable sliding behaviour of the containers (in particular stainless steel pots) on the rails, plastics should be applied here at the points at which the rails are in contact with the containers or stainless steel pots during transportation.

Tests with a rail system of this type have revealed that positive correlations exist in each case between increasing moisture and gliding speed, between greater heat (from about 60° C. upwards) and gliding speed, and between the weight of the gliding containers and the gliding speed thereof. Particularly rapid gliding arose with heavy, hot stainless steel pots which had a moist underbody.

A further observation was that, with increasing speed and increasing dead weight, the containers were offset into relatively severe rotational movements in the curves. This results from the fact that, at a relatively high speed, in particular in curves, the containers are pressed more strongly against the outer boundary of the rail. Friction at the boundary rails would offset the containers into a rotational movement. The higher the rotational force (on account of the weight of the containers and on account on the speed), the more rapidly the containers rotated. This may result in the food and beverages located therein being undesirably spun through one another. Furthermore, problems arose during the transportation of higher bottles (e.g. 0.5 liter bottles), since they protruded a distance above the lateral guide rails (since the height difference between lower rails and lateral guide rails remain the same). This may result in an unfavourable position of the centre of gravity of the containers during transport and therefore in unsatisfactory transport results.

A container sliding behaviour appropriate for the requirements could be achieved, in particular, by moistening the sliding surfaces of the containers. This would always achieve a minimum speed required for correct transportation.

In order to prevent a maximum speed predetermined for a position of the rail line from being exceeded, it is expedient to monitor the speed constantly by means of sensors and, if limit values are exceeded, to brake the container by means of suitable devices or apparatuses (for example braking systems). However, the provision of a sensor arrangement of this type and the provision of braking systems is comparatively cost-intensive, complicated and entails a considerable outlay on maintenance during active operation.

This turns out to be substantially simpler in the case of the rail system 6 which is shown in FIG. 35 and is already described above, in which each rail line 56 comprises just two parallel rails 7. In interaction with suitable transport aids 58, 59, 60, 61 (also: sliding apparatuses), as illustrated by way of example in FIG. 25 to FIG. 31 and explained below, a purely mechanical, self-controlling system is produced, in which the occurrence of excessive speeds is prevented in a simple manner.

An essential aspect of the rail system shown in the use according to FIG. 35 is the use of just two rails 7 per rail line 56. These rails 7 are arranged in such a manner that the rails and beverages or their containers are transported between the rails 7. In comparison to the previously described solution with four rails, the two lower rails are therefore omitted and just the two lateral rails remain. The rails 7 are in turn preferably tubular metal rails, in particular stainless steel rails, which are essentially circular in cross section. Differently shaped rails, for example rails with a rectangular cross section, may also be used. The two rails 7 which run in parallel are connected on their lower side, from below, in order to ensure that they run parallel. At the same time, these connections make it possible for the rails to be fastened in the restaurant system 2 or restaurant.

The transport of the meals and beverages via the rail lines 56 takes place in suitable containers or transport aids which are customarily placed in the working area onto the particular rail line 56 and then slide on the rails 7 by means of gravity, on account of the height difference between working area and customer area, to the particular table 5.

Transport aids 58, 59, 60, 61 (also: sliding apparatuses) of this type are—as already discussed—illustrated by way of example in FIG. 25 to FIG. 31.

FIG. 25 shows, in a side view, and FIG. 26, in plan view, the transport aid 58 which is placed onto a rail line 56. The two rails 7 can be seen in cross section and are connected to each other via a holder 57, which is designed here as a spacer and is fitted in each case to the lower side of the rails 7. The transport aid 58 with a container 27 used, here a pot with two handles 62, is arranged between the two rails 7. On opposite sides, the transport aid 58 has two guide components 63, preferably made from plastic, which are in the form of an arc of a circle in their cross section.

These guide components 63 each engage around one of the rails 7 by more than half of the circumference of the rail 7, in particular around approximately or at least two thirds of its circumference or around approximately or at least three quarters of its circumference. In the exemplary embodiment illustrated, the engaging around takes place from above, i.e. the guide components are open downwards. This is necessary, since the two rails 7 on which these guide components 63 glide are connected from below at regular intervals, as already explained. Without the opening downwards, the guide components 63 could not pass this holder 57.

The guide components 63 may be formed, for example, from plastic pipes. Their length is basically virtually as desired, with care being taken to ensure that shorter guide components have a greater tilting tendency ("drawer effect") during sliding on the rails 7 than longer guide components.

It is advantageous if the inside diameter of the guide components 63 is somewhat larger than the outside diameter of the rails 7 on which the guide components 63 are to glide. This firstly permits a certain degree of compensation for the rail tolerances and secondly permits sliding along curved rails 7, i.e. along a rail line with a curved or spiral profile.

A bolt 64 is fitted on the upper side of each guide component 63. A ring component 65 is placed onto these two bolts 64. For this purpose, the ring component 65 has, laterally, two ring elements 79 which are connected fixedly to it and are pushed onto the bolt 64. In this way, the two guide components 63 and their bolts 64 are connected to one another, to be precise in a moveable manner, via the ring component 65 with its two ring elements 79. Containers 27 or apparatuses for meals and beverages, for example pots or beverage holders, may be hung in the ring component 65 and therefore transported along the rail line 56 by means of the transport aid 58. A pot with two handles 62 is illustrated as an example in FIG. 25 and FIG. 26. The dashed line in FIG. 25 indicates the maximum downwards depth that the containers should reach through the ring component 65.

The moveable connection between guide components 63 and ring component 65 is advantageous for the abovementioned drawer effect, i.e. the desired tilting of the guide components 63 and therefore of the transport aid 58 on the rails 7. This limits the transport speed. Without this drawer effect, it could be that the transport aids slide more rapidly than desired along the rails 7.

The ring elements 79 provided on the ring component 65 have a continuous recess or groove (not illustrated) through which a retaining pin 80, in particular a screw 80, is fitted or can be fitted in each case to the particular bolt 64. In this case, the retaining pin 80 protrudes with play into the recess or groove or through the latter, i.e. the recess or groove has larger dimensions than the diameter of the retaining pin or the screw 80 in the region of the recess (of course, a pin or screw head which is present if appropriate may again have a larger diameter than the recess or groove). By means of the play between retaining pin and recess or groove, the ring element 79 remains moveable in relation to the particular bolt 64 on which it is placed. At the same time, however, the transport aid 58 as a whole remains a constructional unit which does not break up into a plurality of parts, even during removal from the rails 7. Guide components 63 and ring component 65 of the transport aid 58 remain connected to one another via the retaining pins or screws 80.

In the case of certain rail routings, in particular over customers, it may be expedient to provide additional safety measures in the transport aid 58 in order to prevent a customer being injured due to dropping parts should the transport aid break, for example at weld seams. For example, the ring component 65 may also be shaped in an oval manner, to be precise in such a manner that the longer diameter of the oval protrudes over the two rails 7, in particular even over the two bolts 64. The ring elements 79 could then be arranged, for example, in the interior of the ring component 65 and could be fastened to the inside thereof. In the event of the transport aid 58 breaking, for example a weld seam between ring component 65 and ring element 79 breaking, the ring element 65 per se would then still rest on the guide components 63 or the rails 7 and could not drop down together with goods being transported.

As an alternative or in addition, bars which protrude beyond the rails 7 above the latter could be attached to the ring component 65, in particular to the lower side thereof. These bars are carried along during transportation. If the transport aid 58 breaks, the transport aid 58 would continue to rest on the guide components 63 or rails 7 via said bars and could not drop down together with goods being transported.

A type of safety strap, for example a nylon cord, could also be fitted between the bolts 64 and the ring component 65. If the transport aid 58 breaks, for example a connection between ring element 79 and ring component 65 breaks, the ring component 65 would continue to be fitted to the bolt 64 via the safety strap, and the transport aid 58 together with the goods being transported could not drop down.

In all of the safety measures mentioned, the transport aid 58 would continue to be held on the rails 7 even if a breakage occurs, and it can continue to slide or be braked on the rails 7. These above-mentioned considerations can be transferred analogously to all other types of transport aids too.

As an alternative to the hanging described above, the containers or apparatuses, in particular for receiving bottles, carafes or the like (e.g. beverage holders), may also be fixedly integrated, for example adhesively bonded or welded, into the ring component 65. A single-piece design or manufacturing with the ring component 65 is also possible. An exemplary embodiment in this respect is shown in FIG. 30 and FIG. 31. A bottle holder 70 here is integrated in the ring component 65. Said bottle holder 70 has a bottle receptacle 71 in the form of a pipe with a base on its lower side, which base is preferably arranged centrally in the ring component 65 and is connected (by adhesive bonding, welding or by single-piece design) to the ring component 65 via retaining webs 72. As can be seen in FIG. 30, fastening devices 81, for example hooks, may be fitted to the bottle receptacle 71 and via which, in turn, a safety strap 82 for the bottle can be fitted.

The transport aid 59 illustrated in FIG. 27 and FIG. 28 shows an alternative to the above-described ring component. A respective moulded body 66 is fitted here on the upper side of each guide component 63. Said moulded body 66 is designed in such a manner that a respective handle 62 of the pot or container 27 to be transported can be hung in it, as illustrated in FIG. 27 and FIG. 28. In this case, the respective handle 62 engages around the moulded body 66. The container 27 or the pot is thereby secured in the transport aid 59 during transportation.

FIG. 27 and FIG. 28 furthermore show that retaining apparatuses 67 may be provided on the guide components 63 or the moulded bodies 66 or the bolts 64, in particular laterally on the latter, to which retaining apparatuses a fastening device 68, for example a rubber band, can be fitted, by means of which, for example, a cover 73 (in FIG. 27 and FIG. 28 with handle 69) can be secured on the container 27 or on the pot during transportation.

It is also possible, in the case of a container hung in the ring component 65 according to FIG. 25 and FIG. 26, to lock a cover by means of a band, in particular rubber band, on the container in such a manner that said band is stretched around the opposite handle 62 and then over the cover. According to a variant embodiment, use may also be made here of two small pot tabs which are in the shape of the handle 62 and which can be pulled over the opposite handle 62. A rubber band could be fastened between these two pot tabs, the tensioning of said rubber band keeping the cover on the container during transportation. This rubber band could have an opening centrally through which, in the fitted state, the handle of the cover reaches, thereby additionally locking the cover. The advantage of this solution is, furthermore, that the handle 62 can easily be grasped when the containers or pots are hot.

A band or a type of safety strap for bottles or wine carafes or the like may also be provided in an analogous manner. This band or this strap could be hung at two points of the transport aid and then, for example, pulled over the neck of the bottle or carafe, to be precise in such a manner that the latter cannot drop out of the transport aid even in the event of accidents during transportation. Of course, a band of this type or a strap of this type may also be installed fixedly at one or at both of its ends on the transport aid. The band or the strap preferably also has an opening, in particular an expandable opening which is formed by rubber and through which, for example, the bottle neck can be pushed. In this case, the band or the strap is secured fixedly in the region of the opening to the neck of the bottle. By fixing the band or strap to the transport aid, said band or strap simply continues to be guided with the transport aid after the bottle is removed. An individual band or an individual strap is therefore not obtained at the customer's table as an additional component which has to be disposed of separately. This enhances the customer's comfort.

In order to fix the containers, bottles or carafes in special inserts or in the bottle holders 70, in particular in the bottle receptacle 71, special inserts, in particular rubber inserts, may also be provided there. Said inserts are designed in such a manner that the containers or bottles or carafes to be transported are to be pressed a certain amount into said inserts for transportation and are thereby held relatively securely in the particular insert or in the particular bottle receptacle and therefore in the particular transport aid. When pulling the containers, bottles etc. out, a certain amount of resistance then has to be overcome. The containers, bottles, etc. could thus be held and transported securely in the transport aid even without securing by additional bands or straps, but an additional securing by such bands or straps is, of course, possible nevertheless.

According to a development, the bottle holder 70 (or else further retaining devices for containers), in particular the bottle receptacle 71, could be fitted to the ring component 65 in a moveable, in particular pivotable or rotatable manner, preferably about an axis of rotation running parallel to the particular rail level and perpendicular with respect to the particular direction of travel. Each rail line 56 has an inclination. If the bottle receptacle 71 is fastened immovably to the ring component 65, it and the bottle located therein have the same inclination as the rail line 56 at the corresponding point. By contrast, in the previously described, moveable solution, the bottle or in general the container is always transported in an at least virtually upright position, with all of the advantages associated therewith. This can be realized in an analogous manner for the transportation of meals.

An alternative transport aid 60 with an alternative guide component 75 to the previously described guide components 63, which engage around the rails 7 by more than half, in particular at least two thirds, of their circumference from above, is shown in FIG. 29. This guide component 75 is not in the shape of an arc of a circle, but rather is designed in cross section as a downwardly open rectangle. The latter only surrounds half of the circumference of the rail 7, i.e. the transport aid 60 can be removed from the rails 7 at any point without further devices or the transport aid 60 could swerve out of the rail. This is prevented by a U-profile 76 fitted laterally to the holder 57. This U-profile 76 ensures that the guide components 75 cannot spring out of the rails 7. The guide components 75 may be connected in one of the previously described ways or else in another manner to the container 27 to be transported. FIG. 29 shows a connection via the handle 62 of the container 27. An advantage of the transport aid 60 according to FIG. 29 resides in the fact that it can easily be removed from the rails 7 or placed onto the rails 7 at locations where this is desirable and, accordingly, no U-profiles 76 are provided, and the removal or placing-on of the transport aid 60 is not restricted to the end or beginning of the rail.

In the previously mentioned exemplary embodiment according to FIG. 29, the rails 7 are formed with a circular cross section. In principle—both in this example and in all other examples and also in general—rails with different cross sections, for example with an oval or rectangular cross section, can also be used. In this case, the parts corresponding in each case to the rails, for example transport aids or containers, have to be correspondingly adapted, if appropriate.

The previously described transport aids 58, 59, 60, 61 with in each case two guide components 63 or 75 of plastic, which, of course, may also be encased, for example, by foldable stainless steel parts or may be composed of other sliding materials or comprise the latter, with only the actual sliding surfaces having to be formed from slidable material and the remainder may be composed of any desired, even different materials, are pushed or placed together with a container for meals and beverages onto the two rails 7 of a rail line 56 for transportation. In this case, the two guide components 63 or 75 are connected to each other either via the pushed-on container (cf. FIG. 27/28 and FIG. 29) or via the ring component 65 (cf. FIG. 25/26) which is connected to the two guide components 63 or 75 via the bolts 64 and into which the container is inserted.

The transport aids 58, 59, 60, 61 with the containers for meals and beverages glide along straight sections of the rail lines 56 in a relatively uniform manner in the direction of the particular table 5 in the customer area 4 because of the gradient. Of course, it is also possible here for different containers (e.g. pots) to run more slowly or more rapidly, for example on account of their particular weight. In order to ensure a certain minimum speed, it can be provided to moisten the sliding surfaces of the guide components 63.

If a transport aid 58, 59, 60, 61 with a container for meals and beverages glides into a curve, then the transport aid may actually wish, due to inertia, not to travel around the curve but rather to travel straight ahead. However, the guide components 63 (below always: or 75) sitting on the rails 7 ensure that the transport aid follows the rail line 56 even in curves, to be precise without the transport aid or the container being offset into rotations in the process. However, the guide components 63 tilt in curves in a pronounced manner together with the rails 7. This increases, in curves, the friction between rails 7 and guide components 63, and the sliding speed of the transport aids is braked. The "drawer effect" already mentioned above comes into action here: the shorter the guide components 63, the more they tilt. The more the length of the guide components 63 (in a variant embodiment: the plastic pipe sections with an opening on the lower side) corresponds to the diameter of the rails 7 on which they slide, the more frequently the guide components 63 tilt even on straight sections of the rail lines 56. At a length of the guide components 63 that is twice as long as the diameter of the rails 7 on which they slide, the guide components 63 tilt and brake at the latest just in the curves.

Added to this is the fact that the guide components 63 tilt more severely at higher speeds than at lower speeds. This means that the guide components 63 and therefore the transport aids are braked more severely at higher speed than at lower speed.

This in turn has the result that even heavy goods being transported, which would, without the "drawer effect" glide at a significantly higher speed, possibly even at too high a speed, are overall transported at an appropriate, acceptable speed to their goal via the rail system by means of the continuous tilting (and secondly also by means of the very good sliding properties of the plastic guide components).

It turns out from the above that, in practice, in different situations (e.g. as a function of the air humidity or the transport weight), recourse may be made to different guide components, for example to guide components of different length or to appropriately equipped transport aids, in order thereby to always achieve as an ideal and optimum gliding speed as possible.

The "drawer effect" has been investigated in more detail in the case of the transport apparatus 58 with the ring component. In this case, it has been shown that, in a curve, one of the guide components 63, namely the inner one or the one sliding on the inner rail (rail with smaller radius), has already glided a distance further than the other one. In this case, the container is arranged obliquely between the two guide components 63. If, before the curve, for example, the guide component sitting on the other rail is situated in front and the one sitting on the subsequent inner rail correspondingly lies obliquely behind the ring component 65 in which the container is located, this constellation changes at the beginning of the journey through the curve. That is to say, while traversing through the curve, the guide component sitting on the inner rail is then situated at the front and the other one at the rear. However, this changing of the positions of the guide components also always means that the rails 7 have to be situated at least far enough apart that the two guide components 63 connected via the ring component 65 also have to pass between the rails in a parallel position (i.e. one guide component is not situated in front of the other one), otherwise, during the changing described, the transport aid would jam between the rails.

Overall, the already explained movability within the transport aids has the advantage that tolerances in the distance between the rails can be compensated for. For example, tolerances of up to 10 mm do not constitute any problem given an appropriate design of the transport aids. The transport aid is adjusted to the particular distance by an appropriate slanting position, i.e. the guide components sometimes slide parallel over the rails and sometimes offset with respect to one another.

This tilting and braking due to friction leads to the transport aids and therefore the containers travelling at an appropriate and relatively uniform speed around the curve.

In FIG. 35, numerous rail lines 56 with spirals can be seen. The above-described effects result in the transport aids and therefore the containers also gliding there at a sensible speed.

Spirals are generally also situated at the end of the respective rail lines 56. As can be seen in FIG. 35, the containers slide there in or on the described transport means onto the upper level of a two-stage round tower. For example, one rail, for example made of plastic or stainless steel, which at least substantially runs around the upper level of the round tower can be arranged here in order to guide the containers securely on the round tower even at a relatively high speed. In this case, the rail of the rail line 56 merges into this rail of the round tower 74. The round tower is located in the centre of the table 5, and therefore the container can be moved at least substantially around the table on the rail of the round tower 74.

The arrangement of rail spirals over the round towers and therefore above the tables makes it possible for the rails not to constitute any obstacles between the tables since the rails in these areas run at a sufficiently high level, for example at a minimum height of 2.20 m above the floor. Customers and staff can therefore move between the tables without obstruction. Only above the tables or the round towers is the particular residual height bridged by means of the rail spirals.

With regard to the arrangement of the rail on the round tower, attention should be paid to ensuring that its distance from the upper level of the round tower is such that the transport aids rest on the upper round-tower level. The upper round-tower level is rotatable. By rotation of the upper round-tower level (can take place by hand or in a driven manner), the transport aids, which rest with the lower ends of the guides on the round tower, are transported further—guided by the rails.

According to a variant, just one rail may also be provided on the round tower. This suffices to further guide the transport aids on the upper round-tower level in an ordered manner.

After substantial encircling of the upper round-tower level, the rail is guided to an intermediate storage space for transport aids or directly into a cleaning area. Two parallel rails may be provided for this, as in the case of the transportation to the tables. However, it is also possible, like on the upper round-tower level, for this further transport to also be carried out just with one rail. The transport aids are then hung just by one guide component on this rail, i.e. they hang down on the rail. This is safe, since all of the containers have been removed from the transport aids at the table.

According to a variant, the tables 5 have at maximum a three-quarter circle shape (cf. FIG. 35). The transport aids are therefore guided along this three-quarter circle table, with the customers in this case removing the ordered meals (in containers, such as pots or dishes, etc.) and beverages (in the form of bottles and/or glasses/cups and/or carafes, etc.) from the transport aids. At the end of the three-quarter table, the transport aids can be transported further in the region of the sector of the round tower, at which there is no table, by further routing of the rail, for example into a cleaning area. However, it is also possible to guide the rail to another waste-disposal or collecting location for the transport aids. For example, after running around the three-quarter circle on the round tower, the rails may be guided into an intercepting container below the table. For this purpose, it is also possible to guide the rails in such a manner that the transport aids are temporarily guided on further standing or hanging upside down, since the guide components surround the rails to the extent that they do not drop out of them even in this position. Only at the end of the rails do the guide components slide out of them. If the rails are to end in a transport container as a collecting container for the transport aids, the transport aids slide into this transport container and slide out of the rail there. From time to time, these transport containers can be exchanged and/or emptied.

In particular when guiding the transport aids away from the table on one or two rails into a separate area, for example onto a floor situated below or into a cellar or directly into a cleaning area, work and therefore an annoying hectic pace at the customer's table can be avoided.

In order to avoid transport aids being guided on further from the table to the cleaning area or into a collecting container, although the container or the pot or other goods being transported is/are still located in or on the transport aid, the transport apparatus can be guided through a checking unit before it leaves the table or round tower. Said checking unit can be designed, for example, in the manner of a height checking system before car terminals or underground car parks or multi-storey car parks, i.e. an obstacle is installed at a defined height above the rail. If the transport aid is still equipped with a container or pot or beverage, etc., the transport aid does not pass through this checking obstacle. Only if the goods being transported have been removed can the transport aid be conveyed further on the rail.

It has already been explained that the rails are guided at a small height above the round tower, to be precise above the upper round-tower level, and therefore the transport aids sit on the round-tower surface so that they can also be guided on further by rotation of the round tower. Since the height of the rails above the round tower may be too small for provision of the otherwise possible securing of the rail from below, it is appropriate here, as an alternative, to fit moveable supporting devices, for example rollers, ball bearings, sliding bearings, sliders, etc., to the lower side of the rails. The rails can rest on the upper round-tower level via these supporting devices, and the round tower can nevertheless be rotated without any problem in order, for example, to transport the transport aids further.

Of course, the upper level of the round tower may be composed of very different materials. However, it is advantageous, in order to guide the transport aids on by means of rotation of the upper round-tower level, if the surface of the upper round-tower level is not of completely planar design but rather has unevennesses, for example studs or scores or elevations running in a star-shaped manner on the round tower. As an alternative, the upper level of the round tower may also not be designed as a solid surface but rather as a type of wheel with spokes and a rim. At the rim, the customers can offset the wheel into a rotational movement. Like the above-mentioned scores of the solid surface, the spokes drive the transport aids forwards in a guided manner on the rail. This solution has the advantage that, for example, a light source situated above the upper round-tower level could also bring light to the lower round-tower level, on which, for example, plates, glasses and cutlery for the customers are located. An independent means of illuminating the lower round-tower level could therefore be dispensed with.

According to a development, the upper round-tower level is driven by a motor, in particular an electric motor. This has the advantage that the transport aid together with its container, arriving on the round tower, can be automatically transported further, for example when or shortly before the next transport aid arrives at the table. In this manner, collisions between the transport aids can be avoided. A motor drive of this type is preferably to be designed in such a manner that the drive is too weak in order to push the transport aids with containers still inserted through the checking unit explained above. In such a case, the checking unit should either switch off the motor or the round tower is designed on its upper level in such a manner that it rotates under the transport aid until further transportation is possible.

The above-described guide components 63 may be equipped on their inside, in particular on their sliding surface, with wheels, rollers, balls or (ball or needle) bearings in order to permit sliding even at a relatively small gradient. Of course, wheels which are attached to transport aids may also run on the rails 7. Said wheels are to be provided with a suitable braking device, for example with braking devices known from railway technology, in order to avoid or to brake excessive speeds. In one variant embodiment, the rollers, balls, bearings, etc., may also be arranged on the rails 7. In this case, the rollers, etc. and therefore the transport aids and/or containers are also to be braked in a specific manner.

So that a customer at a table 5 recognizes which of the arriving meals and beverages are intended for him, a colour identification is provided. For example, the handle 69 of the cover 73 or the ring components 65 may be provided with a colour marking (e.g. by coloured enamelling, painting, etc.) which corresponds to a colour marking at the customer's seat. A table 5 with, for example, 12 places is therefore assigned 12 different identification colours at the seats. During ordering, it can be provided, for example, that a customer, upon ordering, always also has to specify the colour of his seat (which he sees, for example, by way of a coloured point on the table 5 in front of his seat). In the kitchen, this colour is then also always used for the particular order. The meals and beverages ordered, for example, by "table number 3, green coloured point" would then be transported in a transport aid and a suitable container to table "number 3". Even as it glides up, the customer sees by way of the colour on the transport aid or container or cover or by way of the colour of an attached small flag, detachable part or other identification means, that it is his order arriving.

A decisive advantage of the abovementioned transport aids 58, 59, 60, 61 resides in the fact that the containers 29 no longer slide on lower rails, and therefore deeper containers, for example bottles or salad dishes, can now be arranged, by appropriate design of the transport aids and/or containers, at a deeper point between the lateral rails 7, as a result of which the centre of gravity shifts downwards. This in turn leads to it being possible for even large bottles, for example 0.5 liter bottles, to be transported with this system without any problems. This is also assisted in that the guide components 63 of the transport aids that engage by more than half, in particular by at least two thirds, around the rail 7, cannot be thrown out of the rails 7 even in the event of relatively large forces. In this case, the bottles may be held in a container by special inserts, into which the bottles are inserted in an interlocking and/or frictional manner, or dedicated bottle holders, in which the bottles are likewise secured in an interlocking and/or frictional manner, are provided for the transport aids (see FIGS. 30/31). Of course, the bottles could additionally be fastened, as explained above, to the transport aids in a manner comparable to the pot covers.

The deeper arrangement of higher containers between the rails 7 also has the advantage that rail lines 56 can be arranged more closely one above another. In this design, in comparison to other designs of the rail lines 56 (for example the four-rail solution already mentioned), more rail lines 56 can therefore be arranged in a predetermined spatial volume, and the individual rail lines can be arranged one above another at a smaller distance from one another, thus making it easier to configure a rail system. In this way, it is frequently even possible, by means of the two-rail system, to omit branch lines and switching points in the entire rail system. A corresponding example is illustrated in FIG. 35. In particular in the centre of the long spiral tower, a plurality of rails are guided tightly one above another and wind in a spiral manner around the tower pillar. As a result, four tables arranged offset in height with respect to one another in the manner of a staircase can be controlled and can be supplied with meals and beverages by a dedicated rail in each case, without branch lines and switching points. At least, the number of branch lines and switching points should be significantly reduced in most cases.

By way of example, FIG. 33, which is explained in more detail below, shows, in a cross section, the possible arrangement of three rail lines 56 one above another. At points at which one rail line is deflected in comparison to the other ones, the distance between two rail lines 56 and the rails 7 thereof has to be at least of sufficient size in the vertical direction that the lowermost container hanging in the transport aid can slide over the rails of the rail line 56 situated below it without touching the rail situated below it (for example in the event of change in direction of the upper rail, which is not undertaken by the lower rail, or vice versa).

Since branch lines 8 and switching points 9 cannot generally be avoided, FIG. 32, FIG. 33 and FIG. 34 show exemplary embodiments for the above-described solution of a rail system, in which each rail line 56 is formed by two parallel rails 7. In principle, although lateral branching off is also possible here—as known from railway technology—and can be realized by corresponding switching points 9, the exemplary embodiments illustrated show a branching off in the vertical direction, i.e. the switching point 9 guides a container not into a laterally or horizontally offset rail line 56 but rather into a height-offset or vertically offset rail line 56. The containers 27 and the transport aids 58, 59, 60, 61 are therefore guided upwards or downwards on other rails 7 located above or below the further rails 7.

The exemplary embodiment according to FIG. 32 is shown in FIG. 33 in a sectional illustration along the line A-A in FIG. 32. It can be seen in FIG. 32 that a transport aid 59 (likewise 58, 60, 61) with a container 27 is gliding up on a rail line 56. This rail line 56 is divided into three rail lines 56 which are arranged one above another, and the branching-off is indicated by reference number 8. As is apparent from FIG. 33, each rail line comprises two rails 7 which are arranged above a holder 57. The activation of the rail line 56 desired for further transportation takes place via a switching point 9, here a moveable section of the rail line 56 or a moveable rail section, which is connected to the rest of the incoming rail line 56 via a joint 77, in particular a rotary joint. The switching point 9 is controlled via a pressure piston 78 (or a comparable movement device) which raises or lowers the moveable section of the rail line. This enables the desired rail line 56 to be activated.

If the rail leading on further is located above the rail on which the container is currently located, the moveable rail section (the switching point 9), which is raised (or lowered) by means of the pressure piston or similar, and/or the following rail section, could also have rollers or comparable sliding aids on the surface ensuring that sliding takes place even at a low gradient. The height necessary for branching off (because of the downwardly hanging height of the container) could thus be obtained over a relatively short distance. In the event of turning off onto a rail located below the currently used rail, a surface with poorer sliding properties could conversely be applied to the following rail length of greater gradient in order to prevent excessive speeds.

An alternative branch line 8 is illustrated in FIG. 34, to be precise a branch line 8 in the manner of a mobile. A device of this type is also suitable for bridging large height differences and, in particular, the sliding down via a plurality of rails arranged one below another in a room which is constricted in its horizontal extent is advantageous here. The switching point 9 itself is designed here as in FIG. 32, the control taking place via a pressure piston 78 or a comparable device. However, the transport aid 59 (also 58, 60, 61) or the container 27 is deflected here downwards from the incoming rail line 56 onto an oppositely inclined rail line 56. The increased speed which arises during the deflection because of the greater inclination of the rail in the switching point 9 is immediately intercepted on the oppositely inclined rail line 56 by the rise of this rail line. Transport aid 59 and/or container 27 are fully braked and are accelerated in the opposite direction on account of the inclination of the rail line 56 leading on further. It then passes into a normal gradient and therefore continues at a normal speed.

So that the guide components 63 or 75, in particular the guide components 63 engaging around the rails 7 by more than half, in particular by at least two thirds of the rail circumference, can also engage around the rails 7 leading on further, said rails are designed with a smaller diameter in the region in which the transport aids 59 slide from the switching point 9 onto these rails 7. In particular, they can taper acutely towards the upper rail end where they have a safety lock for preventing the transport aids 59 from coming out inadvertently. This ensures that the guide components 63 or 75 can join the rails 7 leading on further, by themselves.

Lateral branching off could be implemented via a relatively long switching point. While the transport aid or container glides along this switching point (a section of rail), this switching point (the section of rail) could be pivoted laterally and thus permit unproblematic turning off. In this case, a sensor could determine when the transport aid or the container is situated on the switching point or the pivotable rail section.

If the speed is too high here, the transport aid or the container could be braked in a suitable manner. As an alternative to this, it may also be provided to brake the container to be transported or the transport aid on a section of rail without a gradient. After the braking, this rail section could be pivoted. If the correct joining point is reached, the switching point or the rail section could be lowered and the transport aid or the container is accelerated again and glides further. This solution could be configured, for example, in the manner of a carousel known from railway technology, and therefore numerous joining points can be activated by this switching point.

A branch line may also be implemented via a type of lift. For this purpose, the transport aid or container is brought to a standstill on a rail section. This rail section is then moved upwards or downwards to the desired connecting point. The rail section is inclined again there and the transport aid or container slides on on the desired rail line.

In principle, a lateral turning off is also possible by means of a switching point which is constructed analogously to the switching points known from railway technology.

The round tower 74 which has already been discussed and is shown schematically in FIG. 35 will be explained in more detail below. In FIG. 35, the tables 5 are each assigned a round tower 74. The respective rail line 56 ends on this round tower 74. The round tower 74 comprises two circular levels which are arranged one above the other, an upper and a lower level, which are preferably rotatable independently of each other (by hand, for example by the customers themselves, but also electrically in one variant). The rotatability makes it possible for each customer to be able to access all regions of the round-tower levels from his seat. The lower round-tower level is located at the height of the table or just above the height of the table, the upper round-tower level is arranged at sufficient distance above the lower level, and therefore, for example, clean tableware, cutlery and glasses for the customers can be stored in the intermediate space, on the lower round-tower level. The round towers are thus relatively high, for example the upper round-tower level is located approximately 30 to 50 cm above the height of the table. Since the rails 7 always arrive on the upper level, a relatively high attachment of the incoming rails 7 arises virtually automatically. In conjunction with the already explained rail spirals over the round towers, it is therefore possible for the incoming rail line 56 or the rails 7 to always run at such a high level that the table 5 is easily accessible. The spiral ends directly at the upper level of the round tower 74, on which the transport aids with the transported containers for meals and beverages also arrive. The guidance of the transport aids which have arrived on the upper level has already been explained.

In addition to the provision of clean tableware, cutlery and glasses, the lower round-tower level may also be used for storing used tableware, cutlery and glasses and, if appropriate, transport aids, containers, pots, covers, fastening device, etc. This is important in particular if a removal system is not provided for this purpose. Table waste may also be placed into the round tower. In order to permit speedy emptying of the lower round-tower level, it is expedient to divide the lower level of the round tower into four essentially equally sized segments (quarter-circle segments). Two opposite segments may be used, for example, for the provision of clean plates, glasses, cutlery, vinegar, oil, salt and pepper, serviettes, etc. The other two segments may be used for the removal of the abovementioned objects and utensils. For this purpose, it is in turn expedient to design these segments as removable trays or to provide these segments with corresponding trays. These trays are in the shape of a sector of a circle. They may be transferred, for example, from the lower level directly into a tableware cart. A practice test has revealed that manoeuvrability is improved if the quarter-circle segments each have two removable trays for waste disposal, i.e. each tray is essentially in the form of an octant.

On the removable trays there can be, for example, an apparatus for holding pot covers and a box for storing the transport aids and the rubber bands with which the covers are held on the containers or pots. The containers, pots, etc. which are no longer required may be stacked on the remaining space.

The tables 5 have, as apparent in FIG. 35, essentially a round shape, to be precise essentially the shape of a segment of a circle, in particular a three-quarter segment of a circle. At each table, direct access to the round tower is therefore possible in the missing segment of the circle. The staff member can here load the lower level of the round tower with fresh tableware, etc., and can take away the trays with the used tableware, etc. and, if appropriate, can remove them with the stored transport aids, etc. and can reload said segments of the round tower with empty trays.

The two-storey round tower 74 is arranged essentially in the centre of the table 5. Lower and upper round-tower levels are mounted rotatably on a vertical round-tower spindle which at the same time forms the hub for the two rotatable, circular round-tower levels. At least one pivotable holder for a monitor, in particular at least one touch screen monitor, is arranged below the upper level of the round tower and/or below the lower level of the round tower, in a gap between table top and lower round-tower level. This holder is mounted rotatably on the round-tower spindle. It reaches beyond the round-tower levels, and therefore the monitor can be rotated in front of the round tower around the entire table in the shape of a sector of a circle. In this manner, every customer has access to the monitor at his seat, can therefore see, for example, the menu and can place orders. In the case of relatively large tables, the provision of two or more such holders with a monitor is expedient.

If the pivotable monitor is guided by a pivotable holder (also: arm, pivoting arm) below the lower level of the round tower, this holder may additionally be mounted on the table, for example via rollers. This facilitates the guidance of the monitors, since their weight does not have to be borne by the mounting on the round-tower spindle. After emerging from the lower round-tower level, the holder is expediently bent upwards or has a holder section which is guided upwards at an angle of approx. 90° with respect to the horizontal holder section and at which the monitor (touch screen) is fastened or can be fastened at a height suitable for viewing and operation.

As an alternative to the previously described rail system 6 with rail lines 56 which are constructed from in each case two rails 7 running parallel to each other, each rail line of a rail system according to the invention may also be designed as individual rails (e.g. single-tube rail system), for example comparable to the rail of a magnetic-levitation transport system. In this case, the transport aid is not guided on two or more parallel rails but rather only on one rail (or a tube) around which it at least largely engages. This rail may be circular or round in cross section, but a rectangular design is also possible. On a rectangular rail (tube), lateral tilting of the transport aid during transportation could be prevented solely by the shape of the rail (cf. principle of guidance of a magnetic-levitation transport system). In the case of a rail with a circular or round cross section, lateral tilting of the transport aids can be prevented, for example, by a downwardly protruding guide element, for example a metal sheet or a rectangular tube or similar, being provided continuously at the lower end of the rail. The rail or the rail system could also be suspended on or fastened to said guide element. The lateral tilting away of the transport aids could be prevented by means of this guide element, in particular by means of the metal sheet or a rectangular tube, for example by the transport aid engaging from both sides on the guide element, for example via rollers, and, as a result, the designated, upright position of the transport aid being ensured. It is essential that the transport aid cannot rotate beyond the guide element. With regard to specific configurations for this purpose, reference should be made by way of example also to the construction of modern rollercoasters which are constructed on the single-rail principle.

It is also possible to construct a single-tube rail system in such a manner that the transport aids or containers are guided in the tube, in which case again here the drawer effect already explained is produced and can be used as a self-controlling system in respect of the transport speed. For example, a groove may be provided on one side of the tube. An arm is then fastened to the sliding insert in the tube and is guided outwards through this groove. The transport aids or containers can then be fastened to this arm, for example by means of special apparatuses, holders, handles, clamping fasteners, etc. One advantage of this variant of a single-tube rail system is that the arm which protrudes out of the groove at the same time ensures that the transport aids or containers cannot rotate around the tube. This principle can also be transferred to the rail systems (already described) with two or more rails.

Also with regard to numerous further developments of the present invention, reference may be made to rollercoaster techniques. For example, it may also be required in the restaurant system according to the invention, as in rollercoasters, first of all to "artificially" provide the height required for the transportation by means of gravity, that is to say first of all to convey the transport aids and containers to a corresponding height. As already explained, it may also be required in the restaurant system, as in rollercoasters, to measure the speed at critical points during the transport operation and, if appropriate, to provide targeted braking. The braking of the transport devices or containers may take place by means of all known braking methods. In the case of the construction (already explained) of a rail line from four rails arranged on two rail levels, the gliding track may be tapered, for example via a movement of the lateral rails towards each other, for example by means of a hydraulic cylinder, and therefore the transport aids or containers are braked by increased friction on these lateral rails. In the case of the previously described rail lines comprising two parallel rails or comprising just one rail, the braking can be achieved by a section of a rail being pressed laterally outwards or inwards, for example by means of a hydraulic system, thus widening or tapering the rail. In this manner, the play of the transport aid or of the guide components of the transport aid on the rail is reduced and the friction increased, which again leads to a reduction in the speed until the transport aid comes to a standstill. Of course, in the case of transport aids guided on rollers or wheels, the rollers or wheels could also be braked, for example by means of known brakes, such as disc or drum brakes or similar.

The sequence of a restaurant visit is represented below by way of example for the restaurant system according to the invention. At the entry, the customer first of all receives an anonymous restaurant card (also: customer card), for example a card with an RFID chip. Using these restaurant cards, he logs into the IT system of the restaurant at his seat and orders meals and beverages via the touch screen monitor. Each seat at each table is marked by a coloured point on which there is also a number (for colour-blind individuals). After the customer has found things out in the preferably illustrated menu to the extent that he wishes, the ordering takes place. During ordering, the customer inputs the coloured marking of his seat on the touch screen monitor. The ordering is subsequently initiated, for example by the customer holding his restaurant card at a scanner in the vicinity of the screen or on the screen. When the ordered meals and beverages are delivered via the transport system (by means of gravity), the containers are marked in colour in the seat colour of the individual placing the order, for example by a small flag, by a coloured pot handle, etc. The individual placing the order (if a number of different individuals or groups of visitors are sitting at one table) thereby sees, even as they arrive, for whom at the table the meals and beverages are intended. What is in the particular container and for whom it is intended may furthermore be printed on the marking means, for example the small flag, or indicated by an appropriate sticker. When the customer leaves the restaurant, he gives up his restaurant card at the exit and settles his bill.

In a development, the bill could be displayed immediately after ordering on the touch screen monitor, on the mobile phone display or on other display devices present. This may then be settled immediately by the customer, for example by mobile phone, credit card, EC card, cheque card, etc.

It may also be provided that only orders which have already been paid for are passed on by the IT system of the restaurant to the working area (the kitchen).

As an alternative or in addition, personalized customer cards may also be provided; in this case, the customer may agree different types of payment. The personalized customer card may be associated with a series of advantages for the customers, for example a bonus for regular visits, a bonus for submitted eating and restaurant evaluations, and for recommendations. In addition, new customers may be recruited on the basis of the personalized customer cards. If the recruited customer comes within a certain period, the recruiter and the individual recruited obtain a bonus. From the regular evaluations submitted by the restaurant customers, extensive, current data about the target customers and about changes in the customers' assessment of the quality of the restaurant may be obtained. In addition, evaluation results may be compared with times at which the service or kitchen staff are present. In addition, the customer may be given the option, with the personalized restaurant card, of paying for all of his restaurant visits conveniently at the end of a month by a collective invoice.

As an alternative to ordering via the touch screen monitor, the customer may also place his order by mobile phone on site (at his seat) or before he arrives. Ordering in advance via the Internet may also be provided. For this purpose, it is expedient for the current menu to be able to be downloaded both via the Internet and via mobile phone. The customer can thus conveniently place his order from his house or while underway and can pay by mobile phone, cheque or credit card or restaurant customer card. When he arrives, the food is then already ready and can be delivered, for example by pick-up number, to the table or to a drive-in parking space (see below).

The previously described IT solutions for the restaurant system according to the invention lead to significant cost reductions or simultaneously increasing the comfort of the customers.

The system according to the invention, a completely novel, efficient drive-in concept can be implemented. In principle, the entire space required in conventional drive-in areas for the motor vehicles to pass through can be omitted. Instead, virtually any desired number of normal parking spaces, as far as possible situated in the vicinity of the working area of the restaurant, may be converted into special drive-in parking spaces. A rail line then leads from the working area to each of these parking spaces. The order may be placed either while underway by mobile phone or on site at the parking space by means of a touch screen and paid for by means of mobile phone, cheque card, etc. The meals and beverages subsequently glide on the rails directly to the cars. A substantial advantage is that virtually any desired number of drive-in customers can be served at the same time. It is no longer necessary to wait in a car queue, and there is a significant increase in comfort for the customer, at drastically reduced costs (less space required and fewer staff).

Overall, the invention provides a restaurant system in which meals and beverages are brought without an assistant in a targeted manner to the customers at the tables. The developments given furthermore make it possible to carry out the ordering and payment fully electronically.

The logistical chain of a restaurant is closed in a fully automated manner in the case of the restaurant system according to the invention. As a result, comprehensive information technology (IT) can be installed for all areas of a restaurant operation. Orders, payments and deliveries of the meals and beverages can be executed at least substantially without the use of employees. In a restaurant, all of the processes which do not bring any direct benefit to the customer may therefore be completed without the use of (expensive) employees. For example, it is certainly of no direct benefit to the customer if an assistant brings the food and the beverages to the table if he does not, as an alternative to this, have to pick up the food and the beverages himself (as in self-service restaurants). The invention shows that these serving operations can be carried out in a substantially more intelligent manner by means of a transport system. Employees are only used where they are also of direct benefit to the customer.

The process chain of a restaurant is closed in an innovative manner by the restaurant system according to the invention on the service side too, by means of the transport system which transports the meals and beverages by means of gravity. In addition, the ordering and the payment may easily also be resolved by modern information technologies. All of the processes can be controlled at least substantially by a restaurant computer. As a result, the aspects of comfort and ambience on the one hand and low costs on the other hand, which were previously considered diametrically opposite, can be optimally combined with one another.

All in all, the transport system provided in the restaurant system according to the invention with transportation by means of gravity is distinguished by its simple and cost-effective conception. The proposed restaurant system not only connects the comfort of a conventional restaurant with service with the favourable cost structure of a self-service restaurant. What is more, the processes are configured to be considerably more efficient by means of the technological, information-technology and organizational overall solution of the proposed restaurant system, and therefore the costs are significantly reduced, while the benefit to and comfort for the customers is considerably increased.

LIST OF DESIGNATIONS

2 Restaurant system
3 Working area
4 Customer area
5 Table
6 Transport system, rail system
7 Sliding rails, rails
7a . . . e Rails
8 Branch line
9 Switching point
9a Adjustment member
9b Guide element
10 Working counter
11 Working staff
12 Staircase
13 Customers
14 Central counter
15 Cleaning and waste-disposal area
16 Removal system
17 Sliding rails
18 Sliding surface of the sliding rails 7, 17
19 Guide edges
20 Rail end
21 Rotational mounting, pivot point
22 Guide grid
23 Recesses in guide grid 22
24 Rail end
25 Support
26 Cable system, cable pull
27 Containers
28 Dish
29 Sliding surface
30 Cover, closure cover
31 Cover, intermediate cover
32 Edge web
33 Cover edge
34a,b,c Dishes
35 Hook
36 Sliding apparatus
37 Tumbler, cup, glass, bottle, beverage container, drinking vessel
38 Under plate
39 Lower side of the under plate 38
40 Holder
41 Stand element
42 Suction cups
43 Lower side of the beverage container 37
44 Rocker mechanism
45 Beverage insert
46 Upper section of the beverage insert 45
47 Small dish
48 Small recess
49 Recess
50 Handle
51 Inside of the handle 50
52,53,54 Removal rails, waste-disposal rails
55 Goods lift
56 Rail line
57 Holder
58,59,60,61 Transport aids
62 Handle
63 Guide component
64 Bolt
65 Ring component
66 Moulded body
67 Retaining apparatus 68 Fastening device, rubber band
69 Handle
70 Bottle holder, beverage insert
71 Bottle receptacle
72 Retaining webs
73 Cover
74 Round tower
75 Guide component
76 U-profile
77 Joint
78 Pressure piston
79 Ring element
80 Retaining pin, screw
81 Fastening device
82 Securing strap
Specifically in FIG. 23 and FIG. 24:
R-No. 1 to 10 Rooms
a to o Positions
1 to 9 Rails
1-1 to 9-2 Tables assigned to the individual rails (first number in each case)

The invention claimed is:

1. Restaurant system, comprising:
   a) at least one working area for cooking, and preparing meals and beverages;
   b) at least one customer area, with one or more tables for restaurant customers;
   c) the working area and the customer area being connected via a transport system for meals and beverages;
   d) the transport system being designed to transport meals and beverages from the working area to the customer area;
   e) the transport system comprising at least one rail having a sliding surface, in turn comprising two rails running at least substantially parallel and branch lines for adjusting the transport route by controllable switching points;
   f) transport aids corresponding in respect of their dimensions and their sliding properties to the rails and are designed for the transport of containers, for meals and beverages, wherein the transport aids have corresponding guide components, which in particular engage around at least half of the rail circumference of the rails; and
   g) the transport of meals and beverages from the working area to the customer area via the transport system taking place, at least in some sections, by means of gravity, and rails connect the at least one working area by terminating at individual tables in the at least one customer area.

2. Restaurant system according to claim 1, characterized in that the working area is arranged at a higher level than the customer area.

3. Restaurant system according to claim 1, characterized in that the two rails are two inner rails being at a smaller distance from each other than two outer rails, the two inner rails defining a sliding plane and the two outer rails defining a guide plane, and the sliding plane being arranged below the guide plane.

4. Restaurant system according to claim 1, characterized in that the transport aids have two guide components which are connected to each other, via a ring component in which the container to be transported is hung, the ring component connected moveably to the guide components via lateral ring elements placed onto bolts which are provided on the guide components.

5. Restaurant system according to claim 1, characterized in that the containers correspond in respect of their dimensions and sliding properties to the rail, and a beverage insert is provided for the transport aid, with which beverage containers or bottles or carafes or soup containers can be transported by means of the transport aid, in a manner secure against tipping over.

6. Restaurant system according to claim 1, characterized in that the rails arranged between working area and customer area are moveable, at least in some sections.

7. Restaurant system according to claim 1, characterized in that towards the customer area, the rails have a slowing-down section in which the amount of slope of the rails is less than in the central section, or a sliding surface of the rails has a greater coefficient of friction than in the central section.

8. Restaurant system according to claim 1, wherein a guide component at least partially engages at least three quarters of the rail circumference.

9. Restaurant system according to claim 1, wherein each transport aid comprises a ring component coupled to each of the two guide components and adapted for receiving a meal.

10. Restaurant system according to claim 1, wherein the at least two rails terminate at individual tables.

11. Restaurant system according to claim 1, wherein each of the controllable switching points comprises a piston for moving a rail.

12. Restaurant system according to claim 11, wherein each of the controllable switching points further comprises a guide element wherein the guide element forms a series of recesses for receiving a rail positioned horizontally and moved vertically with a cable pull.

13. Restaurant system according to claim 1, wherein at least one table in the customer area at least partially surrounds a round tower at the center of the table.

14. Restaurant system according to claim 13, wherein a rail spirals around the round tower and is dedicated to a table.

15. Restaurant system according to claim 14, wherein the round tower further comprises a circular upper level and a circular lower level.

16. Restaurant system according to claim 15, wherein tableware is stored on the circular lower level and the rail terminates at the circular upper level.

* * * * *